(12) United States Patent
Li et al.

(10) Patent No.: US 12,501,268 B2
(45) Date of Patent: Dec. 16, 2025

(54) METHOD AND APPARATUS FOR VERIFYING PERSONAL IDENTIFICATION NUMBER PIN CODE

(71) Applicant: Huawei Technologies Co., Ltd., Shenzhen (CN)

(72) Inventors: Yuanfeng Li, Shenzhen (CN); Fengguang Qiu, Shanghai (CN); Weilin Gong, Shenzhen (CN); Zeping Xu, Shanghai (CN); Xiaotao Yan, Shanghai (CN); Pingping Gu, Shenzhen (CN); Yang Yu, Wuhan (CN); Yingfeng Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 18/259,533

(22) PCT Filed: Dec. 14, 2021

(86) PCT No.: PCT/CN2021/137675
§ 371 (c)(1),
(2) Date: Jun. 27, 2023

(87) PCT Pub. No.: WO2022/143138
PCT Pub. Date: Jul. 7, 2022

(65) Prior Publication Data
US 2024/0064519 A1    Feb. 22, 2024

(30) Foreign Application Priority Data
Dec. 28, 2020 (CN) .......................... 202011588834.0

(51) Int. Cl.
*H04W 12/43* (2021.01)
*H04W 12/062* (2021.01)
*H04L 9/40* (2022.01)

(52) U.S. Cl.
CPC ......... *H04W 12/43* (2021.01); *H04W 12/062* (2021.01); *H04L 63/083* (2013.01); *H04L 63/0853* (2013.01)

(58) Field of Classification Search
CPC .. H04L 63/083; H04L 63/0853; H04W 12/30; H04W 12/40
See application file for complete search history.

(56) References Cited

U.S. PATENT DOCUMENTS

| | | | |
|---|---|---|---|
| 2009/0270072 A1 | 10/2009 | Hsu et al. | |
| 2014/0335825 A1* | 11/2014 | Babbage | H04W 12/04 455/411 |
| 2020/0120483 A1* | 4/2020 | Chikkala | H04W 88/06 |

FOREIGN PATENT DOCUMENTS

| | | |
|---|---|---|
| CN | 105101178 A | 11/2015 |
| CN | 105704704 A | 6/2016 |
| CN | 108156601 A | 6/2018 |

OTHER PUBLICATIONS

Pradhan et al., Secure protocol for Subscriber Identity Module, 2017, IEEE, pp. 358-362 (Year: 2017).*

* cited by examiner

*Primary Examiner* — Ellen Tran
(74) *Attorney, Agent, or Firm* — Slater Matsil, LLP

(57) ABSTRACT

This application provides a method and an apparatus for verifying a personal identification number PIN code. When a first SIM card is inserted into a powered-on terminal device or the terminal device into which the first SIM card is inserted is powered on, whether a mapping relationship includes a PIN code to which a first ICCID of the first SIM card is mapped is queried; the PIN code is sent to the first SIM card if the mapping relationship includes the PIN code to which the first ICCID is mapped; and a verification result of the PIN code from the first SIM card is received.

20 Claims, 35 Drawing Sheets

TO FIG. 4A-2

METHOD AND APPARATUS FOR VERIFYING PERSONAL IDENTIFICATION NUMBER PIN CODE

CROSS-REFERENCE TO RELATED APPLICATIONS

This application is a National Stage of International Application No. PCT/CN2021/137675, filed on Dec. 14, 2021, which claims priority to Chinese Patent Application No. 202011588834.0, filed on Dec. 28, 2020, both of which are hereby incorporated by reference in their entireties.

TECHNICAL FIELD

Embodiments of this application relate to communication technologies, and in particular, to a method and an apparatus for verifying a personal identification number PIN code.

BACKGROUND

A subscriber identity module (subscriber identity module, SIM) card is an important asset of a user, and the SIM card is associated with a mobile number of the user. The user usually uses the mobile number to register in and log in to applications. Loss of the SIM card severely threatens privacy and property security of the user.

The user may enable a PIN code verification function of the SIM card on a setting page of a terminal device, to improve security of the SIM card. Currently, if the user enables the PIN code verification function of the SIM card, each time the terminal device is powered on or the SIM card is inserted into the terminal device, the user needs to enter a PIN code of the SIM card to verify the PIN code. Currently, an operation of verifying the PIN code is complex. As a result, the user uses a mobile phone with low efficiency.

SUMMARY

Embodiments of this application provide a method and an apparatus for verifying a personal identification number PIN code, to automatically verify a PIN code of a SIM card, thereby improving user experience.

According to a first aspect, an embodiment of this application provides a method for verifying a PIN code. The method may be applied to a terminal device or a chip or a processor of the terminal device. The following uses the terminal device as an example for description. In the method, the terminal device queries, when a first SIM card is inserted into the powered-on terminal device or the terminal device into which the first SIM card is inserted is powered on, whether a mapping relationship includes a PIN code to which a first integrated circuit card identifier (IC-CID) of the first SIM card is mapped. If the mapping relationship includes the PIN code to which the first ICCID is mapped, the PIN code to which the first ICCID is mapped is verified. It should be noted that a manner in which the terminal device verifies the PIN code to which the first ICCID is mapped may be: The first SIM card may store a PIN code of the first SIM card, the terminal device sends the PIN code to which the first ICCID is mapped to the first SIM card, and the first SIM card may compare the PIN code to which the first ICCID is mapped with the stored PIN code for verification. If the PIN code to which the first ICCID is mapped is the same as the stored PIN code, the PIN code to which the first ICCID is mapped passes the verification; or if the PIN code to which the first ICCID is mapped is different from the stored PIN code, the PIN code to which the first ICCID is mapped does not pass the verification. The first SIM card may send a verification result of the PIN code to the terminal device. The verification result may include that the PIN code to which the first ICCID is mapped passes the verification or the PIN code to which the first ICCID is mapped does not pass the verification.

In this embodiment of this application, the terminal device may store the mapping relationship between the ICCID of the SIM card and the PIN code of the SIM card. Therefore, when the PIN code of the first SIM card needs to be verified, the terminal device may obtain, from the mapping relationship, the PIN code to which the first ICCID is mapped, and verify the PIN code to which the first ICCID is mapped. In this method, the terminal device automatically verifies the PIN code of the SIM card, and instead of manually entering the PIN code by the user, the terminal device automatically verifies the PIN code, thereby improving user experience.

In a possible implementation, when the first SIM card is inserted into the powered-on terminal device or the terminal device into which the first SIM card is inserted is powered on, the terminal device may first determine whether a PIN code verification function is enabled for the first SIM card. If the PIN code verification function is enabled for the first SIM card, the terminal device queries whether the mapping relationship includes the PIN code to which the first ICCID is mapped and that is of the first SIM card. In this manner, a quantity of query times performed by the terminal device when the PIN code verification function is not enabled for the first SIM card can be reduced, and workload of the terminal device can be reduced. That the terminal device determines whether the PIN code verification function is enabled for the first SIM card may be: The terminal device may send a select EF 3f00 command to the first SIM card, to receive information from the first SIM card. The information about the first SIM card may include information such as a type of the first SIM card, information about whether the PIN code verification function is enabled for the first SIM card, and a remaining quantity of verification times of the PIN code. Therefore, the terminal device may determine, based on the information about whether the PIN code verification function is enabled for the first SIM card, whether the PIN code verification function is enabled for the first SIM card.

In a possible implementation, the terminal device outputs first prompt information if the PIN code verification function is not enabled for the first SIM card, where the first prompt information is for prompting to enable the PIN code verification function of the first SIM card. In this manner, the terminal device may guide the user to enable the PIN code verification function of the first SIM card, thereby avoiding a problem that the user searches for a control for enabling the PIN code verification function, and improving user experience.

After outputting the first prompt information, the terminal device outputs second prompt information if an enabling instruction entered by a user is received, where the second prompt information is for prompting to enter the PIN code of the first SIM card and prompting the user to choose to store the mapping relationship between the ICCID of the SIM card and the PIN code of the SIM card. That is to say, when the user enables the PIN code verification function, the PIN code verification function can be enabled only after the user enters the PIN code of the first SIM card. In addition, when the terminal device may further prompt the user to choose to store the mapping relationship between the ICCID of the SIM card and the PIN code of the SIM card, the terminal device may automatically verify the PIN code. In this way, an enabling rate of the user is improved.

When collecting the PIN code of the first SIM card that is entered by the user, the terminal device may enable the PIN code verification function of the first SIM card. If a storage instruction entered by the user is received, where the storage instruction is for instructing to store the mapping relationship between the first ICCID and the PIN code of the first SIM card, the terminal device may store the mapping relationship between the first ICCID and the PIN code of the first SIM card. That the terminal device enables the PIN code verification function of the first SIM card may be understood as: The first SIM card stores the information about whether the PIN code verification function is enabled. When the PIN code verification function is not enabled, the "information about whether the PIN code verification function is enabled" may be identified as "disabled". When the PIN code verification function is enabled, the "information about whether to enable the PIN code verification function" may be identified as "enabled". The terminal device collects the PIN code of the first SIM card that is entered by the user, and may send an enabling instruction to the first SIM card. When receiving the enabling instruction, the first SIM card may identify the "information about whether to enable the PIN code verification function" as "enabled". In an embodiment, the enabling instruction sent by the terminal device to the first SIM card may further include the PIN code of the first SIM card, so that the first SIM card verifies the PIN code, and when the PIN code passes the verification, the "information about whether to enable the PIN code verification function" is identified as "enabled". In this manner, the terminal device may record a mapping relationship between the first ICCID, the PIN code corresponding to the first SIM card, storage information, and a phone number. The storage information may be information about whether to store the PIN code to which the first ICCID is mapped. In this manner, the storage information is specifically that the terminal device stores the PIN code to which the first ICCID is mapped, for example, the storage information is "Yes".

In an embodiment, if determining that the PIN code of the first SIM card that is entered by the user is a first PIN code, the terminal device outputs third prompt information, where the third prompt information is for prompting to change the first PIN code, and the first PIN code is an initial PIN code. In this manner, the terminal device may prompt the user to change the initial PIN code, so that security of the first SIM card can be improved. When collecting a second PIN code obtained after the user performs the change, the terminal device may store a mapping relationship between the first ICCID of the first SIM card and the PIN code obtained after the user performs the change.

If receiving, after outputting the first prompt information, a cancellation instruction entered by the user, the terminal device continues to output the first prompt information based on a preset prompt rule, so as to improve an enabling rate of the user. In this manner, each time the terminal device outputs the first prompt information, the terminal device may record a mapping relationship between the first ICCID, the PIN code corresponding to the first SIM card, storage information, a phone number, and the quantity of prompt times/prompt duration.

The terminal device outputs second prompt information if the terminal device determines that a quantity of times of outputting the first prompt information reaches the preset quantity of prompt times or duration of outputting the first prompt information reaches the preset prompt duration; and enables the PIN code verification function of the first SIM card if the PIN code of the first SIM card entered by the user is collected. In this manner, if the user has not enabled the PIN code verification function of the first SIM card, the terminal device may automatically enable the PIN code verification function of the first SIM card when the user enters the PIN code of the first SIM card, to improve security of the first SIM card.

In this manner, the terminal device may generate a second PIN code of the first SIM card, and store a mapping relationship between the first ICCID and the second PIN code. In a possible implementation, the terminal device may generate the second PIN code based on information about the first SIM card and/or information about the terminal device, where the information about the first SIM card includes at least one of the following: the first ICCID or a model of the first SIM card, and the information about the terminal device includes at least one of the following: an international mobile equipment identity IMEI of the terminal device or a lock screen password of the terminal device.

After generating the second PIN code, the terminal device may prompt the user that the PIN code of the first SIM card is changed, and then the user learns of the second PIN code, so that the user can enter the second PIN code of the first SIM card in a scenario in which the PIN code of the first SIM card needs to be manually entered. In this manner, the terminal device changes the PIN code of the first SIM card, and the terminal device may send the second PIN code to the first SIM card, so that the first SIM card stores the second PIN code. In an embodiment, the terminal device sends the PIN code of the first SIM card to the first SIM card, so that the first SIM card verifies the PIN code. When the PIN code passes the verification, the first SIM card may store the second PIN code.

In conclusion, the terminal device may store a mapping relationship between ICCIDs of at least one SIM card. The mapping relationship may include a mapping relationship between the first ICCID, the PIN code corresponding to the first SIM card, storage information, a phone number, and the quantity of prompt times/prompt duration.

In a possible implementation, the terminal device may query whether the mapping relationship includes the first ICCID if the PIN code verification function is not enabled for the first SIM card. If the mapping relationship does not include the first ICCID, the terminal device may determine that the first SIM card is inserted into the terminal device for the first time, and output the first prompt information, to prompt the user to enable the PIN code verification function of the first SIM card. The first prompt information is output if the mapping relationship includes a quantity of prompt times of the first prompt information to which the first ICCID is mapped and the quantity of prompt times is less than a preset quantity of prompt times, to prompt the user to enable the PIN code verification function of the first SIM card; or the first prompt information is output if the mapping relationship includes prompt duration of the first prompt information to which the first ICCID is mapped and the prompt duration is less than preset prompt duration.

In this implementation, the terminal device may prompt the user to enable the PIN code verification function of the first SIM card as much as possible. However, a problem that the user is troubled by excessive prompting is avoided, and user experience can be improved.

In an implementation, if the mapping relationship includes the PIN code to which the first ICCID is mapped, and the remaining quantity of verification times of the PIN code of the first SIM card is greater than or equal to the preset quantity of verification times, the PIN code to which the first ICCID is mapped is verified. If the mapping relationship includes the PIN code to which the first ICCID is mapped, and the remaining quantity of verification times of the PIN code of the first SIM card is less than the preset quantity of verification times, second prompt information is output, where the second prompt information is for prompting to enter the PIN code of the first SIM card.

In this implementation, when the remaining quantity of verification times of the PIN code is greater than or equal to the preset quantity of verification times, the terminal device automatically verifies the PIN code, so as to avoid a problem that the first SIM card is locked due to automatic verification of the PIN code.

In an implementation, if the mapping relationship does not include the PIN code to which the first ICCID is mapped, because the PIN code verification function is enabled for the first SIM card, the terminal device may output the second prompt information, to prompt to enter the PIN code of the first SIM card.

In an embodiment, the terminal device may first automatically verify the PIN code to which the first ICCID is mapped, and then verify the lock screen password of the terminal device. If a lock screen password is set for the terminal device, when receiving a verification result of the PIN code from the first SIM card, the terminal device may display the verification result on the lock screen interface of the terminal device. The lock screen interface of the terminal device is for prompting the user to enter a lock screen password, so as to verify the lock screen password entered by the user.

In an embodiment, the terminal device may first verify the lock screen password of the terminal device, and then automatically verify the PIN code to which the first ICCID is mapped when the lock screen password passes verification. Before performing an operation of automatically verifying the PIN code to which the first ICCID is mapped, for example, performing "determining whether the PIN code verification function is enabled for the first SIM card", the terminal device may display the lock screen interface of the terminal device, to prompt the user to enter a lock screen password. The terminal device may receive the lock screen password entered by the user, and verify the lock screen password entered by the user. When the lock screen password entered by the user passes the verification, the terminal device may perform an operation of automatically verifying the PIN code to which the first ICCID is mapped, for example, performing "determining whether the PIN code verification function is enabled for the first SIM card" and a subsequent operation. In this embodiment, the terminal device receives the verification result of the PIN code from the first SIM card, and may display the verification result on the unlocked interface of the terminal device. In this embodiment of this application, the PIN code may be verified by associating lock screen password verification. Before verifying the PIN code, the terminal device first verifies the lock screen password. The lock screen password protects the first SIM card, thereby improving security of the first SIM card. It should be understood that for a process in which the terminal device verifies the lock screen password entered by the user, refer to the current verification manner.

In a possible implementation, the terminal device may further assist the user in retrieving the PIN code. The second prompt information is for prompting to retrieve the PIN code of the first SIM card, and the user may trigger, based on the second prompt information, the terminal device to retrieve the PIN code of the first SIM card. In a first manner, the terminal device may receive a retrieval instruction for the entered PIN code of the first SIM card, obtain the first ICCID, query, in the mapping relationship, the PIN code to which the first ICCID is mapped, and output the PIN code to which the first ICCID is mapped. In a second manner, a server may store a mapping relationship between the first ICCID and the PIN code of the first SIM card. The mapping relationship stored in the server may be sent by the terminal device to the server, or may be sent by another terminal device to the server. When receiving the retrieval instruction for the entered PIN code of the first SIM card, the terminal device may obtain the first ICCID, and send the first ICCID to the server. The server may query the mapping relationship to obtain the PIN code to which the first ICCID is mapped, and then send the PIN code to which the first ICCID is mapped to the terminal device. The terminal device may output the PIN code to which the first ICCID is mapped.

According to a second aspect, an embodiment of this application provides an apparatus for verifying a PIN code, including: a SIM card verification agent module, configured to: query, when a first subscriber identity module SIM card is inserted into a powered-on terminal device or the terminal device into which the first SIM card is inserted is powered on, whether a mapping relationship includes a PIN code to which a first integrated circuit card identifier ICCID of the first SIM card is mapped; send the PIN code to the first SIM card if the mapping relationship includes the PIN code to which the first ICCID is mapped; and receive a verification result of the PIN code from the first SIM card.

In a possible implementation, the SIM card verification agent module is further configured to: determine whether a PIN code verification function is enabled for the first SIM card; and query, if the PIN code verification function is enabled for the first SIM card, whether a mapping relationship includes a PIN code to which a first integrated circuit card identifier ICCID of the first SIM card is mapped.

In a possible implementation, a human-computer interaction module is configured to output first prompt information if the PIN code verification function is not enabled for the first SIM card, where the first prompt information is for prompting to enable the PIN code verification function of the first SIM card.

In a possible implementation, the SIM card verification agent module is further configured to query whether the mapping relationship includes the first ICCID if the PIN code verification function is not enabled for the first SIM card. The human-computer interaction module is specifically configured to output the first prompt information if the mapping relationship does not include the first ICCID; output the first prompt information if the mapping relationship includes a quantity of prompt times of the first prompt information to which the first ICCID is mapped and the quantity of prompt times is less than a preset quantity of prompt times; or output the first prompt information if the mapping relationship includes prompt duration of the first prompt information to which the first ICCID is mapped and the prompt duration is less than preset prompt duration.

In a possible implementation, the SIM card verification agent module is specifically configured to verify the PIN code to which the first ICCID is mapped if the mapping relationship includes the PIN code to which the first ICCID is mapped, and the remaining quantity of verification times of the PIN code of the first SIM card is greater than or equal to the preset quantity of verification times.

In a possible implementation, the human-computer interaction module is further configured to output second prompt information if the mapping relationship includes the PIN code to which the first ICCID is mapped, and the remaining quantity of verification times of the PIN code of the first SIM card is less than the preset quantity of verification times, where the second prompt information is for prompting to enter the PIN code of the first SIM card.

In a possible implementation, the human-computer interaction module is further configured to output second prompt information if the mapping relationship does not include the PIN code to which the first ICCID is mapped, where the second prompt information is for prompting to enter the PIN code of the first SIM card.

In a possible implementation, the human-computer interaction module is further configured to output second prompt information if an enabling instruction entered by a user is received, where the second prompt information is for prompting to enter the PIN code of the first SIM card.

In a possible implementation, the human-computer interaction module is further configured to collect the entered PIN code of the first SIM card. The SIM card verification agent module is specifically configured to: enable the PIN code verification function of the first SIM card; and store a mapping relationship between the first ICCID and the PIN code of the first SIM card.

In a possible implementation, the human-computer interaction module is further configured to receive a storage instruction entered by the user, where the storage instruction is for instructing to store the mapping relationship between the first ICCID and the PIN code of the first SIM card.

In a possible implementation, the human-computer interaction module is further configured to output third prompt information if it is determined that the entered PIN code of the first SIM card is an initial PIN code, where the third prompt information is for prompting to change the initial PIN code.

In a possible implementation, the human-computer interaction module is further configured to output the first prompt information based on a preset prompt rule if a cancellation instruction entered by a user is received.

In a possible implementation, the SIM card verification agent module is further configured to: enable the PIN code verification function of the first SIM card if it is determined that a quantity of times of outputting the first prompt information reaches the preset quantity of prompt times or duration of outputting the first prompt information reaches the preset prompt duration; generate a second PIN code of the first SIM card; and store a mapping relationship between the first ICCID and the second PIN code.

In a possible implementation, the human-computer interaction module is further configured to output the second PIN code.

In a possible implementation, the human-computer interaction module is further configured to output second prompt information; and the SIM card verification agent module is further configured to enable the PIN code verification function of the first SIM card if the entered PIN code of the first SIM card is collected.

In a possible implementation, the SIM card verification agent module is specifically configured to generate the second PIN code based on information about the first SIM card and/or information about the terminal device, where the information about the first SIM card includes at least one of the following: the first ICCID or a model of the first SIM card, and the information about the terminal device includes at least one of the following: an international mobile equipment identity IMEI of the terminal device or a lock screen password of the terminal device.

In a possible implementation, a SIM card access module is specifically configured to send the second PIN code to the first SIM card.

In a possible implementation, the human-computer interaction module is further configured to display the verification result on a lock screen interface of the terminal device if the lock screen password is set for the terminal device.

In a possible implementation, the human-computer interaction module is further configured to: display a lock screen interface of the terminal device if a lock screen password is set for the terminal device, and receive a lock screen password entered by a user. The SIM card verification agent module is further configured to: verify the lock screen password entered by the user, and perform, if the lock screen password entered by the user passes verification, the "determining whether the PIN code verification function is enabled for the first SIM card" in the foregoing manner and a subsequent operation. In this implementation, the human-computer interaction module is further configured to display the verification result on the unlocked interface of the terminal device.

In a possible implementation, the human-computer interaction module is further configured to receive a retrieval instruction for the entered PIN code of the first SIM card; the SIM card access module is further configured to: obtain the first ICCID; and obtain the PIN code based on the first ICCID; and the human-computer interaction module is further configured to output the PIN code to which the first ICCID is mapped.

In a possible implementation, the SIM card verification agent module is further configured to query, in the mapping relationship, the PIN code to which the first ICCID is mapped.

In a possible implementation, a server stores the mapping relationship between the first ICCID and the PIN code. A communication module is configured to send the first ICCID to the server, and receive, from the server, the PIN code to which the first ICCID is mapped.

In a possible implementation, the communication module is further configured to send a mapping relationship between the first ICCID and the PIN code of the first SIM card to a server.

According to a third aspect, an embodiment of this application provides an apparatus for verifying a PIN code. The apparatus may be the terminal device in the first aspect or a chip in the terminal device. The apparatus for verifying a PIN code may include: a processor and a memory. The memory is configured to store computer-executable program code, and the program code includes instructions. When the processor executes the instruction, the instruction enables the apparatus for verifying a PIN code to perform the method in the first aspect or each possible implementation of the first aspect.

In a possible implementation, the apparatus for verifying a PIN code may further include a display device. The display device is configured to output prompt information and receive entered instructions. The prompt information includes first prompt information, second prompt information, and third prompt information. The instructions may include a storage instruction, an enabling instruction, and a cancellation instruction.

According to a fourth aspect, an embodiment of this application provides an apparatus for verifying a PIN code, including a unit, a module, or a circuit configured to perform the method provided in the first aspect or each possible implementation of the first aspect. The apparatus for verifying a PIN code may be a terminal device, or may be a module applied to the terminal device, for example, may be a chip applied to the terminal device.

According to a fifth aspect, an embodiment of this application provides a computer program product including instructions. When the instruction runs on a computer, the computer is enabled to perform the method in the first aspect or each possible implementation of the first aspect.

According to a sixth aspect, an embodiment of this application provides a computer-readable storage medium. The computer-readable storage medium stores instructions. When the instruction runs on a computer, the computer is enabled to perform the method in the first aspect or each possible implementation of the first aspect.

For beneficial effects of each possible implementation of the second aspect to the sixth aspect, refer to beneficial effects brought by the first aspect and each possible implementation of the first aspect. Details are not described herein again.

Embodiments of this application provide a method and an apparatus for verifying a personal identification number PIN code. The method includes: when a first SIM card is inserted into a powered-on terminal device or the terminal device into which the first SIM card is inserted is powered on, querying whether a mapping relationship includes a PIN code to which a first ICCID of the first SIM card is mapped; and sending the PIN code to which the first ICCID is mapped to the first SIM card if the mapping relationship includes the PIN code to which the first ICCID is mapped, to verify the PIN code to which the first ICCID is mapped. In this embodiment of this application, the terminal device may store the mapping relationship between the ICCID of the first SIM card and the PIN code of the first SIM card, and then can automatically verify the PIN code of the first SIM card, to avoid a problem that a user needs to manually enter the PIN code for a plurality of times when the terminal device enables the PIN code verification function of the first SIM card, thereby improving user experience.

BRIEF DESCRIPTION OF THE DRAWINGS

FIG. 4A-1 and FIG. 4A-2 are a schematic diagram of an interface of a terminal device according to an embodiment of this application;

FIG. 6-1 and FIG. 6-2 are a schematic diagram of another interface of a terminal device according to an embodiment of this application;

FIG. 11-1, FIG. 11-2, and FIG. 11-3 are a schematic diagram of another interface of a terminal device according to an embodiment of this application;

FIG. 15B-1 and FIG. 15B-2 are a schematic diagram of another interface of a terminal device according to an embodiment of this application;

FIG. 18-1 and FIG. 18-2 are a schematic diagram of another interface of a terminal device according to an embodiment of this application;

FIG. 20-1 and FIG. 20-2 are a schematic diagram of another interface of a terminal device according to an embodiment of this application;

DETAILED DESCRIPTION OF ILLUSTRATIVE EMBODIMENTS

Figure 1:
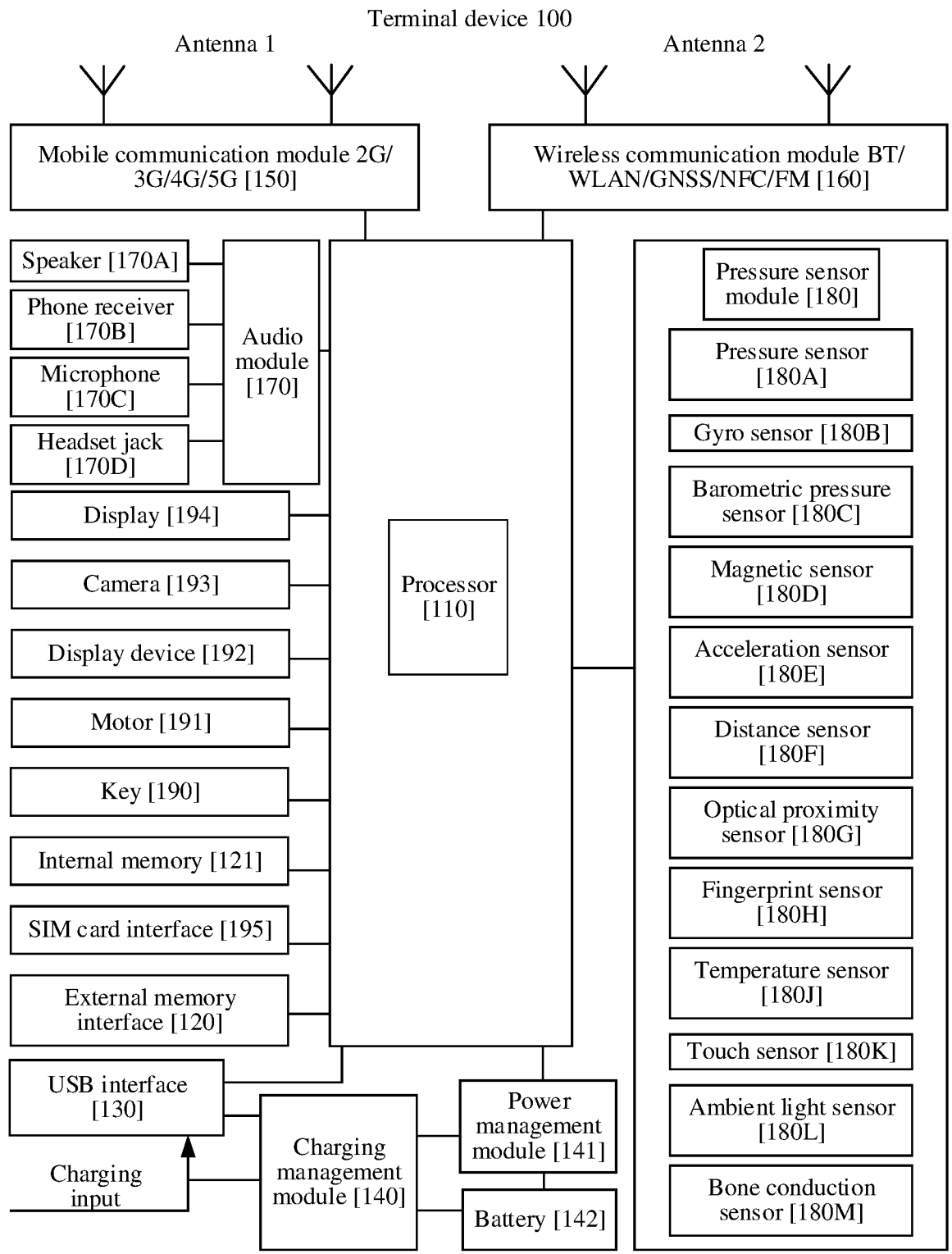
FIG. 1 is a schematic diagram of a structure of a terminal device according to an embodiment of this application.

FIG. 1 is a schematic diagram of a structure of a terminal device according to an embodiment of this application. The terminal device in this embodiment of this application may be referred to as user equipment (user equipment, UE), a mobile terminal (mobile terminal), a terminal (terminal), or the like. The terminal device may be a personal digital assistant (personal digital assistant, PDA), a handheld device having a wireless communication function, a computing device, an in-vehicle device, a wearable device, a virtual reality (virtual reality, VR) terminal device, an uncrewed aerial vehicle device, an augmented reality (augmented reality, AR) terminal device, a wireless terminal in industrial control (industrial control), a wireless terminal in self driving (self driving), a wireless terminal in smart city (smart city), a wireless terminal in smart home (smart home), or the like. A form of the terminal device is not specifically limited in this embodiment of this application.

As shown in FIG. 1, in some embodiments of this application, the terminal device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor 180, a key 190, a motor 191, an indicator 192, a camera 193, a display 194, a subscriber identity module (subscriber identity module, SIM) card interface 195, and the like. It can be understood that the structure shown in this embodiment does not constitute a specific limitation on the terminal device 100. In some other embodiments of this application, the terminal device 100 may include more or fewer components than those shown in the figure, or some components may be combined, or some components may be split, or a different component deployment may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display processing unit (display processing unit, DPU), and/or a neural-network processing unit (neural-network processing unit, NPU). Different processing units may be independent components, or may be integrated into one or more processors. In some embodiments, the terminal device 100 may alternatively include one or more processors 110. The processor may be a nerve center and a command center of the terminal device 100. The processor may generate an operating control signal according to an instruction operation code and a sequence signal, to complete control of fetching and executing an instruction. A memory may be further disposed in the processor 110, and is configured to store instructions and data. In some embodiments, the memory in the processor 110 is a cache. The memory may store instructions or data that has been used or cyclically used by the processor 110. If needing to use the instruction or the data again, the processor 110 may directly invoke the instruction or the data from the memory, thereby avoiding repetitive access and reducing waiting time of the processor 110, so that efficiency of the terminal device 100 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface. The USB interface 130 is an interface conforming to a USB standard specification, and may be specifically a Mini USB interface, a Micro USB interface, a USB Type-C interface, or the like. The USB interface 130 may be configured to connect to the charger to charge the terminal device 100, may also be configured to transmit data between the terminal device 100 and a peripheral device, and may also be configured to connect to a headset to play audios through the headset.

It can be understood that a schematic interface connection relationship between the modules in this embodiment of this application is an example for description, and constitutes no limitation on the structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the terminal device 100. The charging management module 140 may supply power to the terminal device 100 by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in the same device.

A wireless communication function of the terminal device 100 may be implemented by using the antenna 1, the antenna 2, the mobile communication module 150, the wireless communication module 160, the modem processor, the baseband processor, and the like. The antenna 1 and the antenna 2 are configured to send or receive an electromagnetic wave signal. Each antenna in the terminal device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the terminal device 100. The mobile communication module 150 may include at least one filter, a switch, a power amplifier, a low noise amplifier, and the like. The mobile communication module 150 may receive an electromagnetic wave through the antenna 1, perform processing such as filtering and amplification on the received electromagnetic wave, and send a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor no may be disposed in the same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Next, the demodulator sends the demodulated low-frequency baseband signal to the baseband processor for processing. The low-frequency baseband signal is processed by the baseband processor and then sent to an application processor. The application processor outputs a sound signal through an audio device (which is not limited to the speaker 170A, the phone receiver 170B, and the like), or displays an image or a video through the display 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication including a wireless local area network (wireless local area network, WLAN), Bluetooth, and a global navigation satellite system (global navigation satellite system, GNSS), frequency modulation (frequency modulation, FM), NFC, an infrared (infrared, IR) technology, and the like to be applied to the terminal device 100. The wireless communication module 160 may be one or more components into which at least one communication processing module is integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The terminal device 100 may implement a display function by using the GPU, the display 194, the application processor, and the like. The application processor may include an NPU and a DPU. The GPU is a microprocessor for image processing, and is connected to the display 194 and the application processor. The GPU is configured to perform mathematical and geometric calculation, and is configured to render graphics. The processor 110 may include one or more GPUs, and execute instructions to generate or change display information. The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the terminal device 100, for example, image recognition, facial recognition, voice recognition, and text understanding. The DPU is also referred to as a display sub-system (Display Sub-System, DSS). The DPU is configured to adjust a color of screens of the display 194, and the DPU may adjust a color of screens of the display by using a three-dimensional lookup table (3D lookup table, 3D LUT). The DPU can further perform processing on an image, such as scaling, noise reduction, contrast enhancement, backlight brightness management, HDR processing, and display parameter Gamma adjustment.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the terminal device 100 may include one or N displays 194, and N is a positive integer greater than 1.

The terminal device 100 may implement a photographing function by using the ISP, one or more cameras 193, the video codec, the GPU, one or more displays 194, the application processor, and the like.

The external memory interface 120 may be configured to connect to an external storage card, for example, a micro SD card, to expand a storage capability of the terminal device 100. The external storage card communicates with the processor 110 by using the external memory interface 120, to implement a data storage function, for example storing a data file such as music, a photo, or a video in the external storage card.

The internal memory 121 may be configured to store one or more computer programs, and the one or more computer programs include instructions. The processor 110 may run the instruction stored in the internal memory 121, so that the terminal device 100 performs various functional applications, data processing, and the like. The internal memory 121 may include a program storage region and a data storage region. The program storage region may store the operating system, and may further store one or more applications (such as a gallery and a contact), and the like. The data storage region may store data (such as a picture and a contact) and the like created when the terminal device 100 is used. In addition, the internal memory 121 may include a high-speed random access memory, or may include a non-volatile memory such as at least one magnetic disk memory, a flash memory, or a universal flash storage (universal flash storage, UFS). In some embodiments, the processor 110 may run the instructions stored in the internal memory 121 and/or the instructions stored in the memory disposed in the processor 110, so that the terminal device 100 performs various function applications and data processing.

The terminal device 100 may implement an audio function by using the audio module 170, the loudspeaker 170A, the phone receiver 170B, the microphone 170C, the headset jack 170D, the application processor, and the like, for example, music playback, or recording. The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110. The loudspeaker 170A, also referred to as a "speaker", is configured to convert an audio electrical signal into a sound signal. The terminal device 100 may be used to listen to music or answer a call in a hands-free mode by using the loudspeaker 170A. The phone receiver 170B, also referred to as a "receiver", is configured to convert an audio electrical signal into a sound signal. When the terminal device 100 is configured to answer a call or receive voice information, the phone receiver 170B may be put close to a human ear to receive a voice. The microphone 170C, also referred to as a "mouthpiece" or a "megaphone", is configured to convert a sound signal into an electrical signal. When making a call or sending voice information, a user may make a sound near the microphone 170C through the mouth of the user, to input a sound signal into the microphone 170C. At least one microphone 170C may be disposed in the terminal device 100. In some other embodiments, two microphones 170C may be disposed in the terminal device 100, to collect a sound signal and also implement a noise reduction function. In some other embodiments, three, four, or more microphones 170C may be alternatively disposed in the terminal device 100, to implement sound signal collection and noise reduction, also recognize a sound source, and implement a directional recording function, and the like. The headset jack 170D is configured to connect to a wired headset. The headset jack 170D may be a USB interface 130, may be a 3.5 mm open mobile terminal platform (open mobile terminal platform, OMTP) standard interface, or may be a cellular telecommunications industry association of the USA (cellular telecommunications industry association of the USA, CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

The key 190 includes a power key, a volume key, and the like. The key 190 may be a mechanical key or may be a touch key. The terminal device 100 may receive a key input, and generate a key signal input related to user setting and function control of the terminal device 100.

The SIM card interface 195 is configured to connect to a SIM card. The SIM card may be inserted into the SIM card interface 195 or plugged from the SIM card interface 195, to come into contact with or be separated from the terminal device 100. The terminal device 100 may support one or N SIM card interfaces. N is a positive integer greater than 1. The SIM card interface 195 can support a nano-SIM card, a micro-SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The terminal device 100 interacts with a network by using a SIM card, to implement functions such as a call and data communication. In some embodiments, the terminal device 100 uses an embedded-SIM card, namely, an eSIM (embedded-SIM) card, and the eSIM card may be embedded in the terminal device 100. A pluggable SIM card may be disposed in the terminal device in this embodiment of this application, or an embedded-SIM card is disposed in the terminal device. It should be understood that a method provided in embodiments of this application is applicable to a terminal device in which a SIM card and/or an eSIM card is disposed. In the following embodiments, an example in which a SIM card is disposed in the terminal device is used for description.

Figure 2:
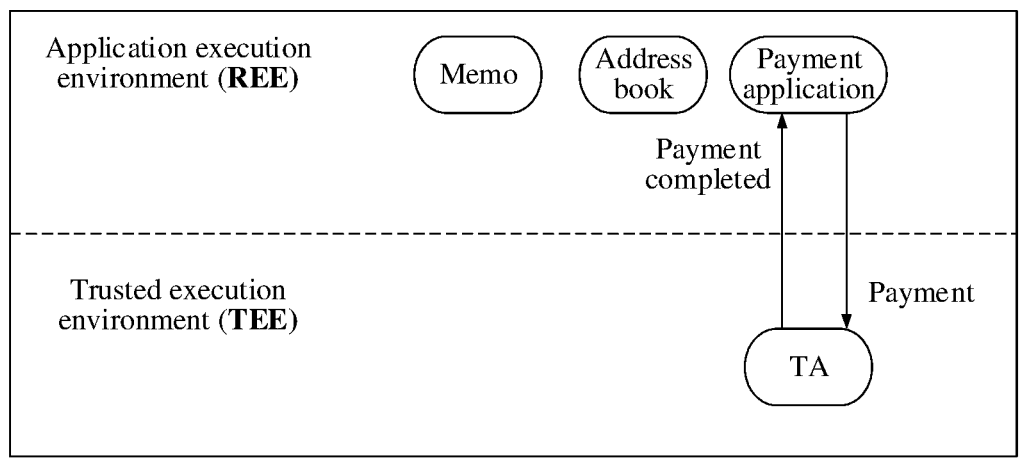
FIG. 2 is a schematic diagram of another structure of a terminal device according to an embodiment of this application.

FIG. 2 is a schematic diagram of another structure of a terminal device according to an embodiment of this application. The terminal device includes a rich execution environment (rich execution environment, REE) and a trusted execution environment (trusted execution environment, TEE). The REE may also be referred to as a normal world (normal world), and the TEE may also be referred to as a secure world (secure world). The TEE and the REE are independent environments that coexist in the terminal device, and the TEE may provide a security service for an application in the REE. It should be understood that the TEE may be an independent security zone in the terminal device. The terminal device may protect data in the TEE by using hardware and/or software, to ensure confidentiality and integrity of the data in the TEE. That is to say, the data running in the TEE is confidential and cannot be tampered with. At least one application such as a memo, an address book, or a payment application may run in the REE. For operations that have a high security requirement in the application, such as fingerprint comparison and private key signature during payment, a trusted application (trusted application, TA) running in the TEE is required to perform these operations to prevent fingerprint passwords, private keys, and the like from being maliciously stolen.

The TEE may include a predefined TA, and the TEE may provide a uniform trusted application programming interface (application programming interface, API). An application in the REE may invoke the trusted API to interact with a TA that corresponds to the application and that is in the TEE, so that the application reads and writes data in the TEE. For example, when a user makes a payment by using a payment application, the payment application may invoke the trusted API to interact with a payment TA in the TEE, so that the payment TA completes a payment step in the TEE. Data in the TEE can be accessed only by the TA, and applications in the REE cannot be accessed.

It should be understood that FIG. 2 does not constitute a limitation on the execution environments in the terminal device. In an embodiment, the terminal device may further include a secure element (secure element, SE) whose security level is higher than that of the TEE. The SE may be, for example, a secure smart card. It should be noted that, in this embodiment of this application, the terminal device may protect data in the REE by using hardware and/or software in the REE. For example, a security zone may be preset in the REE, so that the data stored in the security zone in the REE is confidential and cannot be tampered with. The security zone in the REE is, for example, a password safe. A form of the security zone in the terminal device is not limited in embodiments of this application, and the data in the security zone is confidential and cannot be tampered with. For example, that the terminal device protects data by using software may be: The terminal device uses a permission authentication mechanism to perform permission authentication to protect the data in the security zone. For example, that the terminal device protects data by using hardware may be: The terminal device protects the data in the security zone by using a method such as a security card or a security chip.

The SIM card is a card that contains an integrated circuit. Internal storage space of the SIM card can store five types of data: fixedly stored data, temporarily stored network-related data, service data, user data, and application data. The fixedly stored data may be data written before the SIM card is sold, for example, an international mobile subscriber identity (international mobile subscriber identity, IMSI), where the IMSI is information required when the SIM card registers with a network. The temporarily stored network-related data is, for example, a location area identity (location area identity, LAI) or an access-prohibited public telephone network code. The service data may include a personal identification number (personal identification number, PIN) code of the SIM card, a charging rate, and the like. A personal identification password of the SIM card is referred to as a "PIN code" below. The user data may include a phone book. The application data may include a digital certificate, and the digital certificate may be understood as an identity of the SIM card in a network. The digital certificate can perform various processing such as encryption, decryption, digital signature, and signature authentication on data transmitted by the SIM card in the network to ensure accuracy of the transmitted data.

Currently, a user usually uses a telephone number as user account numbers of various applications. When the user registers, logs, or performs authentication in a terminal device, a server corresponding to an application sends a verification code to the telephone number of the user. If the SIM card is lost, a malicious user may insert the SIM card into another terminal device and use a verification code to log in to various applications, threatening privacy and property security of the user. For example, a malicious user logs in to a payment application by using a verification code, and transfers money stored by the user in the payment application, causing a loss to property of the user. Currently, if the user loses the SIM card, the user may report the loss of the SIM card, so as to avoid privacy and property loss of the user. However, if the user does not report the loss in time, the user will still lose.

To prevent the SIM card lost by the user from being used in another terminal device, the user may enable a PIN code verification function of the SIM card in advance. When the PIN code verification function of the SIM card is enabled, when the SIM card is inserted into another terminal device or the terminal device is powered on, the terminal device verifies the PIN code of the SIM card. For example, the terminal device may display an interface for entering a PIN code of the SIM card, and collect a PIN code of the SIM card entered by the user. A manner in which the terminal device verifies the PIN code of the SIM card may be: The internal storage space of the SIM card stores the PIN code of the SIM card, the terminal device sends the PIN code entered by the user to the SIM card, the SIM card compares the PIN code stored in the internal storage space with the PIN code from the terminal device for verification, and the SIM card may feed back a PIN code verification result to the terminal device. If the PIN code in the internal storage space of the SIM card is the same as the PIN code from the terminal device, the PIN code passes the verification, and then the SIM card may feed back a message indicating that the PIN code passes the verification to the terminal device, to enable the terminal device to use (or access) the SIM card. If the PIN code in the internal storage space of the SIM card is different from the PIN code from the terminal device, the PIN code does not pass the verification, and then the SIM card may feed back a message indicating that the PIN code does not pass the verification to the terminal device, to disable the terminal device from using the SIM card. When the user enables the PIN code verification function of the SIM card, if the malicious user does not know the PIN code of the SIM card, the malicious user cannot use the SIM card. However, currently, after the user enables the PIN code verification function of the SIM card, the user needs to enter the PIN code of the SIM card each time the terminal device is powered on, to verify the PIN code, and an operation is complex. In addition, a quantity of times that the PIN code of the SIM card is entered by the user is limited by a preset quantity of verification times. If the PIN code of the SIM card is incorrectly entered for three consecutive times, the SIM card is automatically locked and cannot be used. In this case, the user needs to contact an operator to obtain a PIN unlock key (personal identification number unlock key, PUK) to unlock the SIM card.

An embodiment of this application provides a method for verifying a PIN code. When a user enables a PIN code verification function of a SIM card, a terminal device may store a PIN code of the SIM card, and then each time the terminal device is powered on, the terminal device may automatically verify the PIN code based on the stored PIN code of the SIM card. This method can avoid a problem that the user needs to enter the PIN code each time the terminal device is powered on, thereby improving user experience.

Figure 3:
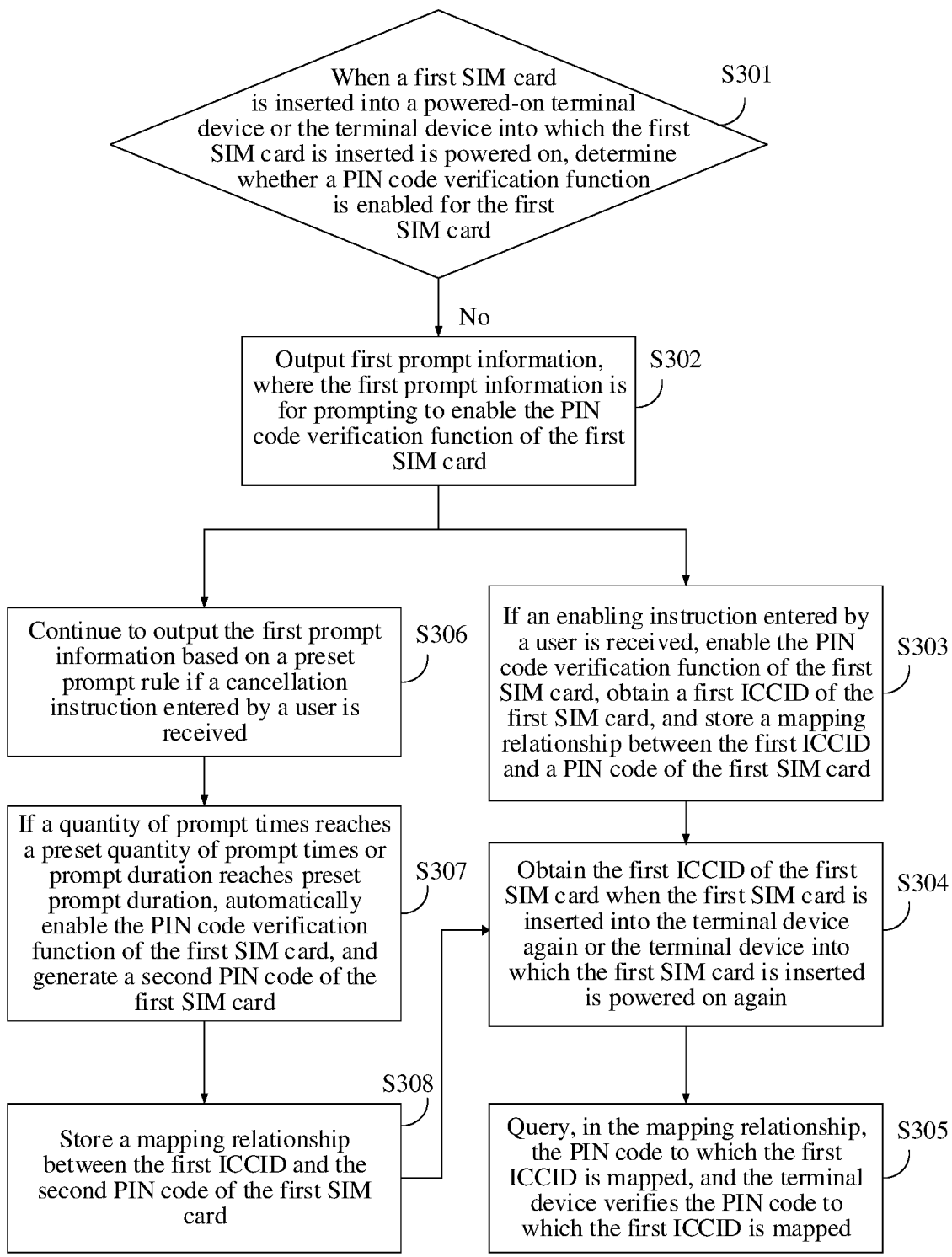
FIG. 3 is a schematic flowchart of an embodiment of a method for verifying a PIN code according to an embodiment of this application.

The following describes the method for verifying a PIN code provided in embodiments of this application with reference to specific embodiments. The following embodiments may be combined with each other, and a same or similar concept or process is not described again. FIG. 3 is a schematic flowchart of an embodiment of a method for verifying a PIN code according to an embodiment of this application. As shown in FIG. 3, the method for verifying a PIN code provided in this embodiment of this application may include:

S301: When a first SIM card is inserted into a powered-on terminal device or the terminal device into which the first SIM card is inserted is powered on, determine whether a PIN code verification function is enabled for the first SIM card.

S302: Output first prompt information if the PIN code verification function is not enabled for the first SIM card, where the first prompt information is for prompting to enable the PIN code verification function of the first SIM card.

S303: If an enabling instruction entered by a user is received, enable the PIN code verification function of the first SIM card, obtain a first integrated circuit card identifier (integrated circuit card identifier, ICCID) of the first SIM card, and store a mapping relationship between the first ICCID and a PIN code of the first SIM card.

S304: Obtain the first ICCID of the first SIM card when the first SIM card is inserted into the terminal device again or the terminal device into which the first SIM card is inserted is powered on again.

S305: Query, in the mapping relationship, the PIN code to which the first ICCID is mapped, and the terminal device verifies the PIN code to which the first ICCID is mapped.

In S301, in a possible implementation, if the first SIM card is inserted into the terminal device, when being powered on, the terminal device needs to perform network access registration, that is, IMSI attach (IMSI attach) on the first SIM card, so that the terminal device can access the Internet by using the SIM card. When performing network access registration on the first SIM card, the terminal device may determine whether the PIN code verification function is enabled for the first SIM card. If the PIN code verification function is enabled for the first SIM card, each time the terminal device is powered on, the terminal device needs to verify the PIN code of the first SIM card. The user may enable the PIN code verification function of the first SIM card on a setting interface of the terminal device, or the terminal device may automatically enable the PIN code verification function of the first SIM card. In a possible implementation, the terminal device supports hot swap of the SIM card. When the terminal device is in a powered-on state, the user inserts the first SIM card into the terminal device, and the terminal device may receive a card insertion signal (for example, a level signal) from a card slot, then determine that a SIM card is inserted into the terminal device, and then perform network access registration on the SIM card. Similarly, when performing network access registration on the first SIM card, the terminal device may determine whether the PIN code verification function is enabled for the first SIM card.

The terminal device may interact with the first SIM card to obtain information about the first SIM card. The information about the first SIM card may include: information such as a type of the first SIM card, information about whether the PIN code verification function is enabled for the first SIM card, and a remaining quantity of verification times of the PIN code remaining when the PIN code is enabled for the first SIM card. For example, the type of the first SIM card may be global system for mobile communications (global system for mobile communications, GSM) or telecommunications (telecom). For example, when the terminal device into which the first SIM card is inserted is powered on or when the first SIM card is inserted into the powered-on terminal device, the terminal device may send a select EF 3f00 command to the first SIM card, to obtain the information about the first SIM card. When receiving the select EF 3f00 command, the first SIM card may feed back the information about the first SIM card to the terminal device. For a field of the fed-back information about the first SIM card, refer to the TS 102221 protocol in the 3rd Generation Partnership Project (3rd Generation Partnership Project, 3GPP). Therefore, the terminal device may learn of whether the PIN code verification function is enabled for the first SIM card. For a process of interaction between the terminal device and the first SIM card, refer to the TS 102221 protocol.

It should be understood that if the first SIM card is an eSIM card, S301 may be replaced with: When the terminal device into which the first SIM card is inserted is powered on, determine whether a PIN code verification function is enabled for the first SIM card.

In S302, if the terminal device determines that the PIN code verification function is not enabled for the first SIM card, the terminal device may output first prompt information, where the first prompt information is for prompting the user to enable the PIN code verification function of the first SIM card. It should be noted that currently, the user needs to enable the PIN code verification function of the first SIM card in the setting interface of the terminal device. However, if the user does not know a location of a control for enabling the PIN code verification function of the first SIM card, the PIN code verification function of the first SIM card may not be enabled. In this embodiment of this application, the terminal device may prompt the user to enable the PIN code verification function of the first SIM card, and then guide the user to enable the PIN code verification function of the first SIM card, so as to avoid a problem that the user needs to turn the setting interface for a plurality of times to search for the control for enabling the PIN code verification function of the first SIM card, thereby improving user experience.

Figures 1, 4A:
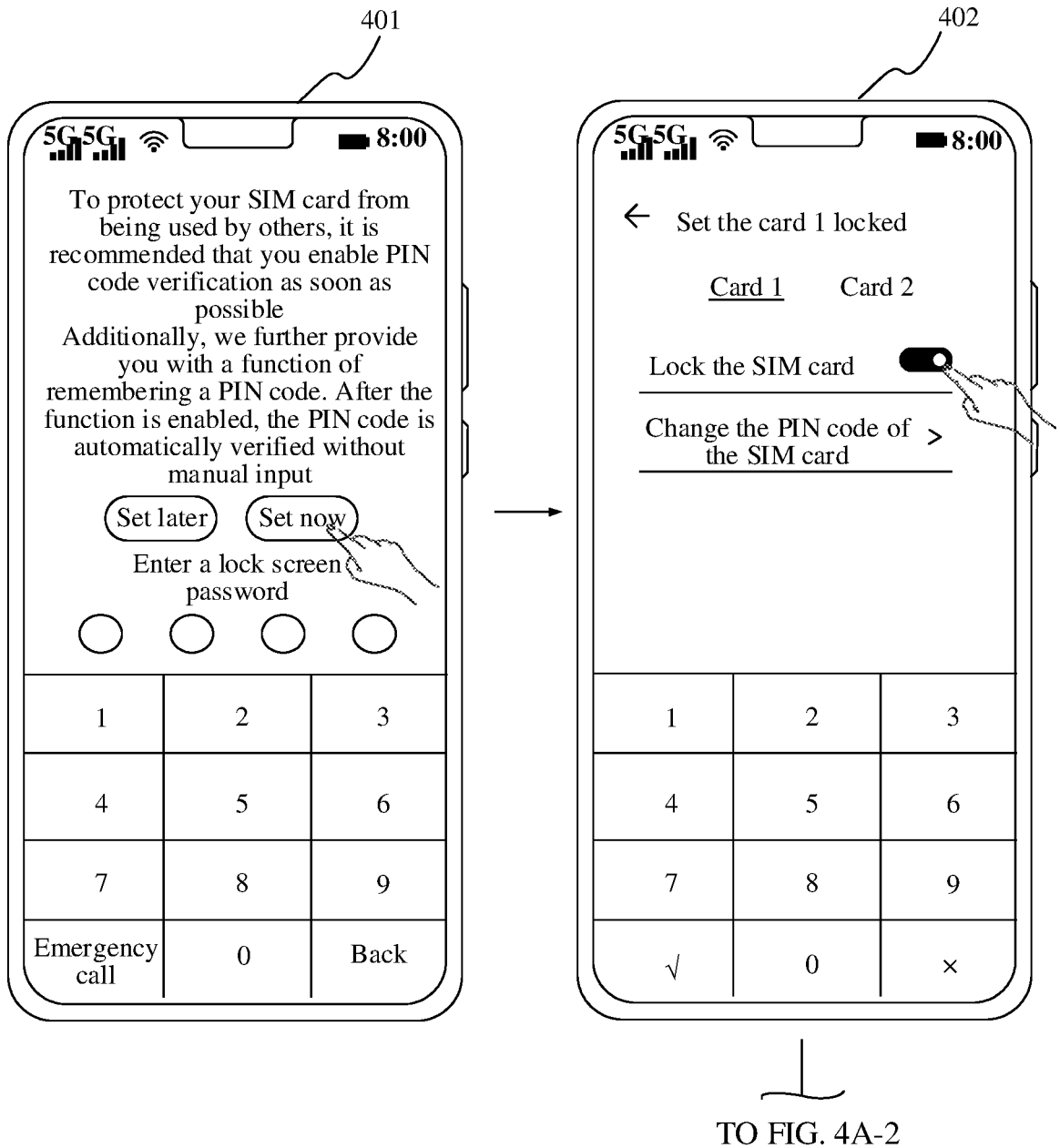
Figures 2, 4A:
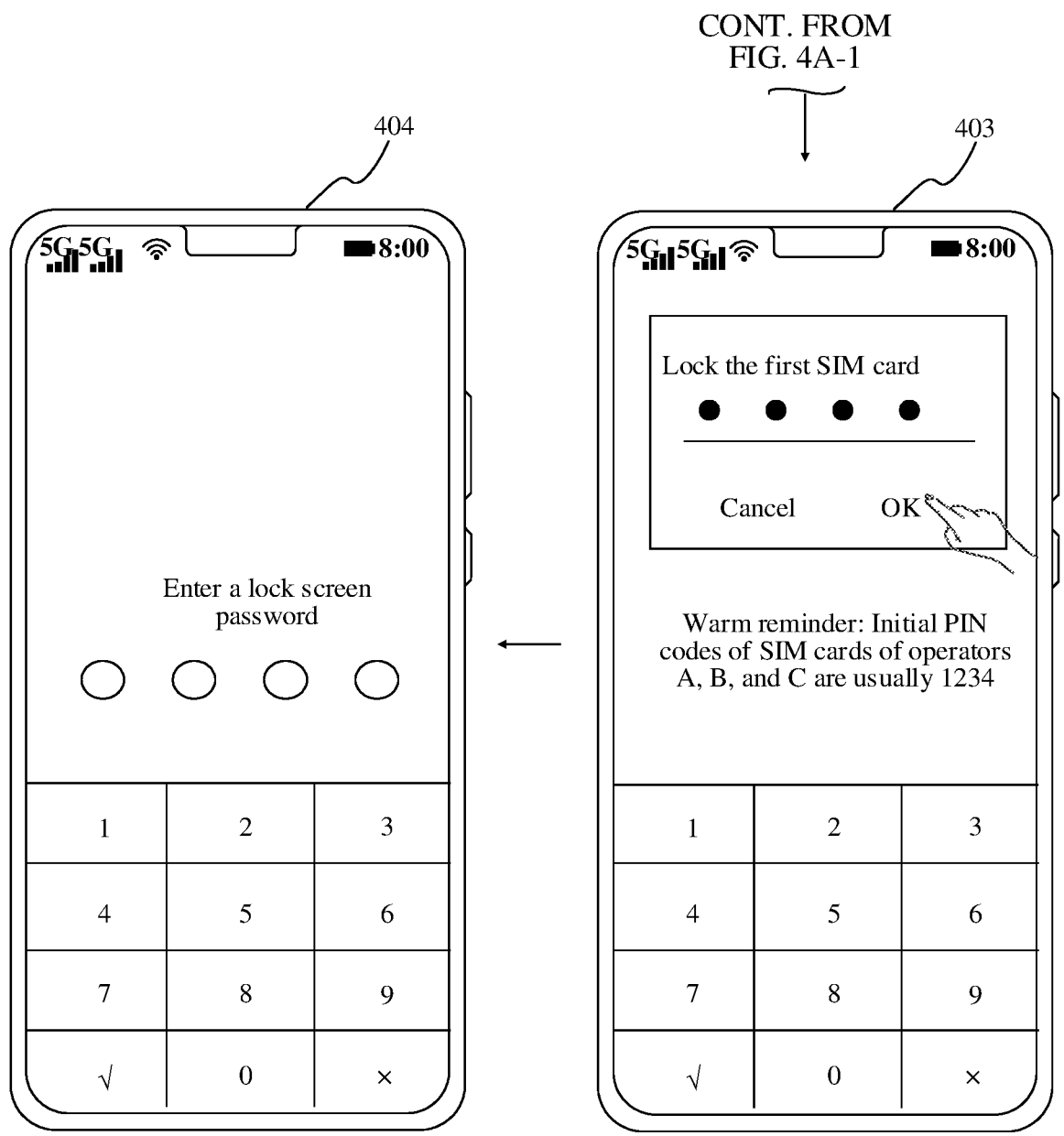

In some other embodiments of this application, the terminal device may output the first prompt information by using an interface prompt or a voice prompt. For example, when the terminal device is powered on, if a lock screen password is set for the terminal device, the terminal device may prompt, on a lock screen interface, the user to enable the PIN code verification function of the first SIM card. FIG. 4A-1 and FIG. 4A-2 are a schematic diagram of an interface of a terminal device according to an embodiment of this application. An interface 401 is a lock screen interface shown after the terminal device is powered on. The lock screen interface may display prompt information such as "To protect your SIM card from being used by others, it is recommended that you enable PIN code verification as soon as possible". A user may tap the prompt information, to enable a PIN code verification function of a first SIM card. Optionally, the interface may further display prompt information "Additionally, we further provide you with a function of remembering a PIN code. After the function is enabled, the PIN code is automatically verified without manual input", so as to prompt an advantage of automatic PIN code verification. Optionally, by tapping a location outside the prompt information, the user may cancel enabling of the PIN code verification function of the first SIM card. Alternatively, the interface 401 may further display a "Set later" control and a "Set now" control, so as to guide the user to choose.

It can be understood that after the terminal device is powered on, voice prompt information "To protect your SIM card from being used by others, it is recommended that you enable PIN code verification as soon as possible" may be played, and the "Set later" control and the "Set now" control are displayed on the lock screen interface, so as to guide the user to enable the PIN code verification function of the first SIM card. The user may select the "Set later" control to not enable the PIN code verification function of the first SIM card, or the user may select the "Set now" control to enable the PIN code verification function of the first SIM card. Alternatively, a "Set" control may be displayed on the lock screen interface, and the user may select the "Set" control to enable the PIN code verification function of the first SIM card, or the user may not select the "Set" control, and tap any location outside the "Set" control on the interface to not enable the PIN code verification function of the first SIM card. An interface that prompts the user to enable the PIN code verification function of the first SIM card is not limited in embodiments of this application.

Figure 5:
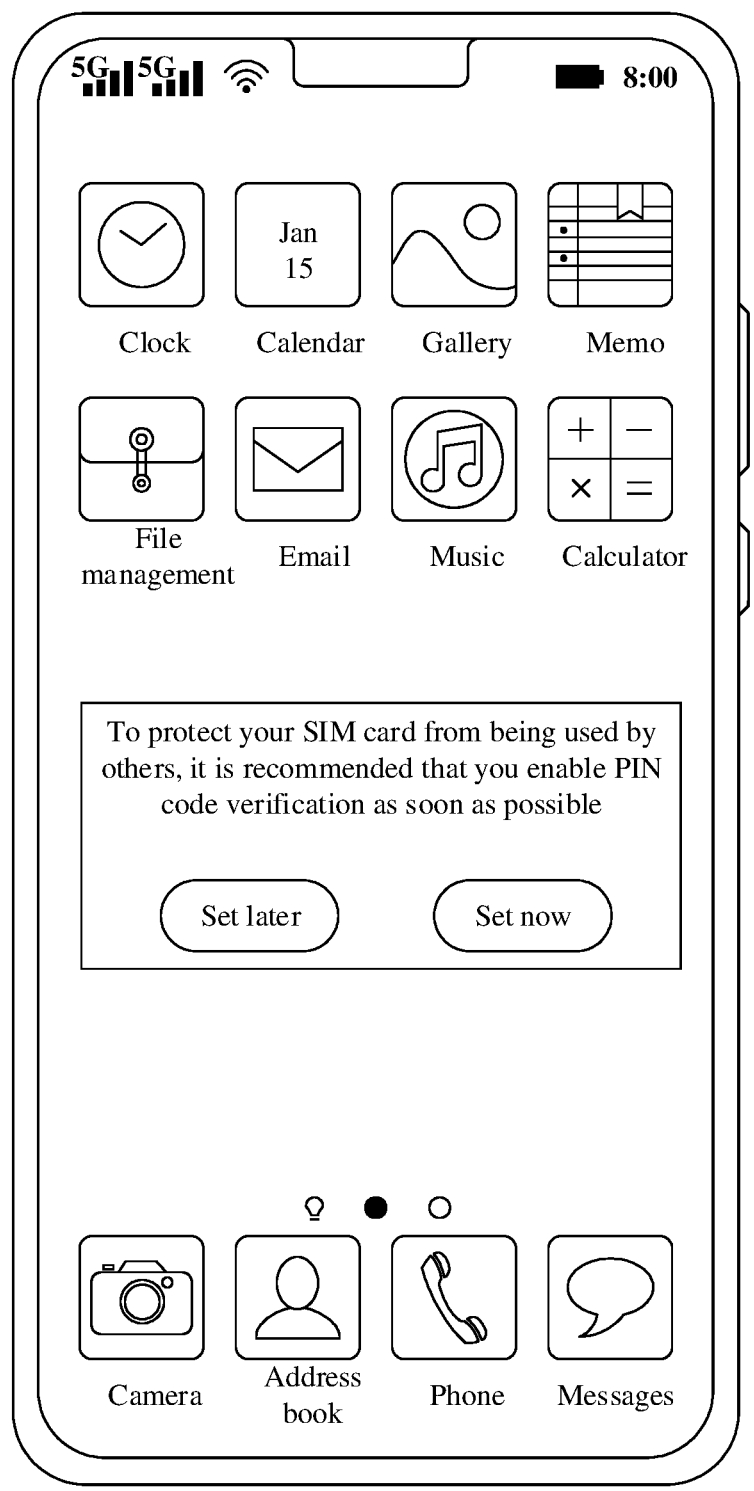
FIG. 5 is a schematic diagram of another interface of a terminal device according to an embodiment of this application.
Figures 1, 6:
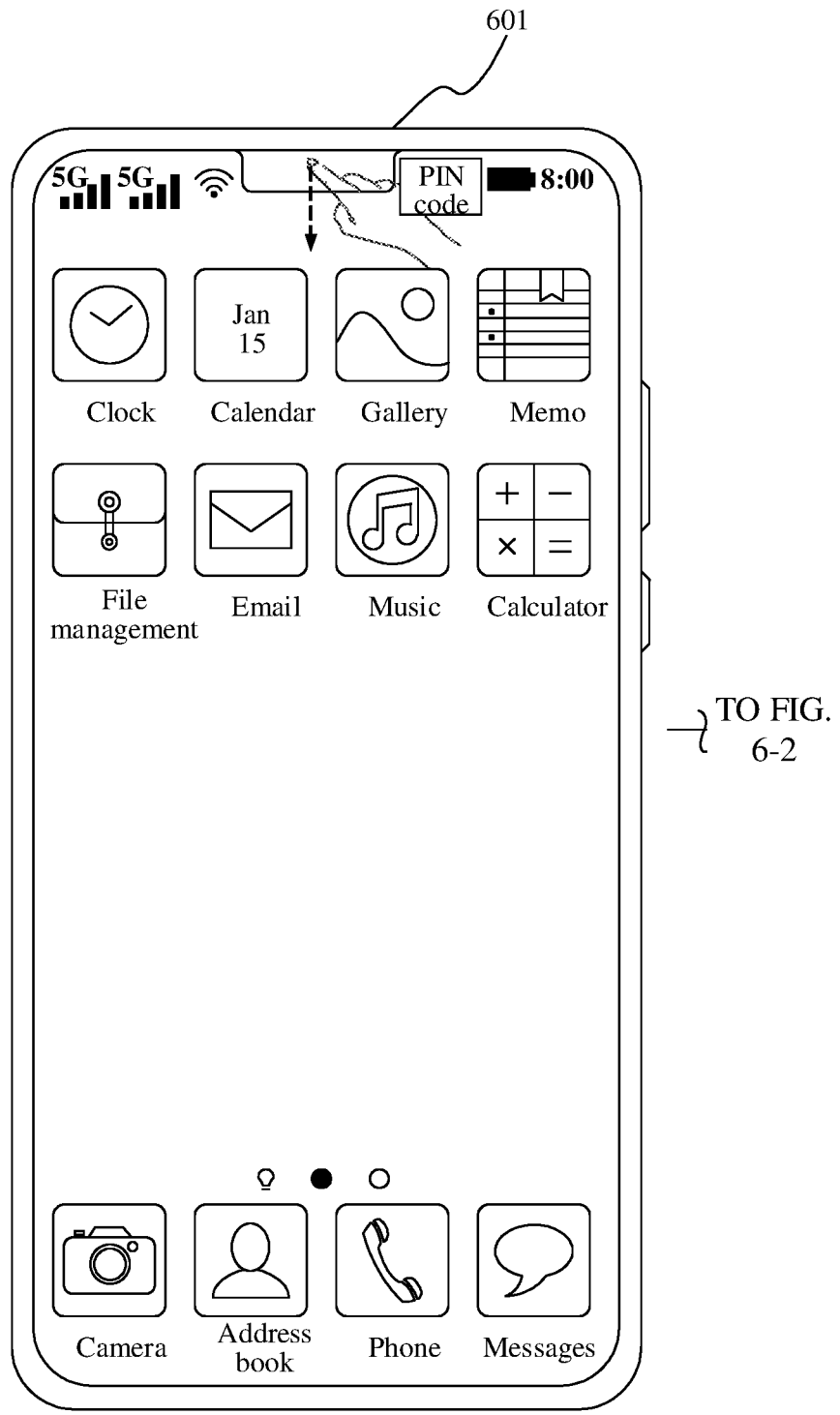
Figures 2, 6:
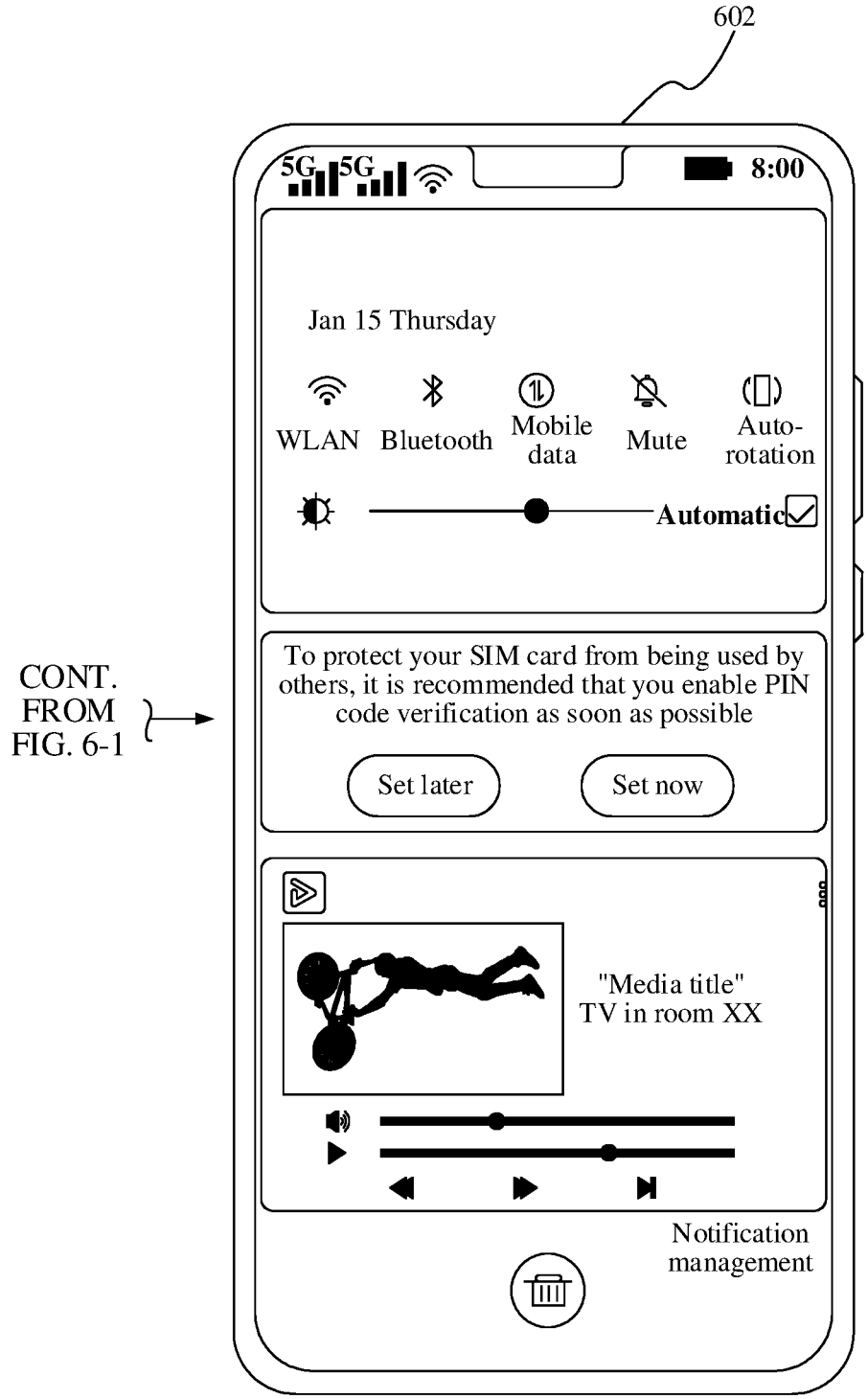

In a possible implementation, when the terminal device is powered on, if no lock screen password is set for the terminal device, the terminal device may display, after being powered on, a home page. In this embodiment of this application, the terminal device may prompt, on the home page, the user to enable the PIN code verification function of the first SIM card, for example, may prompt, on the home page, the user to enable the PIN code verification function of the first SIM card by using a pop-up window or a drop-down status bar. FIG. 5 is a schematic diagram of another interface of a terminal device according to an embodiment of this application. As shown in FIG. 5, the terminal device prompts, on a home page, a user to enable a PIN code verification function of a first SIM card in a form of a pop-up box. The pop-up box may include the same text and controls as those in FIG. 4A-1 and FIG. 4A-2. FIG. 6-1 and FIG. 6-2 are a schematic diagram of another interface of a terminal device according to an embodiment of this application. As shown in FIG. 6-1 and FIG. 6-2, the terminal device prompts, by using a drop-down status bar on a home page, a user to enable a PIN code verification function of a first SIM card. For example, a prompt icon may be displayed on the top of the home page, for example, a prompt icon of "PIN code" is displayed on the top of an interface 601. When the user pulls down the status bar, as shown in an interface 602, prompt information indicating that the PIN code verification function of the first SIM card is enabled is displayed in the status bar on the interface 602. The prompt information is similar to that shown in FIG. 4A-1 and FIG. 4A-2 and FIG. 5, and details are not described herein again.

Figure 7:
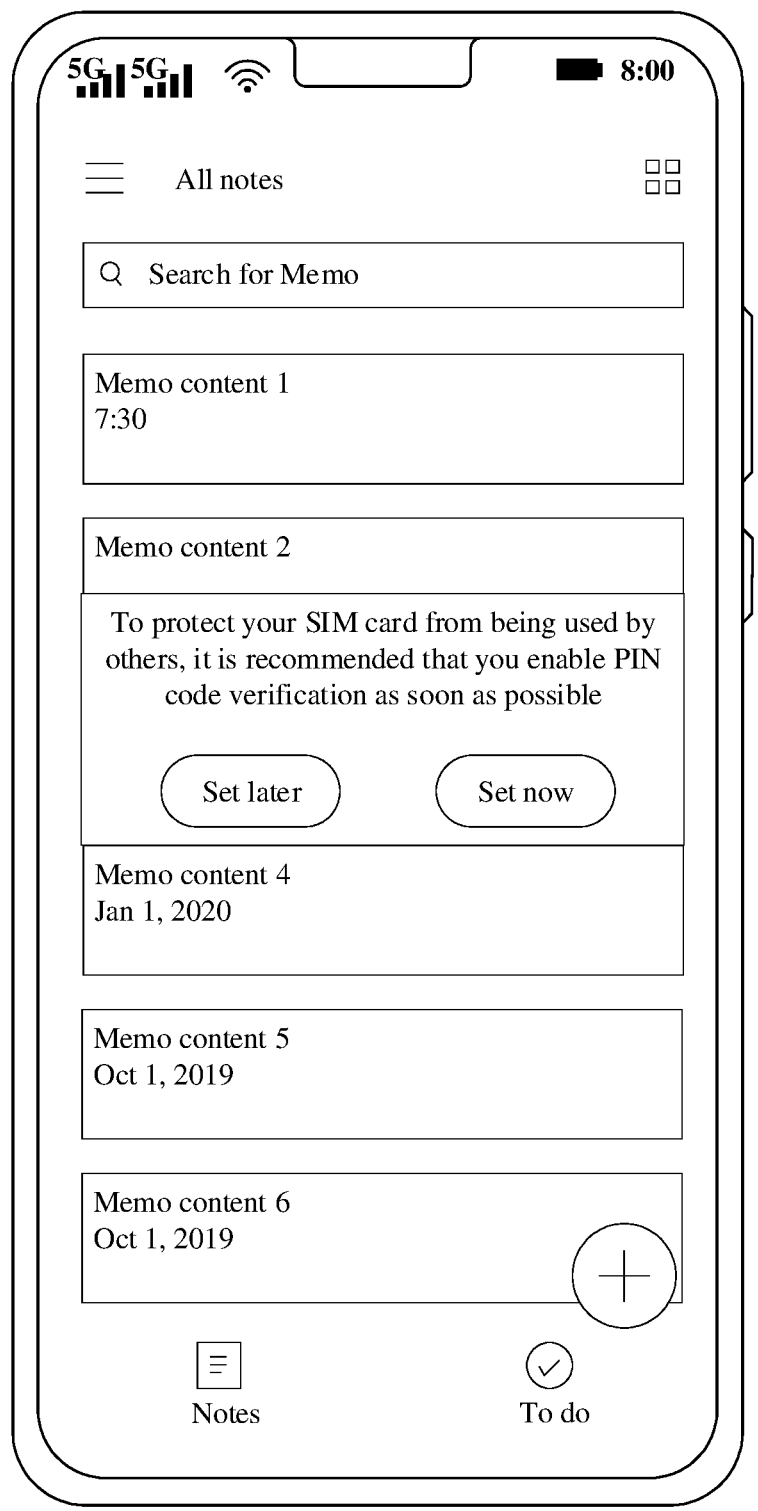
FIG. 7 is a schematic diagram of another interface of a terminal device according to an embodiment of this application.

In a possible implementation, when the first SIM card is inserted into the terminal device, an interface of the terminal device may be an interface currently used by the user, for example, a setting interface or an application interface. Using an example in which when a first SIM card is inserted into a terminal device, the terminal device displays a memo application interface, FIG. 7 is a schematic diagram of another interface of a terminal device according to an embodiment of this application. The terminal device may prompt, by using a pop-up box or a drop-down status bar on the memo application interface, a user to enable a PIN code verification function of a first SIM card. In FIG. 7, a form of the pop-up box is used as an example for description. For a form of the drop-down status bar, refer to FIG. 6-1 and FIG. 6-2.

In S303, the enabling instruction is for instructing to enable the PIN code verification function of the first SIM card. The enabling instruction may be entered by the user in a form of voice, or entered by the user in a form of an operation prompt interface. For example, if the user taps the "Set now" control in FIG. 4A-1 and FIG. 4A-2, FIG. 5, FIG. 6-1 and FIG. 6-2, or FIG. 7, input of the enabling instruction into the terminal device may be triggered. Alternatively, if the user says "Enable" in a voice form, input of the enabling instruction into the terminal device may also be triggered. The enabling instruction represents that the user agrees to enable the PIN code verification function of the first SIM card. If the terminal device receives the enabling instruction entered by the user, (for example, the "Set now" control is tapped or "Enable" is said), the terminal device may enable the PIN code verification function of the first SIM card. In other words, when a condition that the PIN code of the first SIM card needs to be verified is satisfied next time, the terminal device may display an interface on which the user needs to enter the PIN code of the first SIM card. The condition that the PIN code of the first SIM card needs to be verified may be, for example, that the terminal device is powered on again or that the first SIM card is inserted again after the first SIM card is removed.

It should be understood that, that the terminal device enables the PIN code verification function of the first SIM card may be understood as: The first SIM card stores a status of the PIN code verification function as "Disable", the terminal device sends an enabling instruction to the first SIM card, and the first SIM card modifies information that is about whether the PIN code verification function is enabled for the first SIM card and that is stored in the first SIM card. For example, the first SIM card may change a state of whether the PIN code verification function is enabled for a SIM card from "Disable" to "Enable", so as to enable the PIN code verification function of the first SIM card.

Figure 4B:
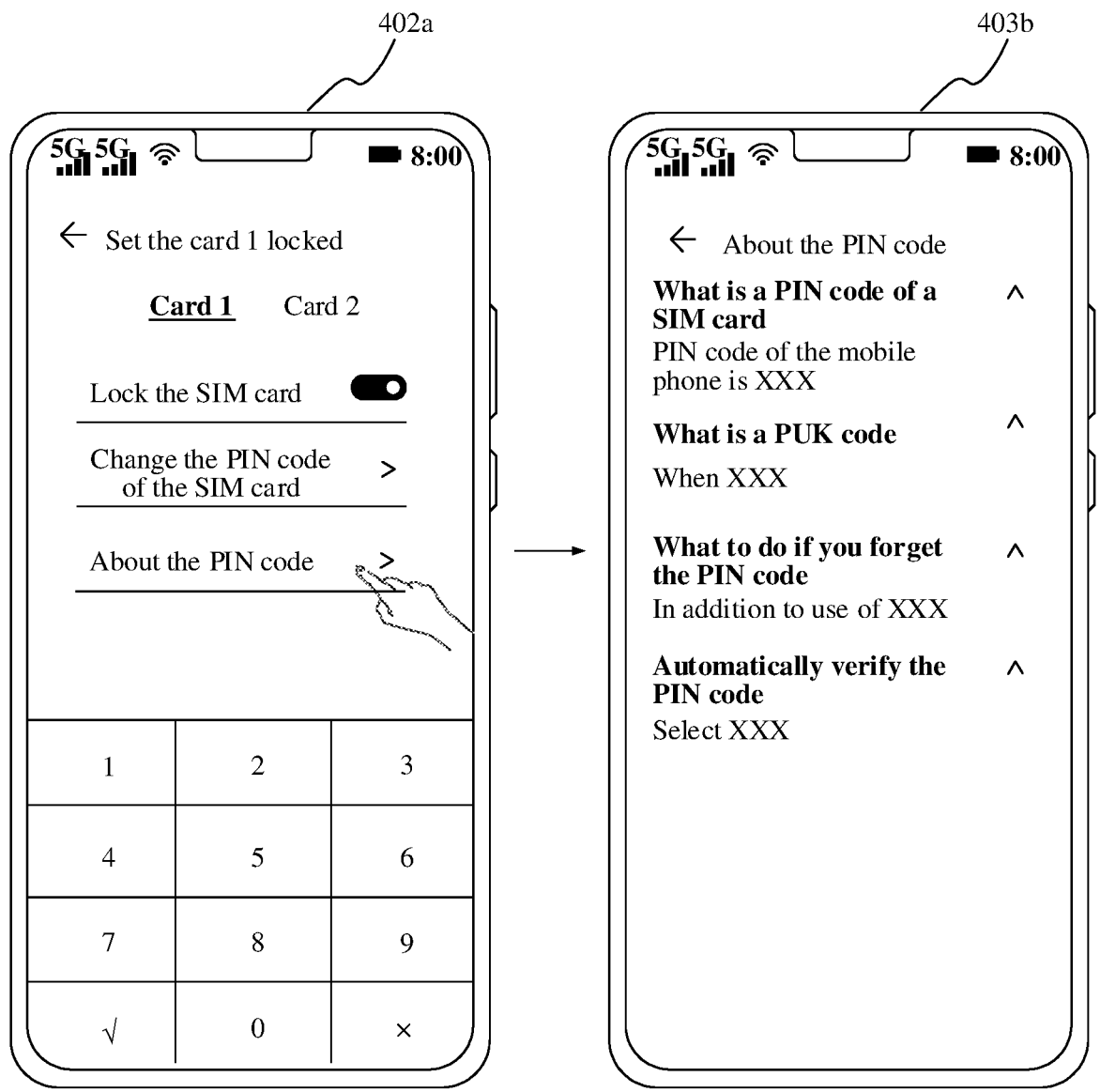
FIG. 4B is a schematic diagram of an interface of a terminal device according to an embodiment of this application.

When enabling the PIN code verification function code of the first SIM card, the terminal device may display an interface on which the user needs to enter the PIN code of the first SIM card, so that the user enters the PIN code of the first SIM card, and then verifies the PIN code. As shown in FIG. 4A-1 and FIG. 4A-2, after the user taps the "Set now" control, the interface 401 may jump to the interface 402, where the interface 402 is a PIN code management interface in the terminal device. Options of a card 1 and a card 2 may be displayed on the interface 402. The card 1 is associated with a PIN code management interface of the card 1, and the card 2 is associated with a PIN code management interface of the card 2. If the user taps the option of the card 1, the interface 402 displays the PIN code management interface of the card 1. If the user taps the option of the card 2, the interface 402 displays the PIN code management interface of the card 2. In this embodiment of this application, an example in which the first SIM card is the card 1 is used for description. For example, a PIN code management interface of the first SIM card is displayed on the interface 402. The PIN code management interface of the first SIM card includes a control of "Lock the SIM card" and an option of "Change the PIN code of the SIM card". When the user does not enable the control of "Lock the SIM card", the user cannot operate the option of "Change the PIN code of the SIM card". It should be understood that locking the SIM card is enabling the PIN code verification function of the SIM card. In a possible implementation, an option of "About a PIN code" may be further displayed on the PIN code management interface, as shown on an interface 402a in FIG. 4B. When the user selects the option of "About a PIN code" on the interface 402a, the interface 402a jumps to an interface 403b. The interface 403b may display information about the PIN code, such as "What is a PIN code", "What is a PUK code", "What to do if you forget the PIN code", and "Automatically verify the PIN code". In this embodiment of this application, by using the interface 402a shown in FIG. 4B, the interface 401 may not display the prompt information of "Automatically verify the PIN code", but the prompt information is displayed on the interface 402a. Similarly, prompt information of "Warm reminder" may not be displayed on an interface 403, but the prompt information is displayed on the interface 402a. In this implementation, interface setting may be simplified, and information that the user needs to know is uniformly placed on the interface 402a, so as to facilitate searching by the user.

On the interface 402 shown in FIG. 4A-1 and FIG. 4A-2, if the user taps the control of "Lock the SIM card", the interface 402 may jump to the interface 403, and the interface 403 may display an input box for entering the PIN code of the first SIM card. It should be understood that an initial PIN code of the first SIM card may be prompted on the interface 403, to prompt the user with the initial PIN code of the first SIM card. It should be understood that the initial PIN code is a PIN code preset when the first SIM card is delivered from the factory, and initial PIN codes of SIM cards sold by operators may be the same or different. For example, "Warm reminder: Initial PIN codes of SIM cards of operators A, B, and C are usually 1234" is displayed.

The user enters the PIN code of the first SIM card on the interface 403, and the interface 403 may jump to a lock screen interface 404. A difference between the interface 404 and the interface 401 lies in that, because the user has enabled the PIN code of the first SIM card, the first prompt information may not be displayed on the interface 404. It should be noted that, on each interface in this embodiment of this application, the PIN code entered by the user is displayed in a form invisible to the user, for example, a "black dot". It can be understood that each PIN code entered by the user is displayed in plaintext, for example, "digit". It should be understood that in FIG. 5 to FIG. 7, after the user taps the "Set now" control, an interface in FIG. 5 to FIG. 7 may alternatively jump to an interface shown by the interface 402. It should be noted that in the following embodiment, an interface change in FIG. 4A-1 and FIG. 4A-2 is used as an example for description, and a schematic diagram of the interface change in FIG. 4A-1 and FIG. 4A-2 is also applicable to FIG. 4B and FIG. 5 to FIG. 7.

Different from the current technical solution, to avoid a problem that a user needs to manually enter the PIN code of the first SIM card each time the terminal device is powered on after the terminal device enables the PIN code verification function of the first SIM card, in this embodiment of this application, the terminal device may locally store the PIN code of the first SIM card, and automatically verify the PIN code based on the locally stored PIN code of the first SIM card when the PIN code of the first SIM card needs to be verified next time, thereby improving user experience. Because at least one SIM card may be inserted into the terminal device, to distinguish PIN codes corresponding to different SIM cards, the terminal device may obtain the first ICCID of the first SIM card, use the first ICCID as an index for searching for the PIN code of the first SIM card, and store a mapping relationship between the first ICCID and the PIN code of the first SIM card. The terminal device may send a SELECT FILE command to the first SIM card, to select a folder for an ICCID stored in the first SIM card, and then the terminal device may send a READ BINARY command to the first SIM card, to read the first ICCID in the folder. For this process, refer to the TS 102221 protocol. In this embodiment of this application, "the terminal device obtains the first ICCID" is not limited to being performed in S303, and the terminal device may obtain the first ICCID in any step before S303.

It should be understood that a PIN code is set for the first SIM card. If the PIN code of the first SIM card is not changed, the PIN code of the first SIM card may be an initial PIN code, for example, 1234. The PIN code of the first SIM card may be stored in internal storage space of the first SIM card. The PIN code of the first SIM card may be understood as an access key of the first SIM card. The terminal device needs to know the PIN code of the first SIM card to access data in the first SIM card. However, the ICCID is used as an identification number of the SIM card, belongs to a hardware identifier of the SIM card, and is not stored in the internal storage space of the SIM card. Therefore, the terminal device can still obtain the ICCID of the SIM card without knowing the PIN code of the SIM card. Therefore, in this embodiment of this application, the first ICCID of the first SIM card is used as the index of the PIN code of the first SIM card. When the terminal device stores the mapping relationship between the first ICCID and the PIN code of the first SIM card, the terminal device may quickly and conveniently obtain the PIN code of the first SIM card stored in the terminal device based on the first ICCID.

In some other embodiments of this application, to ensure storage security of the PIN code of the first SIM card, the terminal device may store the mapping relationship between the first ICCID and the PIN code of the first SIM card in the TEE or the security zone of the REE of the terminal device. Optionally, mapping relationships stored in the TEE or the security zone in the REE may form a mapping relationship set, and the mapping relationship set includes a mapping relationship between an ICCID and a PIN code of at least one SIM card. An example in which the mapping relationship set is stored in the TEE is used for description in the following embodiment. A sequence of "enabling the PIN code verification function of the first SIM card" and "obtaining the first ICCID of the first SIM card and storing the mapping relationship between the first ICCID and the PIN code of the first SIM card" is not limited in embodiments of this application.

In a possible implementation, the terminal device may store mapping relationships between ICCIDs of SIM cards and PIN codes of the SIM cards in a time sequence. When a quantity of the mapping relationships between ICCIDs of SIM cards and PIN codes of the SIM cards stored in the terminal device exceeds a preset quantity, the terminal device may delete an earliest stored mapping relationship, to save storage space of the terminal device. It should be understood that the preset quantity may be preset.

The following uses a table form as an example to represent the mapping relationship set. It should be understood that Table 1 is an example of the mapping relationship set. In this embodiment of this application, the terminal device may alternatively store the mapping relationship between the first ICCID and the PIN code of the first SIM card in an extensible markup language (extensible markup language, XML) format, a database format, or the like.

TABLE 1

| ICCID | Whether to enable the PIN code | PIN code |
| --- | --- | --- |
| 1 | Yes | 1234 |
| 2 | Yes | 1222 |

It should be understood that the ICCID may be an identification number encoded in a preset encoding format. In this embodiment of this application, an example in which the ICCID of the SIM card is a number 1 or 2 is used for description. "Yes" in Table 1 may also be represented by a number or a character. Table 1 is an example of a format. In the following embodiment, an example in which the ICCID of the first SIM card is 1 is used for description.

In S304, because the mapping relationship between the first ICCID and the PIN code of the first SIM card is stored in the TEE of the terminal device, when the PIN code of the first SIM card needs to be verified after the first SIM card is inserted into the terminal device again or the terminal device is powered on again, the terminal device may read the first ICCID of the first SIM card.

In S305, after reading the first ICCID of the first SIM card, the terminal device may query, in the mapping relationship stored in the TEE, the PIN code to which the first ICCID is mapped, that is, the PIN code of the first SIM card, and then automatically verify the PIN code to which the first ICCID is mapped. To verify the PIN code to which the first ICCID is mapped, the terminal device may send, to the first SIM card, the PIN code to which the first ICCID is mapped, so that the first SIM card compares the PIN code stored in the first SIM card with the PIN code to which the first ICCID is mapped for verification. For details, refer to the foregoing related description.

Figure 8:
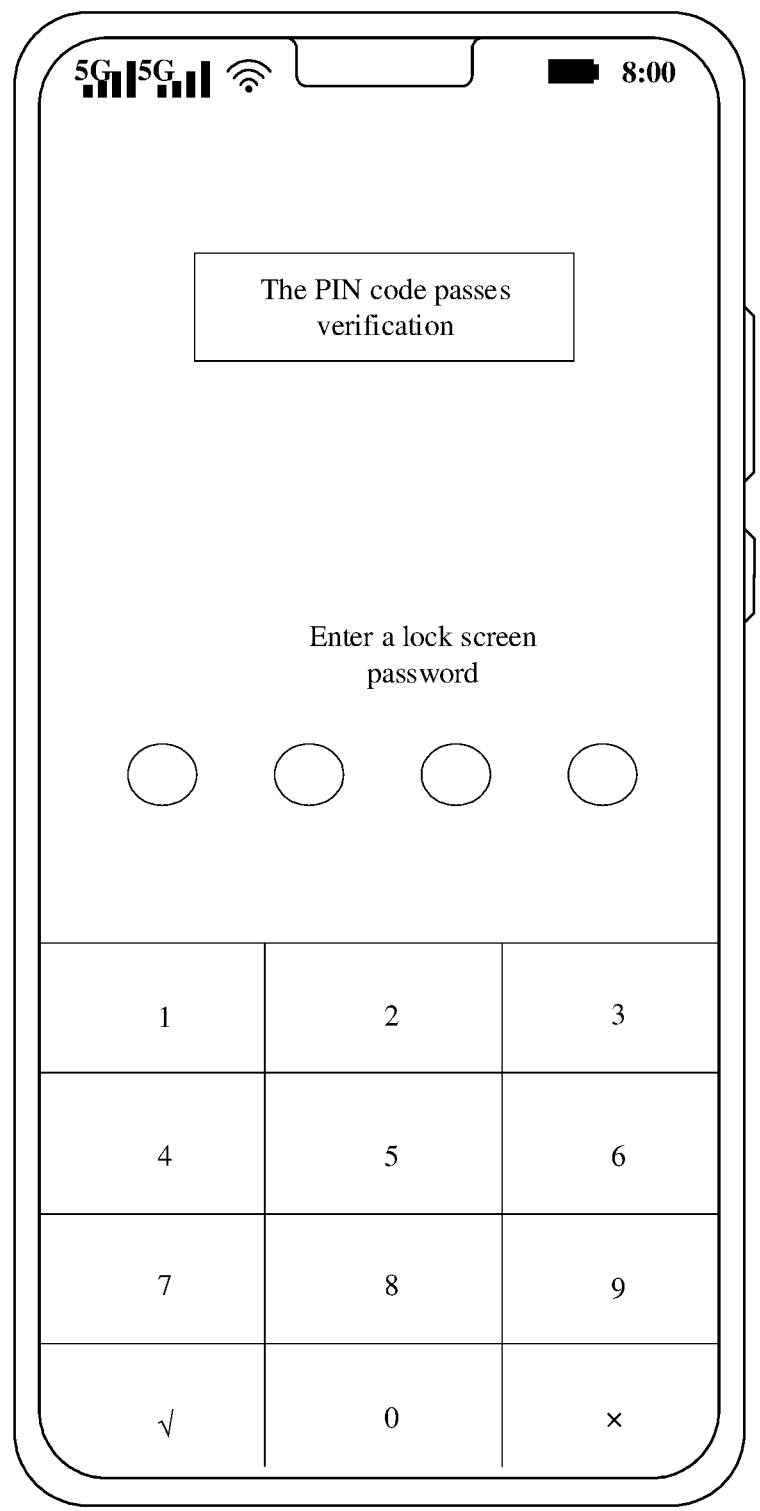
FIG. 8 is a schematic diagram of another interface of a terminal device according to an embodiment of this application.
Figure 9:
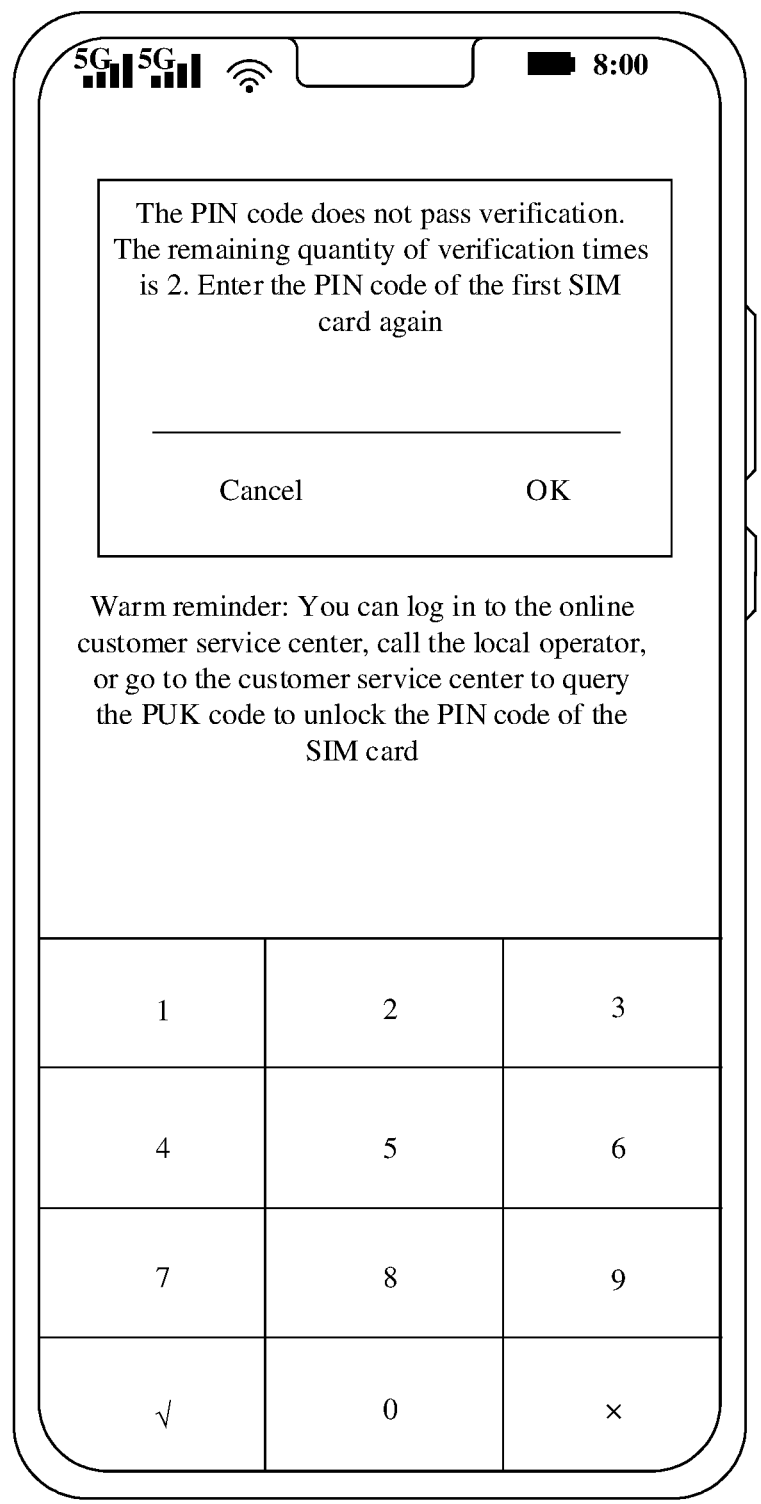
FIG. 9 is a schematic diagram of another interface of a terminal device according to an embodiment of this application.

If the terminal device into which the first SIM card is inserted is powered on again, and a lock screen interface is set for the terminal device, the terminal device may automatically verify the PIN code of the first SIM card. When the PIN code passes the verification, the terminal device may display a lock screen interface shown by the foregoing interface 403. Optionally, to prompt the user that the PIN code of the first SIM card passes the verification, a verification result of "The PIN code passes the verification" may be displayed on the interface 403, as shown in FIG. 8. If the PIN code of the first SIM card does not pass the verification, the terminal device may display a verification result of "The PIN code does not pass the verification", and an interface prompting the user to manually enter the PIN code of the first SIM card, as shown in FIG. 9. Optionally, prompt information of "Warm reminder: You can log in to the online customer service center, call the local operator, or go to the customer service center to query the PUK code to unlock the PIN code of the SIM card" may be displayed in FIG. 9, to prompt the user to perform an unlocking operation after the SIM card is locked. It should be understood that when the PIN code of the first SIM card does not pass the verification, the user cannot use the first SIM card.

In an embodiment, when determining that the remaining quantity of verification times of the PIN code of the first SIM card is greater than or equal to the preset quantity of verification times, the terminal device verifies the PIN code to which the first ICCID is mapped. Correspondingly, S305 may be replaced with: Query, in the mapping relationship, the PIN code to which the first ICCID is mapped, and when it is determined that a remaining quantity of verification times of the PIN code of the first SIM card is greater than or equal to a preset quantity of verification times, verify the PIN code to which the first ICCID is mapped. It should be understood that for that the terminal device interacts with the first SIM card to obtain the remaining quantity of verification times of the PIN code of the first SIM card, refer to related descriptions in S301.

In this embodiment of this application, a reason why the terminal device verifies the PIN code to which the first ICCID is mapped when the remaining quantity of verification times of the PIN code of the first SIM card is greater than or equal to the preset quantity of verification times is: If the user removes the first SIM card from the terminal device, and changes the PIN code of the first SIM card in another terminal device, the PIN code stored in the first SIM card is a changed PIN code. If the terminal device performs verification by using the PIN code to which the first ICCID is mapped and that is stored in the local TEE, the verification fails. If the terminal device continuously and automatically verifies the PIN code to which the first ICCID is mapped, the verification fails continuously, and finally the first SIM card is locked. For example, if the PIN code to which the first ICCID is mapped and that is stored in the TEE of the terminal device is 1234, and the user changes the PIN code of the first SIM card to 2345 in another terminal device, the PIN code stored in the first SIM card is also correspondingly changed to 2345. When the user inserts the first SIM card into the terminal device again, the terminal device verifies the PIN code of the first SIM card by using 1234. As a result, the verification fails. If the terminal device continuously uses 1234 to verify the PIN code of the first SIM card, the first SIM card is locked.

For example, the preset quantity of verification times of the PIN code is 3. If the remaining quantity of verification times of the PIN code of the first SIM card is greater than or equal to 3, the terminal device may verify the PIN code to which the first ICCID is mapped in the TEE. If the remaining quantity of verification times of the PIN code of the first SIM card is less than the preset quantity of verification times, the terminal device prompts the user to enter the PIN code of the first SIM card. For example, if the remaining quantity of verification times of the PIN code of the first SIM card is 2 less than 3, the terminal device stops verifying the PIN code to which the first ICCID is mapped in the TEE, to prevent the first SIM card from being locked, and prompt the user to enter the PIN code of the first SIM card. As shown in FIG. 9, prompt information of "The remaining quantity of verification times is 2. Enter the PIN code of the first SIM card again" may be further displayed on the interface shown in FIG. 9.

In an embodiment, if the terminal device has entered a PUK unlocking procedure, the terminal device also stops verifying the PIN code to which the first ICCID is mapped in the TEE, because in this case, the first SIM card is locked, the first SIM card cannot be used even if the PIN code to which the first ICCID is mapped passes the verification, and a problem that the SIM card is locked again when the SIM card is unlocked by the PUK can be avoided.

As shown in Table 1, the TEE of the terminal device in this embodiment of this application may store mapping relationships between ICCIDs of a plurality of SIM cards and PIN codes of the SIM cards. It should be understood that after the terminal device into which a second SIM card is inserted is powered on, or when the second SIM card is inserted into the terminal device, the terminal device may verify the PIN code to which a second ICCID of the second SIM card is mapped and that is stored in the TEE. For a verification manner, refer to the verification manner of the PIN code to which the first ICCID is mapped.

In this embodiment of this application, because the TEE of the terminal device stores the mapping relationship between the first ICCID of the first SIM card and the PIN code of the first SIM card, the terminal device may automatically verify, based on the mapping relationship, the PIN code to which the first ICCID is mapped. However, when the first SIM card is lost, and a malicious user inserts the first SIM card into another terminal device, the PIN code of the first SIM card is not stored in the another terminal device, and the another terminal device can use the first SIM card only when the user enters the PIN code of the first SIM card. Therefore, the malicious user cannot use the first SIM card without knowing the PIN code of the first SIM card, thereby ensuring security of the first SIM card.

The foregoing embodiment describes a solution in which the terminal device prompts the user to enable the PIN code verification function of the first SIM card, stores the mapping relationship between the first ICCID and the PIN code of the first SIM card, and automatically verifies the PIN code. In an embodiment, when the first SIM card is inserted into the powered-on terminal device or the terminal device into which the first SIM card is inserted is powered on, the terminal device may query whether the mapping relationship includes the PIN code to which the first ICCID is mapped. If the mapping relationship includes the PIN code to which the first ICCID is mapped, the terminal device may verify the PIN code to which the first ICCID is mapped. Optionally, if the mapping relationship does not include the PIN code to which the first ICCID is mapped, the terminal device may output the first prompt information. That the terminal device verifies the PIN code to which the first ICCID is mapped may be: The terminal device sends, to the first SIM card, the PIN code to which the first ICCID is mapped, and receives a verification result of the PIN code from the first SIM card. For details, refer to the foregoing related description.

In this embodiment of this application, when the terminal device is powered on or the first SIM card is inserted, the terminal device may prompt the user to enable the PIN code verification function of the first SIM card. This can improve security of the first SIM card. In addition, after the user enables the PIN code verification function of the first SIM card, the terminal device may store the mapping relationship between the first ICCID of the first SIM card and the PIN code of the first SIM card into the TEE, so that security of the PIN code of the first SIM card can be ensured. In addition, when the terminal device is powered on next time or the first SIM card is inserted next time, the terminal device may automatically verify the PIN code to which the first ICCID is mapped, thereby avoiding a problem that the user manually enters the PIN code of the first SIM card repeatedly, and further avoiding a problem that the first SIM card is locked due to a user input error, to improve user experience.

In the foregoing embodiment, the PIN code of the first SIM card may be an initial PIN code of the first SIM card or a PIN code that is set by the user and that is different from the initial PIN code. It should be understood that the initial PIN code is preset in the SIM card. In an embodiment, because initial PIN codes of different SIM cards may be the same, for example, are each 1234, a security risk exists when the user uses the initial PIN code. If the terminal device enables the PIN code verification function of the first SIM card, after the first SIM card is lost, the PIN code of the first SIM card is the initial PIN code if the user does not change the initial PIN code, and consequently a malicious user may attempt to verify the PIN code by using the initial PIN code, and then use the first SIM card.

Figure 10A:
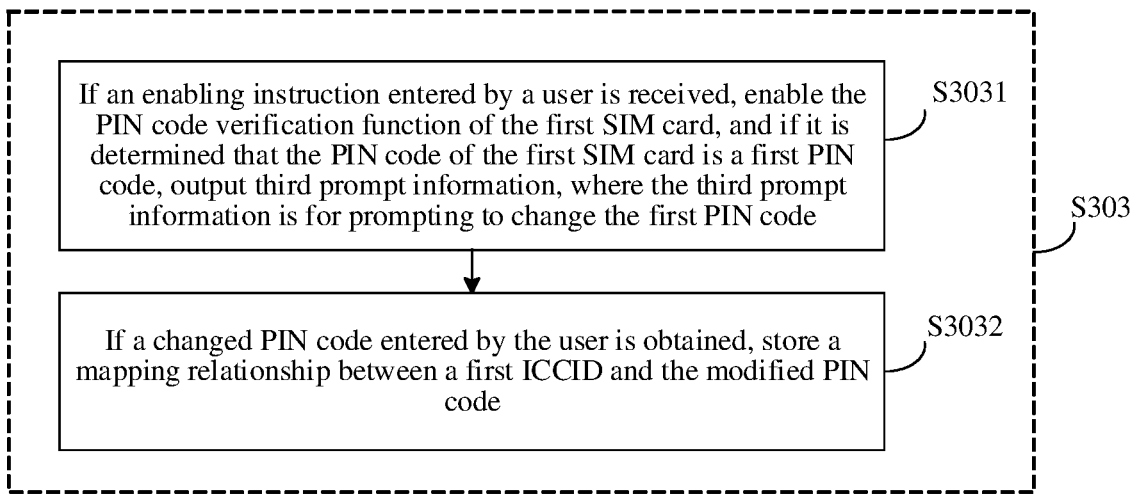
FIG. 10A is a schematic flowchart of another embodiment of a method for verifying a PIN code according to an embodiment of this application.

Therefore, to improve security of the SIM card, in this embodiment of this application, when prompting the user to enable the PIN code verification function of the first SIM card, the terminal device may prompt the user to change the initial PIN code of the first SIM card. FIG. 10A is a schematic flowchart of another embodiment of a method for verifying a PIN code according to an embodiment of this application. As shown in FIG. 10A, S303 may be replaced with S3031 and S3032.

S3031: If an enabling instruction entered by a user is received, enable the PIN code verification function of the first SIM card, and if it is determined that the PIN code of the first SIM card is a first PIN code, output third prompt information, where the third prompt information is for prompting to change the first PIN code.

S3032: If a changed PIN code entered by the user is obtained, store a mapping relationship between the first ICCID and the changed PIN code.

In S3031, as shown by the interface 403 in FIG. 4A-1 and FIG. 4A-2, when the user enables the PIN code verification function of the first SIM card, the user needs to enter the PIN code of the first SIM card. Therefore, the terminal device may obtain the PIN code of the first SIM card. If determining that the PIN code of the first SIM card that is entered by the user is the first PIN code, the terminal device may output the third prompt information, to prompt the user to change the first PIN code. The first PIN code is an initial PIN code, for example, 1234. It should be understood that, in a possible implementation, the terminal device may store an initial PIN code, and the initial PIN code may be a PIN code preset by an operator to which the first SIM card belongs. The terminal device may determine, based on the stored initial PIN code and the PIN code of the first SIM card entered by the user, whether the PIN code of the first SIM card entered by the user is the initial PIN code.

FIG. 11-1, FIG. 11-2, and FIG. 11-3 are a schematic diagram of another interface of a terminal device according to an embodiment of this application. As shown in FIG. 11-1, FIG. 11-2, and FIG. 11-3, after the user enters the first PIN code on the interface 403 shown in FIG. 4A-1 and FIG. 4A-2, the interface 403 may jump to an interface 405 shown in FIG. 11-1, FIG. 11-2, and FIG. 11-3. Prompt information, for example, "It is detected that the PIN code of your SIM card is the initial PIN code. It is recommended that you change the initial PIN code", for prompting the user to change the first PIN code is displayed on the interface 405. Optionally, prompt information such as "You may set the lock screen password to the PIN code" may be further displayed on the interface 405, to prompt the user to set the lock screen password of the terminal device to the PIN code of the first SIM card. In this way, a problem that the user forgets the password due to memorizing a plurality of passwords can be prevented. In addition, even if the user confuses the lock screen password and the PIN code of the first SIM card, the first SIM card can be unlocked by using the lock screen password. When the user taps the prompt information, it indicates that the user agrees to change the PIN code of the first SIM card. The interface 405 may jump to an interface 406 for changing the first PIN code.

In a possible implementation, in this embodiment of this application, the interface 403 shown in FIG. 4A-1 and FIG. 4A-2 may alternatively display prompt information of "It is detected that the PIN code of your SIM card is the initial PIN code. It is recommended that you change the initial PIN code". The prompt information may be displayed by using a bubble. For example, the prompt information of "It is detected that the PIN code of your SIM card is the initial PIN code. It is recommended that you change the initial PIN code" is displayed in a bubble-shaped prompt box. The prompt information may be displayed for 3 seconds and then automatically disappear. A manner of displaying the prompt information is not limited in embodiments of this application.

It should be understood that, in a possible implementation, if the user enables the PIN code verification function of the first SIM card, the user may select an option of "Change the PIN code of the SIM card" on the interface 402 in FIG. 4A-1 and FIG. 4A-2, to change the PIN code of the first SIM card. When the user selects the option of "Change the PIN code of the SIM card" on the interface 402, the interface 402 may alternatively jump to the interface 406 shown in FIG. 11-1, FIG. 11-2, and FIG. 11-3.

In S3032, the user may change the initial PIN code, to improve security of the first SIM card. If the user enters the changed PIN code on the interface 406 shown in FIG. 11-1, FIG. 11-2, and FIG. 11-3, correspondingly, the terminal device may obtain the PIN code obtained after the user performs the change. A manner and an interface of changing the first PIN code are not limited in embodiments of this application. If the user changes the first PIN code "1234" to "5678", the terminal device may obtain the PIN code "5678" obtained after the user performs the change. Correspondingly, the terminal device may store the mapping relationship between the first ICCID and the changed PIN code. The mapping relationship between the first ICCID and the PIN code that is obtained after the user performs the change may be shown in the following Table 2, where the first ICCID of the first SIM card is 1.

TABLE 2

| ICCID | Whether to enable the PIN code | PIN code |
|-------|-------------------------------|----------|
| 1     | Yes                           | 5678     |
| 2     | Yes                           | 1222     |

It should be noted that, in this embodiment of this application, after obtaining the PIN code that is obtained after the user performs the change, the terminal device may interact with the first SIM card, so that the first SIM card updates the PIN code stored in the internal space of the first SIM card, that is, the first SIM card stores the changed PIN code. For example, the terminal device sends the first PIN code to the first SIM card, so that the first SIM card verifies the first PIN code. For a manner of verifying the first PIN code by the terminal device, refer to the related description that the terminal device verifies the PIN code to which the first ICCID is mapped in S305. When the first PIN code passes the verification, the terminal device may send the PIN code that is obtained after the user performs the change to the first SIM card, so that the first SIM card stores the changed PIN code.

In a possible implementation, if the user does not change the first PIN code, that is, the terminal device does not obtain the changed PIN code, the terminal device may store the mapping relationship between the first ICCID and the first PIN code of the first SIM card.

Figure 12:
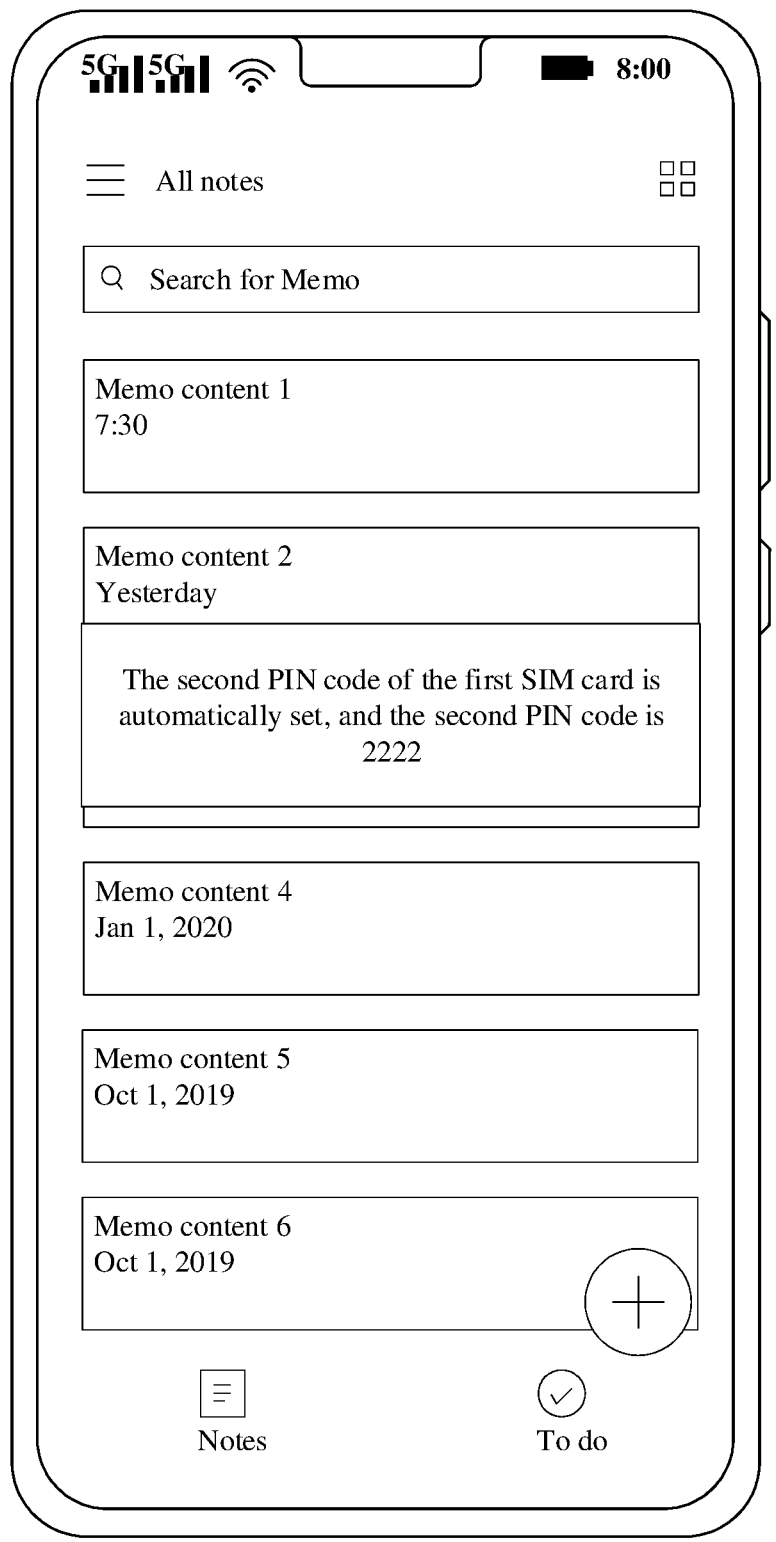
FIG. 12 is a schematic diagram of another interface of a terminal device according to an embodiment of this application.

In a possible implementation, if the user does not change the first PIN code, that is, the terminal device does not obtain the changed PIN code, to improve security of the first SIM card, the terminal device may automatically generate a second PIN code of the first SIM card, and then store a mapping relationship between the first ICCID and the second PIN code of the first SIM card. The second PIN code is different from the first PIN code. It should be understood that after changing the first PIN code to the second PIN code, the terminal device may prompt the user that the first PIN code is changed, and then the user learns of the second PIN code, so that the user can enter the second PIN code of the first SIM card in a scenario in which the PIN code of the first SIM card needs to be manually entered. For example, the terminal device may prompt the user with the second PIN code of the first SIM card by using a pop-up window or a drop-down status bar. In FIG. 12, for example, in a process in which a user uses a terminal device, a form in which a pop-up window prompts the user is used as an example for description. For example, the pop-up window may display "The second PIN code of the first SIM card is automatically set, and the second PIN code is 2222", and the user may tap a location outside the pop-up window to make the pop-up window disappear. A manner in which and a quantity of times that the terminal device prompts with the second PIN code of the first SIM card are not limited in embodiments of this application.

It should be noted that in this embodiment of this application, after generating the second PIN code, the terminal device may interact with the first SIM card, so that the first SIM card stores the second PIN code.

In some other embodiments of this application, the terminal device may automatically generate the second PIN code based on information about the first SIM card and/or information about the terminal device. The information about the first SIM card may be, but is not limited to, an ICCID of the first SIM card or a model of the first SIM card. The information about the terminal device may be, but is not limited to, an international mobile equipment identity (international mobile equipment identity, IMEI) of the terminal device, a factory serial number, or a lock screen password of the terminal device. Optionally, the terminal device may generate the second PIN code based on the information about the first SIM card and/or a number included in the information about the terminal device. For example, the terminal device uses the lock screen password of the terminal device as the second PIN code. Alternatively, the terminal device may generate the second PIN code with reference to the information about the first SIM card and/or a number or character in the information about the terminal device. It should be understood that the lock screen password of the terminal device may be but is not limited to: a digital password, a pattern password, a hybrid password, or a biometric password. The hybrid password is a password consisting of letters, numbers, symbols, and the like. The biometric password is, for example, a fingerprint, a human face, or an iris.

In this embodiment of this application, the terminal device may prompt the user to change the initial PIN code of the first SIM card, to improve security of the SIM card. When the user does not change the initial PIN code, to ensure security of the SIM card, the terminal device may generate the second PIN code based on the information about the first SIM card and/or the information about the terminal device.

Figure 10B:
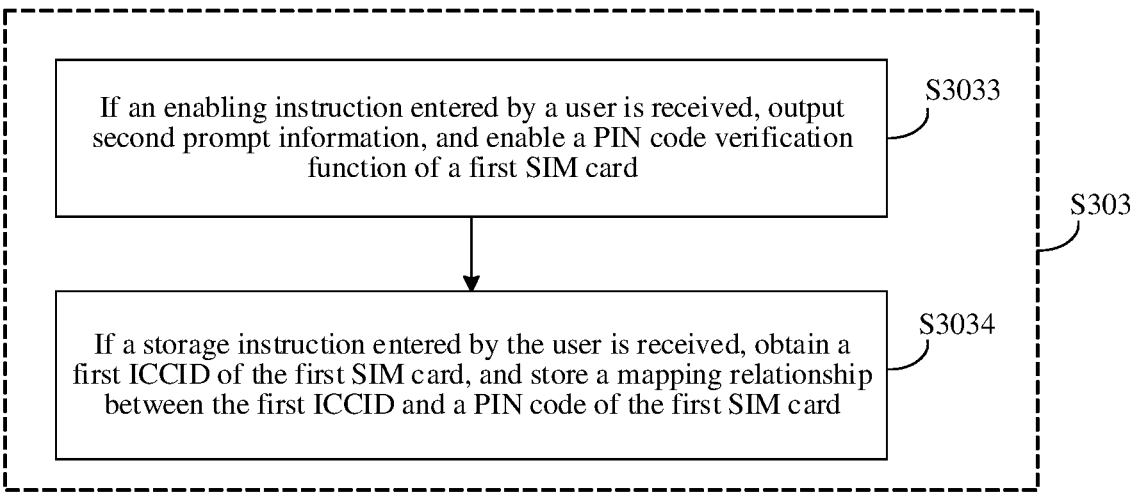
FIG. 10B is a schematic flowchart of another embodiment of a method for verifying a PIN code according to an embodiment of this application.

In the foregoing embodiment, when enabling the PIN code verification function of the first SIM card, the terminal device may read the first ICCID of the first SIM card, to store the mapping relationship between the first ICCID and the PIN code of the first SIM card. However, the user may consider that excessive information is obtained when the terminal device stores the mapping relationship, thereby causing poor user experience, and the user does not need to store the mapping relationship between the first ICCID and the PIN code of the first SIM card. Therefore, in an embodiment, to satisfy diversified requirements of the user, the terminal device may provide the user with an option of choosing whether to store the mapping relationship between the first ICCID and the PIN code of the first SIM card. In this embodiment of this application, S303 may be replaced with S3033 and S3034, as shown in FIG. 10B. It should be understood that the embodiment shown in FIG. 3 is used as an example for description in this embodiment of this application, and this embodiment may alternatively be combined with the embodiment shown in FIG. 10A.

S3033: If an enabling instruction entered by a user is received, output second prompt information, and enable the PIN code verification function of the first SIM card.

S3034: If a storage instruction entered by the user is received, obtain a first ICCID of the first SIM card, and store a mapping relationship between the first ICCID and a PIN code of the first SIM card.

Figure 13:
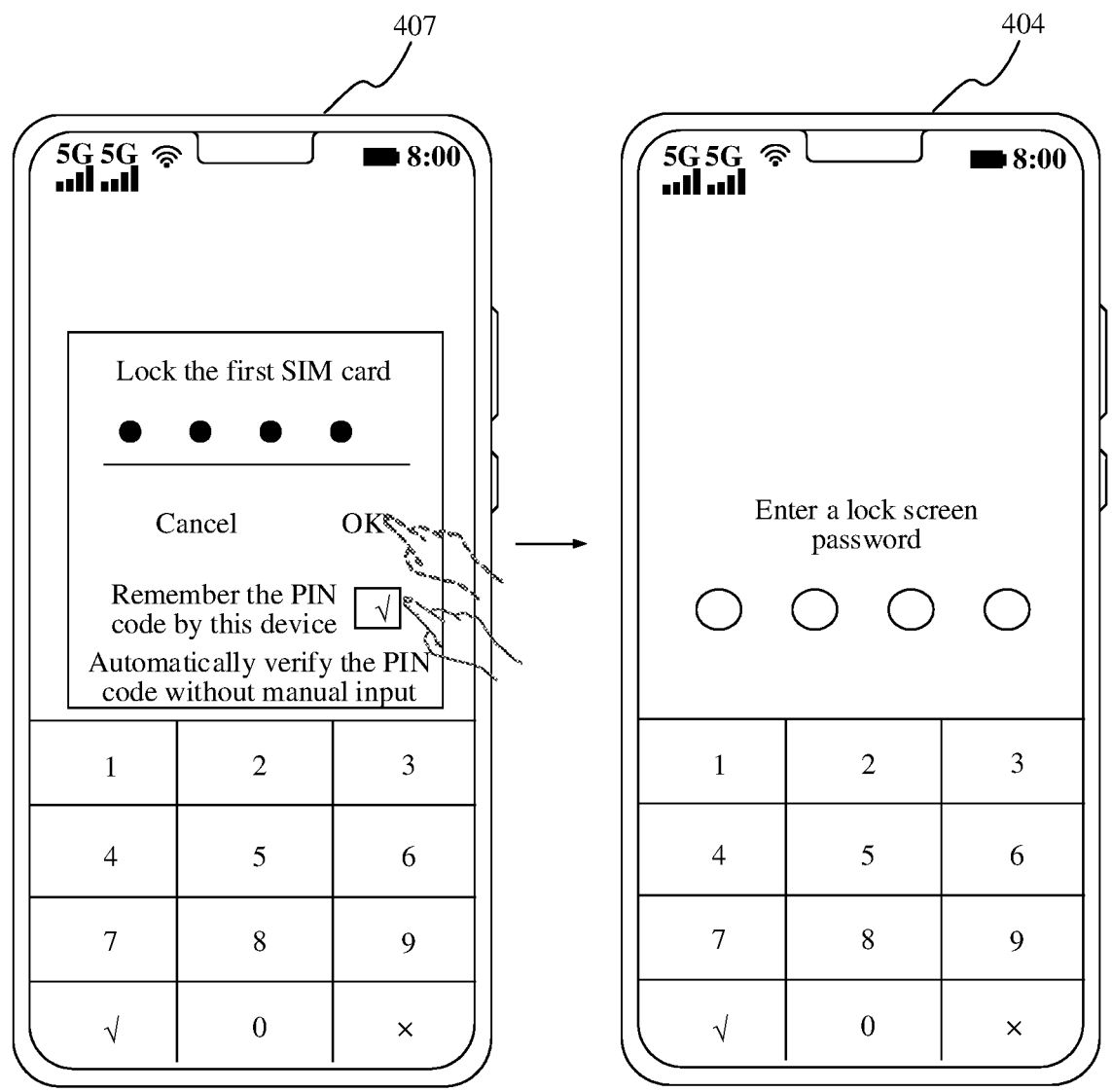
FIG. 13 is a schematic diagram of another interface of a terminal device according to an embodiment of this application.

In S3033, when the PIN code verification function of the first SIM card is enabled, the terminal device may output the second information, to prompt the user to store the PIN code of the first SIM card, so as to avoid a problem that the user needs to manually enter the PIN code of the first SIM card during PIN code verification next time. In this embodiment of this application, the second prompt information is for prompting to store a mapping relationship between an ICCID of a SIM card and a PIN code of the SIM card. FIG. 13 is a schematic diagram of another interface of a terminal device according to an embodiment of this application. A difference between the interface 407 shown in FIG. 13 and the interface 403 shown in FIG. 4A-1 and FIG. 4A-2 lies in that an option such as "Remember the PIN code by this device" may be displayed on the interface 407, so as to prompt the user to choose to store the PIN code of the first SIM card. To explain more clearly a function of the option of "Remember the PIN code by this device", a function description, for example, "Automatically verify the PIN code without manual input" of the option of "Remember the PIN code by this device" can be further displayed on the interface. It should be understood that the option of "Remember the PIN code by this device" may also be referred to as an option of "Automatic PIN code", and may prompt the user to automatically verify the PIN code without manual input. A manner of prompting the user to store the PIN code of the first SIM card is not limited in embodiments of this application. It should be understood that the interface 407 omits information of "Warm reminder: Initial PIN codes of SIM cards of operators A, B, and C are usually 1234".

In a possible implementation, the second prompt information is further for prompting the user to enter the PIN code of the first SIM card. When collecting the correct PIN code of the first SIM card that is entered by the user, the terminal device may automatically enable the PIN code verification function of the first SIM card. The terminal device may collect the PIN code entered by the user, and then interact with the first SIM card, to verify whether the PIN code entered by the user is a correct PIN code of the first SIM card, that is, whether the PIN code entered by the user passes verification. When the PIN code entered by the user is the correct PIN code of the first SIM card (the PIN code entered by the user passes verification), the PIN code verification function of the first SIM card may be automatically enabled. For an enabling manner, refer to the foregoing related description.

In S3034, if the user selects the option of "Remember the PIN code by this device", input of the storage instruction into the terminal device may be triggered. In this embodiment of this application, for that the terminal device may perform, when receiving the storage instruction from the user, the action of "obtaining a first ICCID of the first SIM card, and storing a mapping relationship between the first ICCID and a PIN code of the first SIM card", and then store the mapping relationship between the first ICCID and the PIN code of the first SIM card, refer to related descriptions in the foregoing embodiment. For example, if the user enters the PIN code of the first SIM card on the interface 407 shown in FIG. 13, and selects the option of "Remember the PIN code by this device", the interface 407 may jump to the interface 404 shown in FIG. 4A-1 and FIG. 4A-2.

Figure 17:
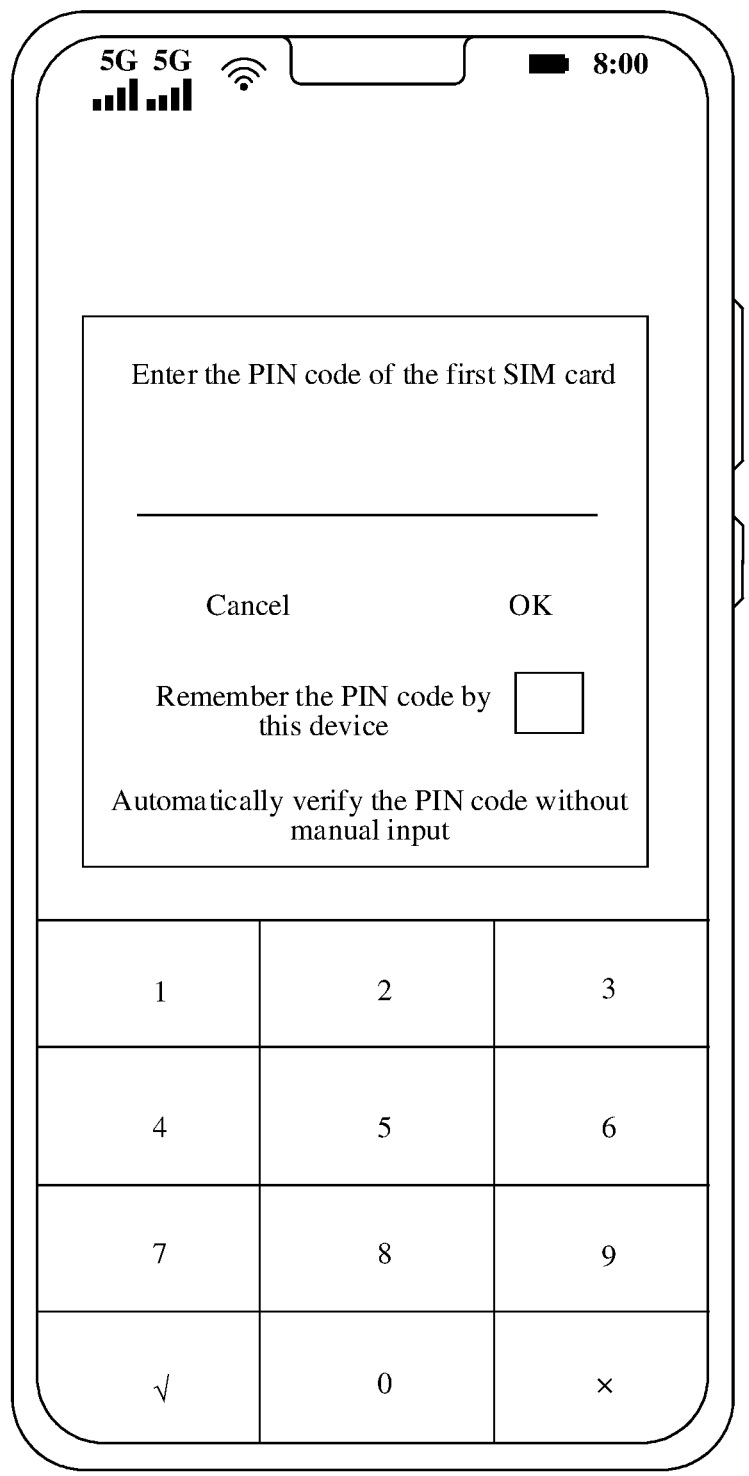
FIG. 17 is a schematic diagram of another interface of a terminal device according to an embodiment of this application.

It should be understood that if the user does not select the option of "Remember the PIN code by this device", the terminal device has not received the storage instruction for the PIN code of the first SIM card from the user, and therefore the terminal device does not perform the action of "obtaining a first ICCID of the first SIM card, and storing a mapping relationship between the first ICCID and a PIN code of the first SIM card". Correspondingly, when the terminal device is powered on next time or the first SIM card is inserted into the terminal device again, the terminal device may output the second prompt information, as shown in FIG. 17. The second prompt information is further for prompting the user to enter the PIN code of the first SIM card, and prompting to store a mapping relationship between the first ICCID and the PIN code of the first SIM card.

For example, in this scenario, the terminal device may further record whether the user stores the mapping relationship between the first ICCID and the PIN code of the first SIM card, and Table 1 may be replaced with Table 3:

TABLE 3

| ICCID | Whether to enable the PIN code | PIN code | Whether to perform storage |
|---|---|---|---|
| 1 | Yes | 1234 | Yes |
| 2 | Yes | 1222 | Yes |

In an embodiment, after obtaining the PIN code of the first SIM card, the terminal device may access the first SIM card by using the PIN code of the first SIM card, and then may obtain information such as a phone number corresponding to the first SIM card from the first SIM card. Optionally, the terminal device may store a mapping relationship between the first ICCID, the PIN code of the first SIM card, and an identifier of the first SIM card. The identifier of the first SIM card may be a phone number corresponding to the first SIM card, or a card slot corresponding to the first SIM card, for example, "card 1". Table 3 may be shown in Table 4.

TABLE 4

| Identifier of a SIM card | ICCID | Whether to enable the PIN code | PIN code | Whether to perform storage |
|---|---|---|---|---|
| 13700000000/card 1 | 1 | Yes | 1234 | Yes |
| 13700000011/card 1 | 2 | Yes | 1222 | Yes |

In this embodiment of this application, the terminal device may prompt the user to store the mapping relationship between the first ICCID and the PIN code of the first SIM card. When the user confirms storage, the terminal device stores the mapping relationship between the first ICCID and the PIN code of the first SIM card, to satisfy diversified requirements of the user.

As shown in FIG. 3, corresponding to S303, the method for verifying a PIN code provided in this embodiment of this application may include:

S306: Continue to output the first prompt information based on a preset prompt rule if a cancellation instruction entered by a user is received.

S307: If a quantity of prompt times reaches a preset quantity of prompt times or prompt duration reaches preset prompt duration, automatically enable the PIN code verification function of the first SIM card, and generate a second PIN code of the first SIM card.

S308: Store a mapping relationship between the first ICCID and the second PIN code of the first SIM card.

In S306, in this embodiment of this application, the first prompt information may be output in the prompt manner shown in FIG. 4A-1 and FIG. 4A-2 to FIG. 7, to prompt to enable the PIN code verification function of the first SIM card. If the user taps the "Set later" control displayed on the interface shown in FIG. 4A-1 and FIG. 4A-2 to FIG. 7, the terminal device may determine that the user does not enable the PIN code verification function of the first SIM card. To be specific, the terminal device receives an instruction that is entered by the user and that is for not enabling the PIN code verification function of the first SIM card, that is, the cancellation instruction. In a possible implementation, if the terminal device receives the cancellation instruction entered by the user, the terminal device may obtain the first ICCID of the first SIM card, and correspondingly store a record of "not enabling the PIN code verification function of the first SIM card". That is to say, each time the terminal device prompts, the terminal device stores an operation performed by the user on the prompt information of enabling the PIN code verification function of the first SIM card, as shown in the following Table 5. It should be understood that "not obtained" in the table may also be represented by using a number or a character:

TABLE 5

| Identifier of a SIM card | ICCID | Whether to enable the PIN code | PIN code | Whether to perform storage |
|---|---|---|---|---|
| 13700000000/card 1 | 1 | Yes | 1234 | Yes |
| 13700000011/card 1 | 2 | Yes | 1222 | Yes |
| 13700000022/card 3 | 3 | No | Not obtained | No |

In this embodiment of this application, to enable the user to enable the PIN code verification function of the first SIM card, to improve security of the SIM card, the terminal device may continue to output the first prompt information, to prompt the user to enable the PIN code verification function of the first SIM card. The terminal device may continue to output the first prompt information based on the preset prompt rule.

In a possible implementation, the preset prompt rule may be prompting once every preset duration. For example, if the preset duration is 24 h, the terminal device may prompt the user to enable the PIN code verification function of the first SIM card 24 h after the terminal device receives the cancellation instruction entered by the user. It should be understood that as shown in FIG. 4A-1 and FIG. 4A-2, if a moment at which the terminal device prompts the user to enable the PIN code verification function of the first SIM card is at a power-off stage of the terminal device, the terminal device may prompt, when being powered on, the user to enable the PIN code verification function of the first SIM card. It should be understood that for a manner in which the terminal device prompts to enable the PIN code verification function of the first SIM card, refer to the related description in S302.

In a possible implementation, the preset prompt rule may be prompting when the terminal device is powered on or when the SIM card is inserted. In this manner, an interface in which the terminal device prompts, when being powered on, the user to enable the PIN code verification function of the first SIM card may be shown in FIG. 4A-1 and FIG. 4A-2 to FIG. 6-1 and FIG. 6-2, and an interface in which the terminal device prompts the user to enable the PIN code verification function of the first SIM card when the SIM card is inserted may be shown in FIG. 7.

Figure 14A:
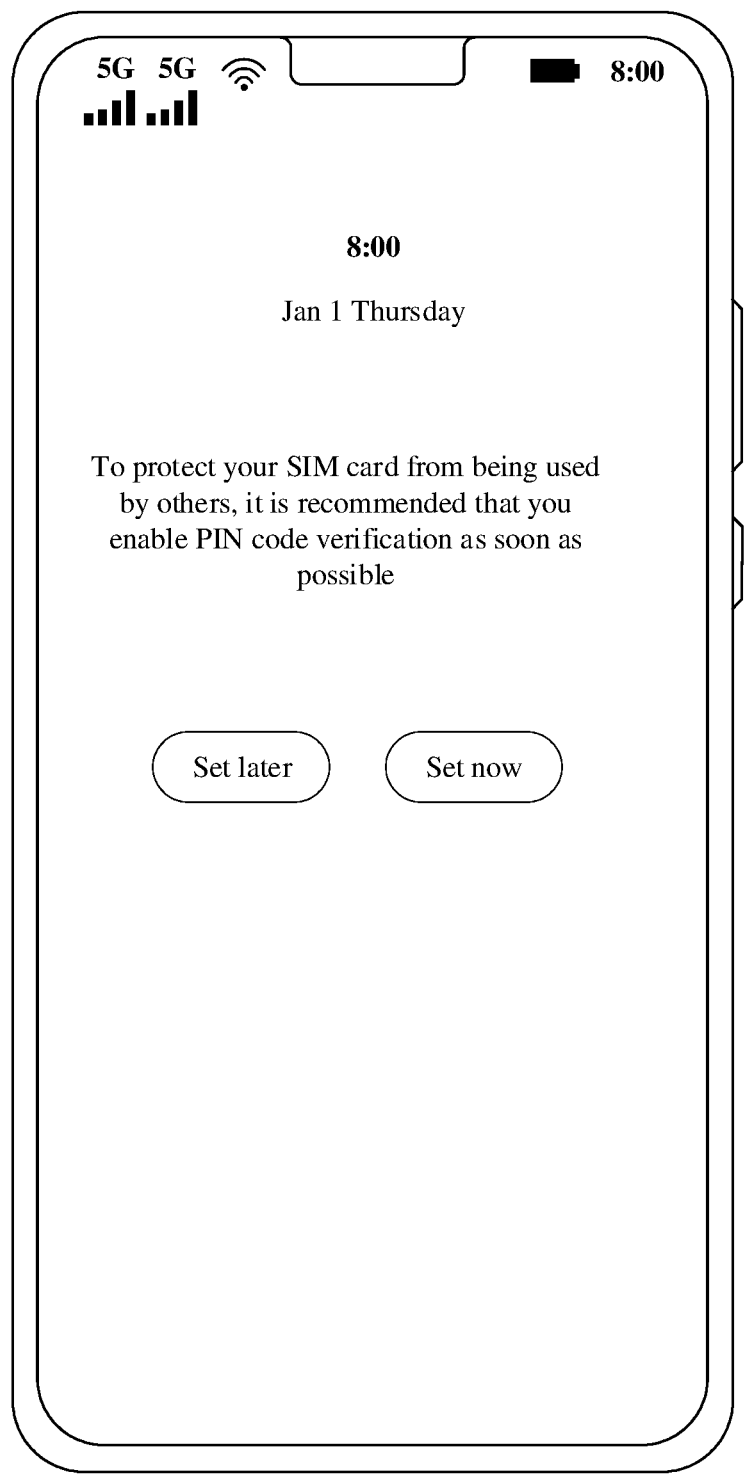
FIG. 14A is a schematic diagram of another interface of a terminal device according to an embodiment of this application.

In a possible implementation, the preset prompt rule may be prompting on a lock screen interface of the terminal device, or prompting on an unlocked interface of the terminal device. In this manner, the prompt on the lock screen interface of the terminal device may be shown in FIG. 14A, and the unlocked prompt interface on the screen of the terminal device may be shown in FIG. 5 or FIG. 6-1 and FIG. 6-2.

Figure 14B:
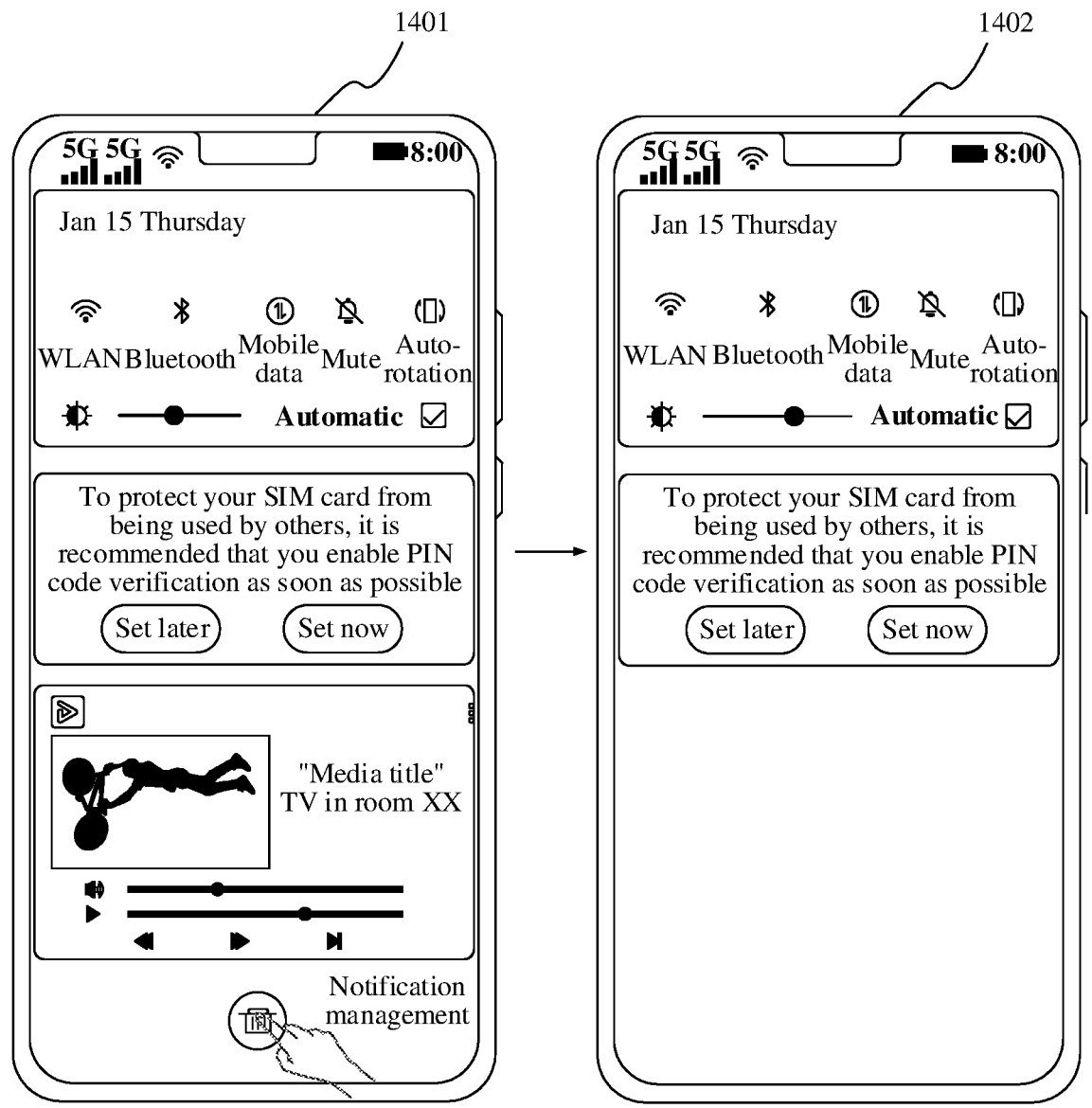
FIG. 14B is a schematic diagram of another interface of a terminal device according to an embodiment of this application.

In a possible implementation, in a manner in which the terminal device prompts the user to enable the PIN code verification function of the first SIM card by using a drop-down status bar, the preset prompt rule may be that prompt information in the drop-down status bar is undeletable information. In this manner, if receiving the cancellation instruction entered by the user, the terminal device continues to display, in the drop-down status bar, information prompting the user to enable the PIN code verification function of the first SIM card. FIG. 14B shows an example of an interface in which the user deletes the information in the drop-down status bar, and information indicating that the terminal device prompts the user to enable the PIN code verification function of the first SIM card is undeletable. For example, a drop-down status bar on an interface 1401 includes other deletable information, for example, prompt information in an application, or video information. When the user taps a delete control on the interface 1401, the interface 1401 jumps to an interface 1402, and the interface 1402 continues to display information prompting the user to enable the PIN code verification function of the first SIM card. However, given that the terminal device deletes video information, the video information is not displayed on the interface 1402.

In S307, in a possible implementation, each time the terminal device prompts, the terminal device may store a quantity of prompt times and/or record prompt duration. Table 6 uses the quantity of prompt times as an example for description.

TABLE 6

| Identifier of a SIM card | ICCID | Whether to enable the PIN code | PIN code | Whether to perform storage | Quantity of prompt times |
|---|---|---|---|---|---|
| 13700000000/card 1 | 1 | Yes | 1234 | Yes | 1 |
| 13700000011/card 1 | 2 | Yes | 1222 | Yes | 1 |
| 13700000022/card 3 | 3 | No | Not obtained | No | 3 |

In this embodiment of this application, if the quantity of times that the terminal device outputs the first prompt information reaches the preset quantity of prompt times, for example, 3, or the prompt duration reaches the preset prompt duration, for example, 1 h, it should be understood that the prompt duration may be a sum of duration of outputting the first prompt information by the terminal device.

In a possible implementation, if the user does not pay attention to or does not know the PIN code of the first SIM card, the user has not enabled the PIN code verification function of the first SIM card continuously. To ensure security of the first SIM card, in this embodiment of this application, the terminal device may automatically enable the PIN code verification function of the first SIM card. When the terminal device automatically enables the PIN code verification function of the first SIM card, because the user has not entered the PIN code of the first SIM card, the terminal device has not obtained the PIN code of the first SIM card. Therefore, in this embodiment of this application, the terminal device may automatically generate the second PIN code of the first SIM card based on information about the first SIM card and/or information about the terminal device. It should be understood that for that the terminal device generates the second PIN code of the first SIM card, refer to the foregoing related description.

After automatically generating the second PIN code of the first SIM card, the terminal device may output the second PIN code, to prompt the user with the second PIN code of the first SIM card. For example, for a manner in which the terminal device prompts the user with the PIN code of the first SIM card, refer to the related description in FIG. 12.

It should be noted that, in a possible implementation, the terminal device may use the PIN code of the first SIM card as the initial PIN code by default, and after generating the second PIN code of the first SIM card, the terminal device may interact with the first SIM card based on the initial PIN code, so that the first SIM card stores the second PIN code of the terminal device. For this process, refer to related descriptions of storing the changed PIN code in the first SIM card in S3032.

In this manner, if the PIN code of the first SIM card is not the initial PIN code, but the terminal device sends the initial PIN code to the first SIM card for verification, the PIN code cannot pass the verification. In this embodiment of this application, the terminal device may prompt the user to enter the PIN code of the first SIM card, to verify the PIN code, and then display the second PIN code of the first SIM card generated by the terminal device when the PIN code passes the verification.

Figure 15A:
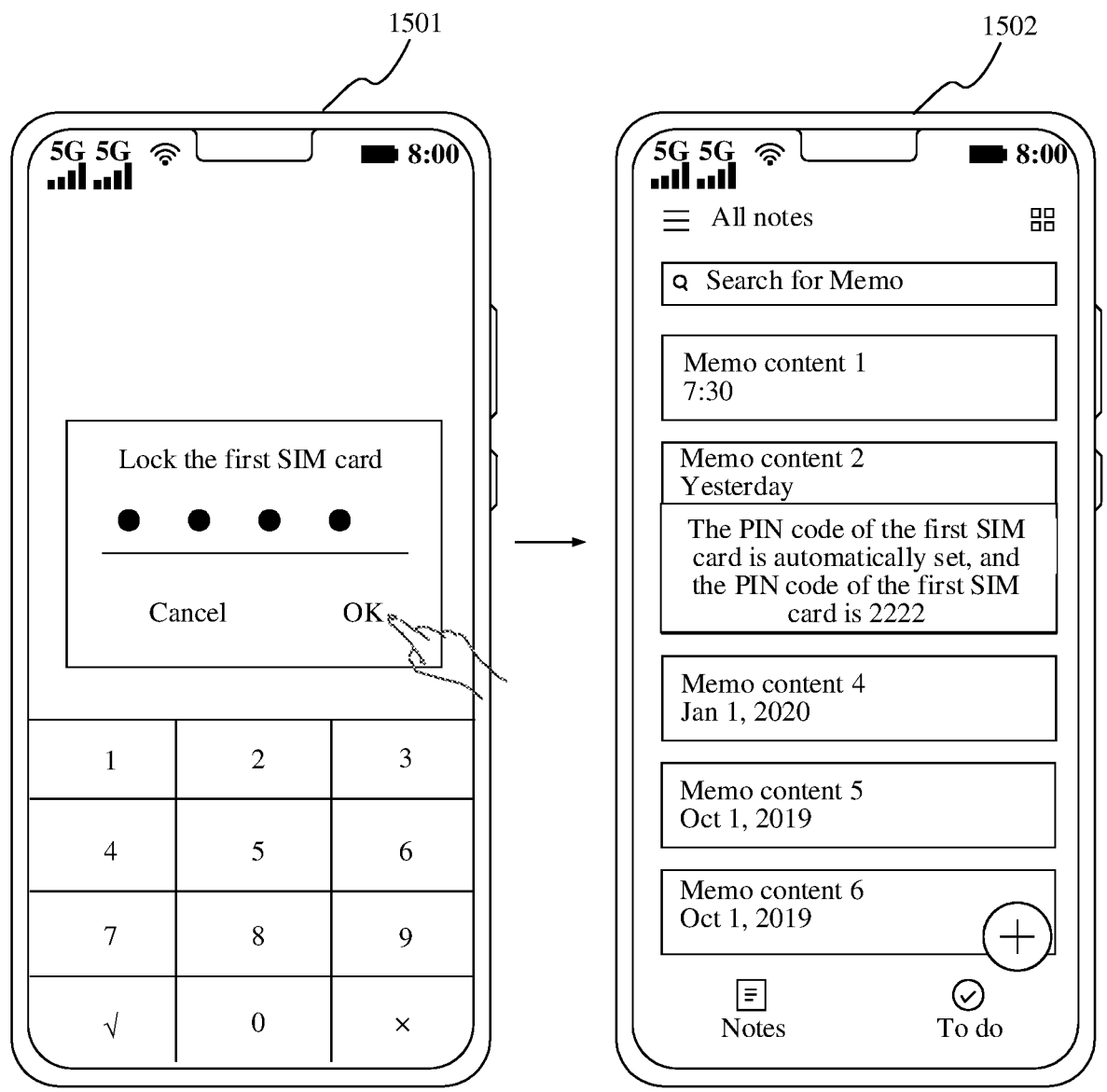
FIG. 15A is a schematic diagram of another interface of a terminal device according to an embodiment of this application.

In a possible implementation, the terminal device may output second prompt information, to prompt the user to enter the PIN code of the first SIM card (for ease of differentiation, that the PIN code of the first SIM card is the initial PIN code is used as an example herein), so as to verify the initial PIN code. When the initial PIN code passes the verification, the PIN code of the first SIM card is automatically enabled, and then the second PIN code of the first SIM card is automatically generated. The outputting the second prompt information by the terminal device may be shown in FIG. 15A, and an interface 1501 in FIG. 15A may be the same as the interface 403 in FIG. 4A-1 and FIG. 4A-2. After the user enters the initial PIN code of the first SIM card, the terminal device may send, to the first SIM card, the initial PIN code of the first SIM card that is entered by the user, and the terminal device may verify the initial PIN code of the first SIM card. When the initial PIN code of the first SIM card passes the verification, the terminal device may enable the PIN code verification function of the first SIM card, so as to generate a second PIN code of the first SIM card, and display an interface the same as the interface shown in FIG. 12, as shown by an interface 1502 in FIG. 15. It should be understood that for that the terminal device verifies the initial PIN code and enables the PIN code verification function of the first SIM card, refer to the foregoing related description.

Figures 1, 15B:
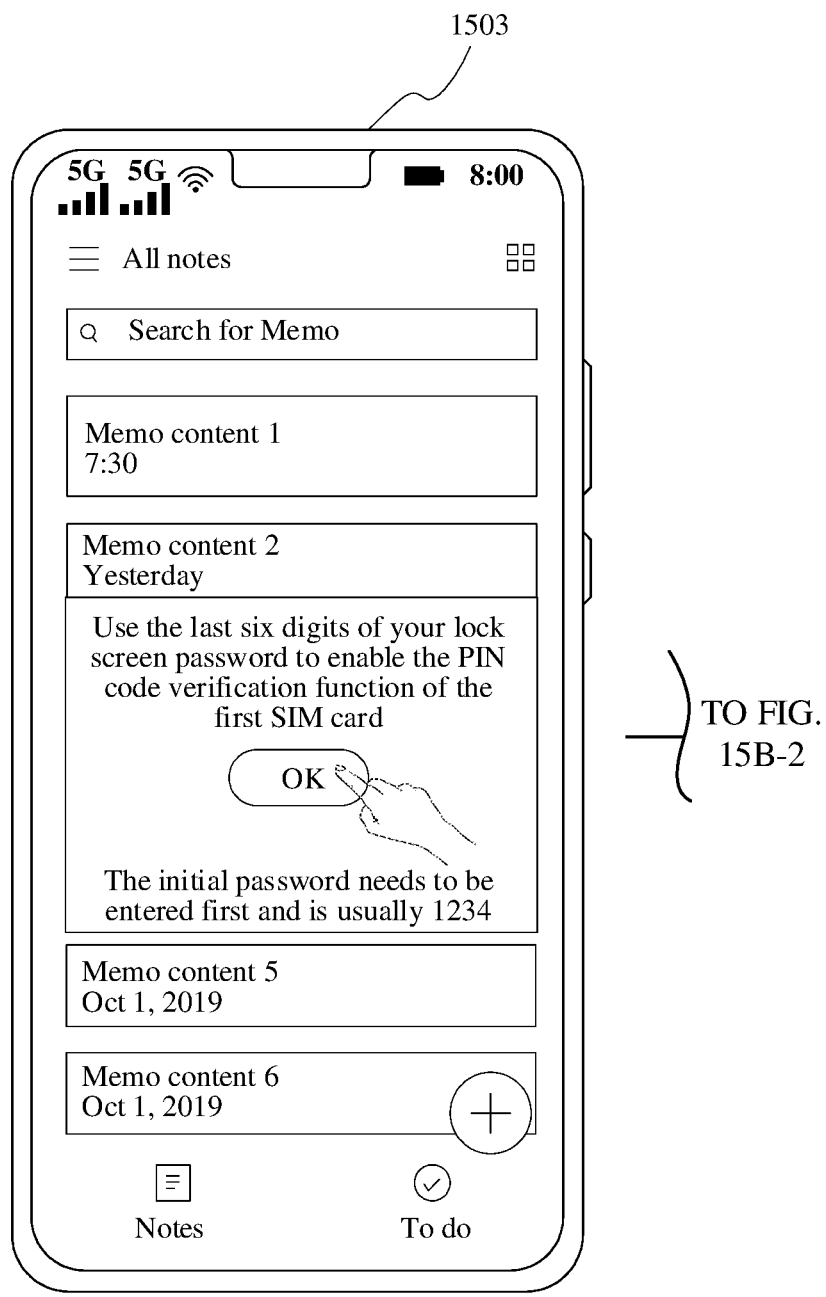
Figures 2, 15B:
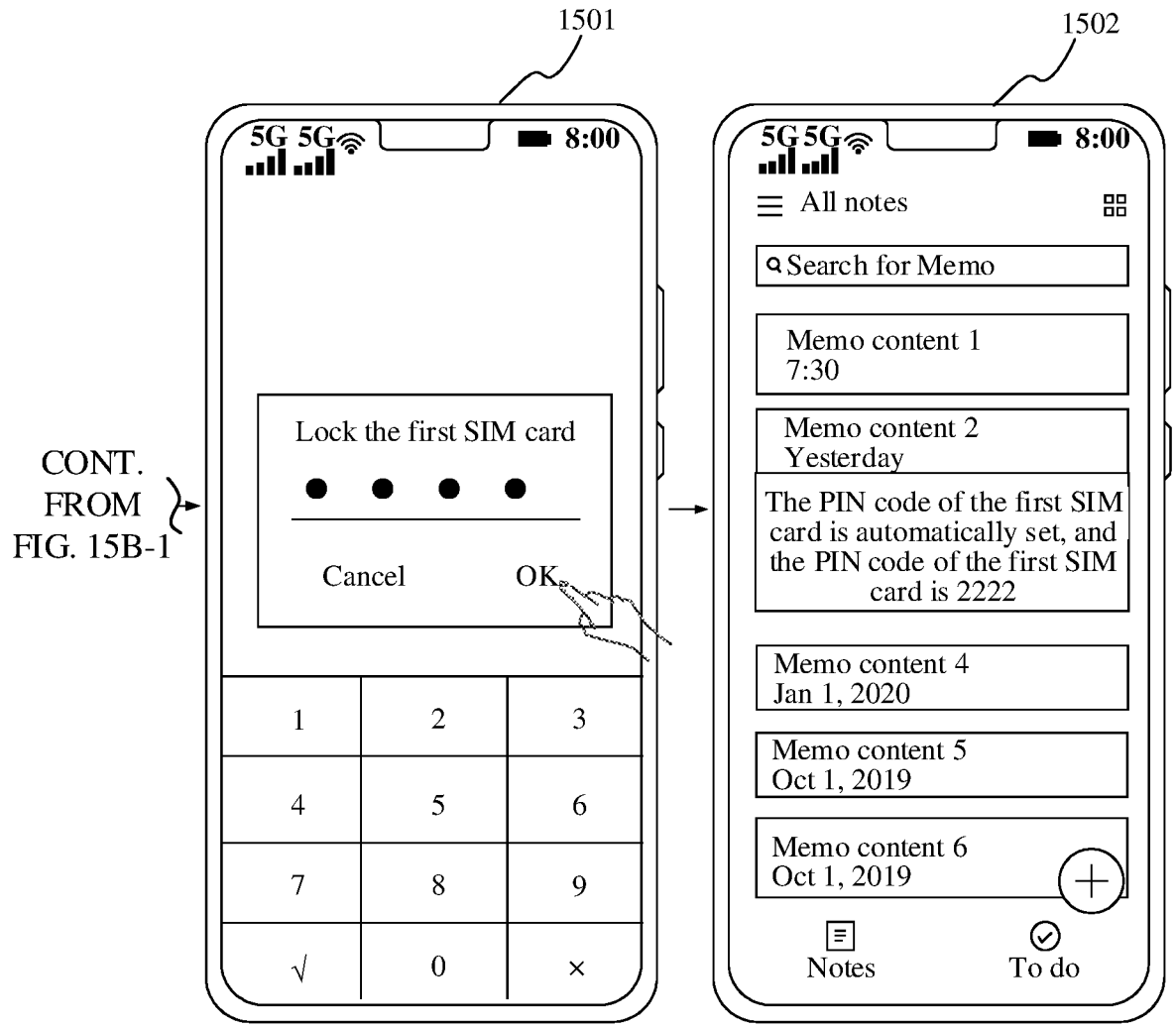

In a possible implementation, when automatically enabling the PIN code of the first SIM card, the terminal device may prompt the user to generate the second PIN code. As shown in FIG. 15B-1 and FIG. 15B-2, a prompt box is displayed on an interface 1503, and the prompt box includes "Use the last four digits of your lock screen password to enable the PIN code verification function of the first SIM card". The last four digits of the lock screen password are the second PIN code of the first SIM card generated by the terminal device. The prompt box further prompts the user to enter the PIN code of the first SIM card (For ease of differentiation, that the PIN code of the first SIM card is the initial PIN code is used as an example herein), to verify the initial PIN code. When the initial PIN code passes the verification, the terminal device uses the last four digits of the lock screen password as the PIN code of the first SIM card. When the user taps the prompt box, the interface 1503 may jump to the interface 1501. After the user enters the initial PIN code of the first SIM card on the interface 1501, the terminal device uses the last four digits of the lock screen password as the second PIN code of the first SIM card. It should be understood that an "OK" control may be displayed in the prompt box. When the user taps the "OK" control, the interface 1503 may jump to the interface 1501. After the user enters the initial PIN code on the interface 1501, the terminal device may display the interface 1502. A form of the prompt box is not limited in embodiments of this application.

It should be understood that if the user enables the PIN code verification function of the first SIM card anytime when the terminal device outputs the first prompt information, or if the user independently enables the PIN code verification function of the first SIM card on the setting interface of the terminal device, the terminal device may continue to perform the steps in S303 to S305.

In S308, the terminal device may obtain the first ICCID of the first SIM card, and then store the mapping relationship between the first ICCID and the second PIN code of the first SIM card.

In this embodiment of this application, if the user has not enabled the PIN code verification function of the first SIM card, the terminal device may continue to prompt the user to enable the PIN code verification function of the first SIM card, so that the user enables the PIN code verification function of the first SIM card. If the user has not enabled the PIN code verification function of the first SIM card continuously, to ensure security of the SIM card, the terminal device may automatically enable the PIN code verification function of the first SIM card, and automatically generate the second PIN code of the first SIM card. Then, the mapping relationship between the first ICCID and the second PIN code is stored in the terminal device, to ensure security of the first SIM card. In this embodiment of this application, when generating the second PIN code, the terminal device may prompt the user with the second PIN code, thereby improving user experience.

Figure 10C:
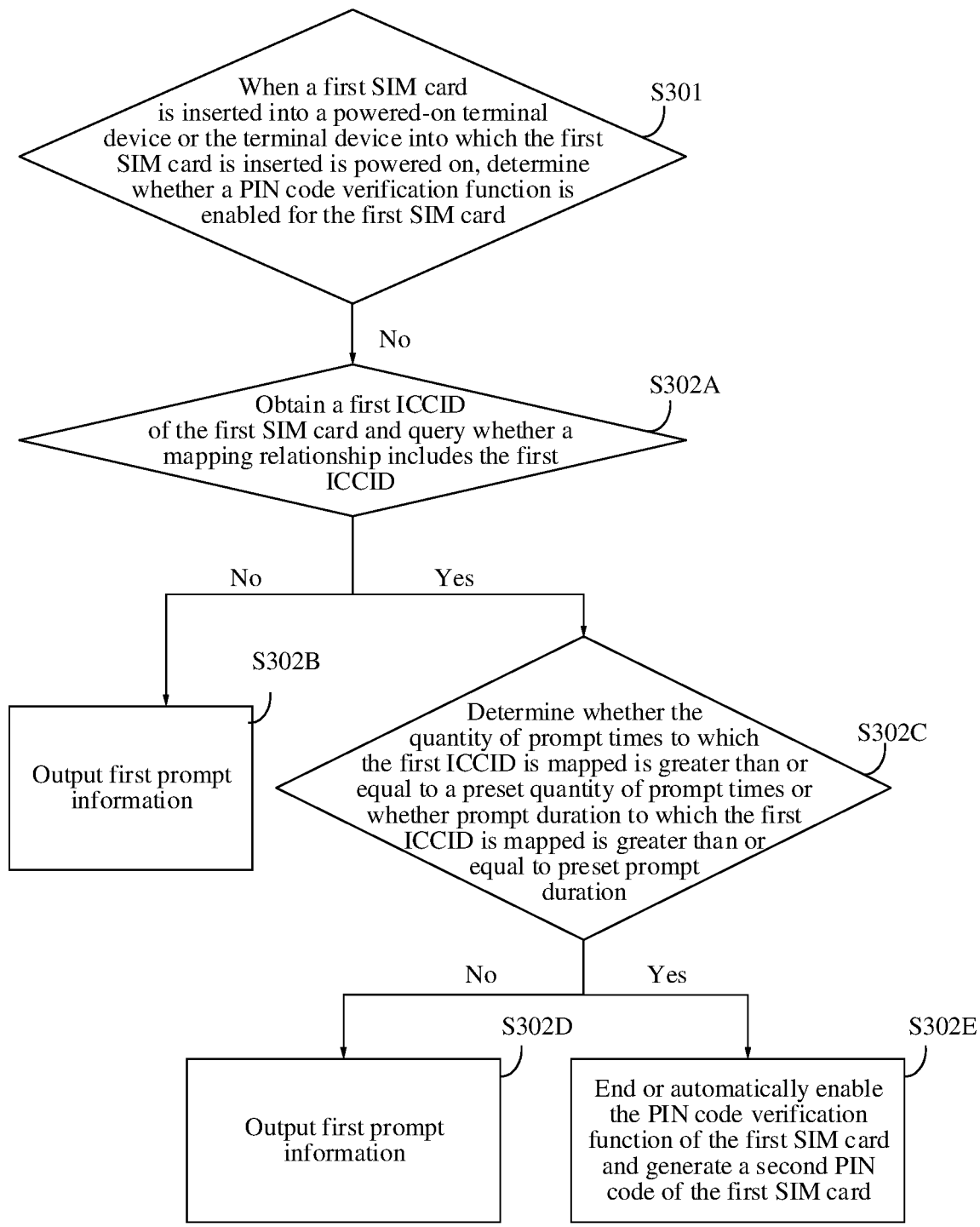
FIG. 10C is a schematic flowchart of another embodiment of a method for verifying a PIN code according to an embodiment of this application.
Figures 1, 11:
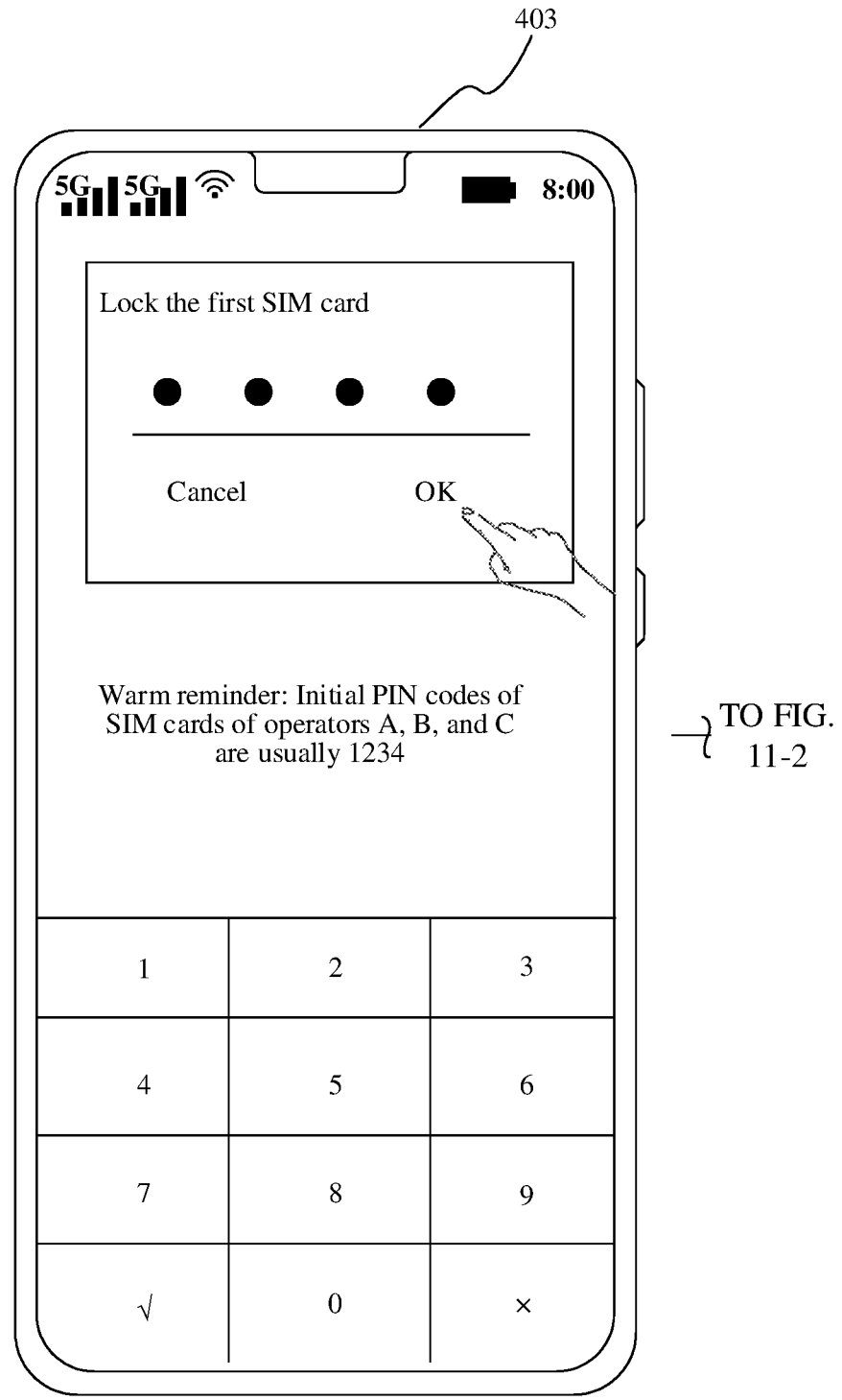
Figures 2, 11:
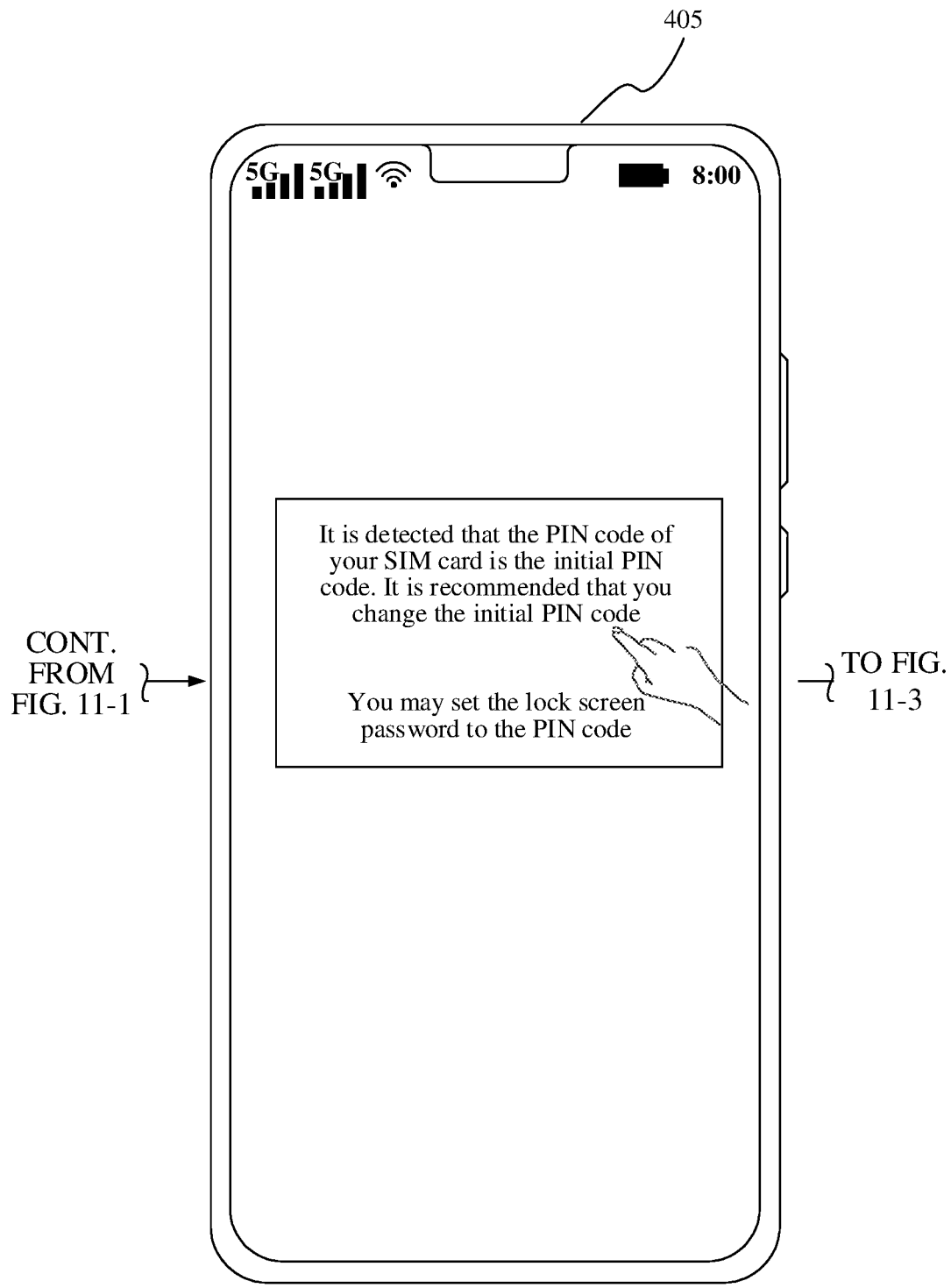
Figures 3, 11:
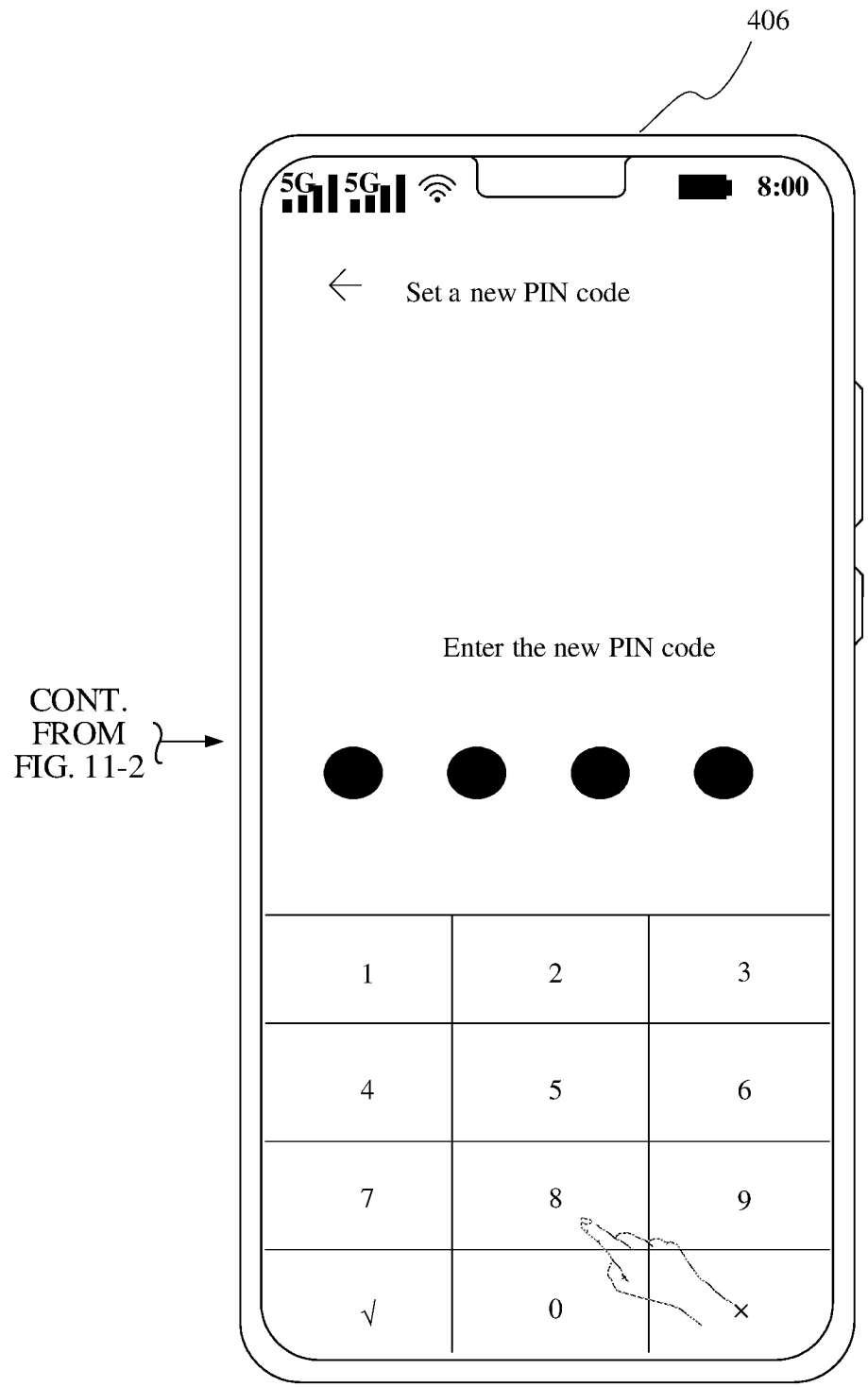

The terminal device may store the mapping relationship shown in Table 6. In an embodiment, as shown in FIG. 10C, after S301, the method for verifying a PIN code in this embodiment of this application further includes:

S302A: Obtain a first ICCID of the first SIM card and query whether the mapping relationship includes the first ICCID if the PIN code verification function is not enabled for the first SIM card.

S302B: Output first prompt information if the mapping relationship does not include the first ICCID.

S302C: Determine whether the quantity of prompt times to which the first ICCID is mapped is greater than or equal to a preset quantity of prompt times or whether prompt duration to which the first ICCID is mapped is greater than or equal to preset prompt duration if the mapping relationship includes a mapping relationship between the first ICCID and a quantity of prompt times or prompt duration.

S302D: Output the first prompt information if the quantity of prompt times of the first SIM card is less than the preset quantity of prompt times, or the prompt duration is less than the preset prompt duration.

S302E: End or automatically enable the PIN code verification function of the first SIM card and generate a second PIN code of the first SIM card if the quantity of prompt times of the first SIM card is greater than or equal to the preset quantity of prompt times or the prompt duration is greater than or equal to the preset prompt duration.

In S302A, if it is detected that the PIN code verification function is not enabled for the first SIM card, the terminal device may read the first ICCID of the first SIM card, and query, in the mapping relationship, whether the first ICCID is included, that is, query whether the mapping relationship includes the mapping relationship of the first ICCID, as shown in Table 6. If the terminal device does not store the first ICCID, it is determined that the first SIM card is inserted into the terminal device for the first time; or if the terminal device stores the first ICCID, it is determined that the first SIM card is not inserted into the terminal device for the first time.

In S302B, if the mapping relationship includes the first ICCID, the terminal device may determine that the first SIM card is inserted into the terminal device for the first time, and the terminal device may output the first prompt information. For details, refer to related descriptions in S302. It should be understood that after performing S302B, the terminal device may perform S303 to S305 in the foregoing embodiment.

In S302C to S302E, the terminal device may prestore preset prompt duration and/or a preset quantity of prompt times, and the preset prompt duration/or the preset quantity of prompt times is predefined. If the mapping relationship includes the first ICCID, the first SIM card is not inserted into the terminal device for the first time. In a possible implementation, to prompt the user to enable the PIN code verification function of the first SIM card as much as possible, but not to cause trouble to the user due to excessive prompt, the terminal device may determine whether the quantity of prompt times to which the first ICCID is mapped is greater than or equal to the preset quantity of prompt times or whether the prompt duration is greater than or equal to the preset prompt duration.

If the quantity of prompt times to which the first ICCID is mapped is less than the preset quantity of prompt times, or the prompt duration to which the first ICCID is mapped is less than the preset prompt duration, the terminal device outputs the first prompt information, to prompt the user to enable the PIN code verification function of the first SIM card. For details, refer to the related description in S302. It should be understood that after performing S302B, the terminal device may perform S303 to S305 in the foregoing embodiment. If the quantity of prompt times to which the first ICCID is mapped is greater than or equal to the preset quantity of prompt times, or the prompt duration to which the first ICCID is mapped is greater than or equal to the preset prompt duration, the terminal device may not prompt the user to enable the PIN code verification function of the first SIM card, to avoid causing trouble to the user due to excessive prompt. Alternatively, in a possible implementation, to ensure security of the first SIM card, the terminal device may automatically enable the PIN code verification function of the first SIM card, and generate the second PIN code of the first SIM card based on the information about the first SIM card and/or the information about the terminal device. For this process, refer to related descriptions in S307 to S308.

In an embodiment, if the mapping relationship includes the first ICCID, the terminal device may query the foregoing Table 6 to detect whether the PIN code verification function has been historically enabled for the first SIM card. For example, the user enables the PIN code verification function of the first SIM card in the terminal device, but the user removes the first SIM card and disables the PIN code verification function of the first SIM card in another terminal device. In this case, the first SIM card records that the PIN code verification function is disabled for the first SIM card. Therefore, when the user inserts the first SIM card back into the terminal device again, the terminal device detects that the PIN code verification function is not enabled for the first SIM card. However, the terminal device may store a record that the user has historically enabled the PIN code verification function of the first SIM card, as shown in Table 6.

If the terminal device stores a record of historically enabling the PIN code verification function for the first SIM card, it is determined that the user tends to enable the PIN code verification function of the first SIM card, and the terminal device may output the first prompt information. If the terminal device does not have a record of historically enabling the PIN code verification function for the first SIM card, it may be determined that the terminal device prompts the user to enable the PIN code verification function of the first SIM card, but the user does not enable the PIN code verification function. In this scenario, in a possible implementation, the terminal device may determine that the user tends not to enable the PIN code verification function of the first SIM card, and then may not prompt the user to enable the PIN code verification function of the first SIM card, that is, end. In a possible implementation, if the terminal device does not have historically enabled the PIN code verification function for the first SIM card, the terminal device may automatically enable the PIN code verification function of the first SIM card, and generate the second PIN code of the first SIM card.

In this embodiment of this application, the terminal device may store a mapping relationship between an ICCID of at least one SIM card and the quantity of prompt times or prompt duration of the first prompt information, and then the terminal device may determine, based on the mapping relationship, whether the user is willing to enable the PIN code verification function of the first SIM card, and then perform a corresponding operation, which is more intelligent.

Figure 16:
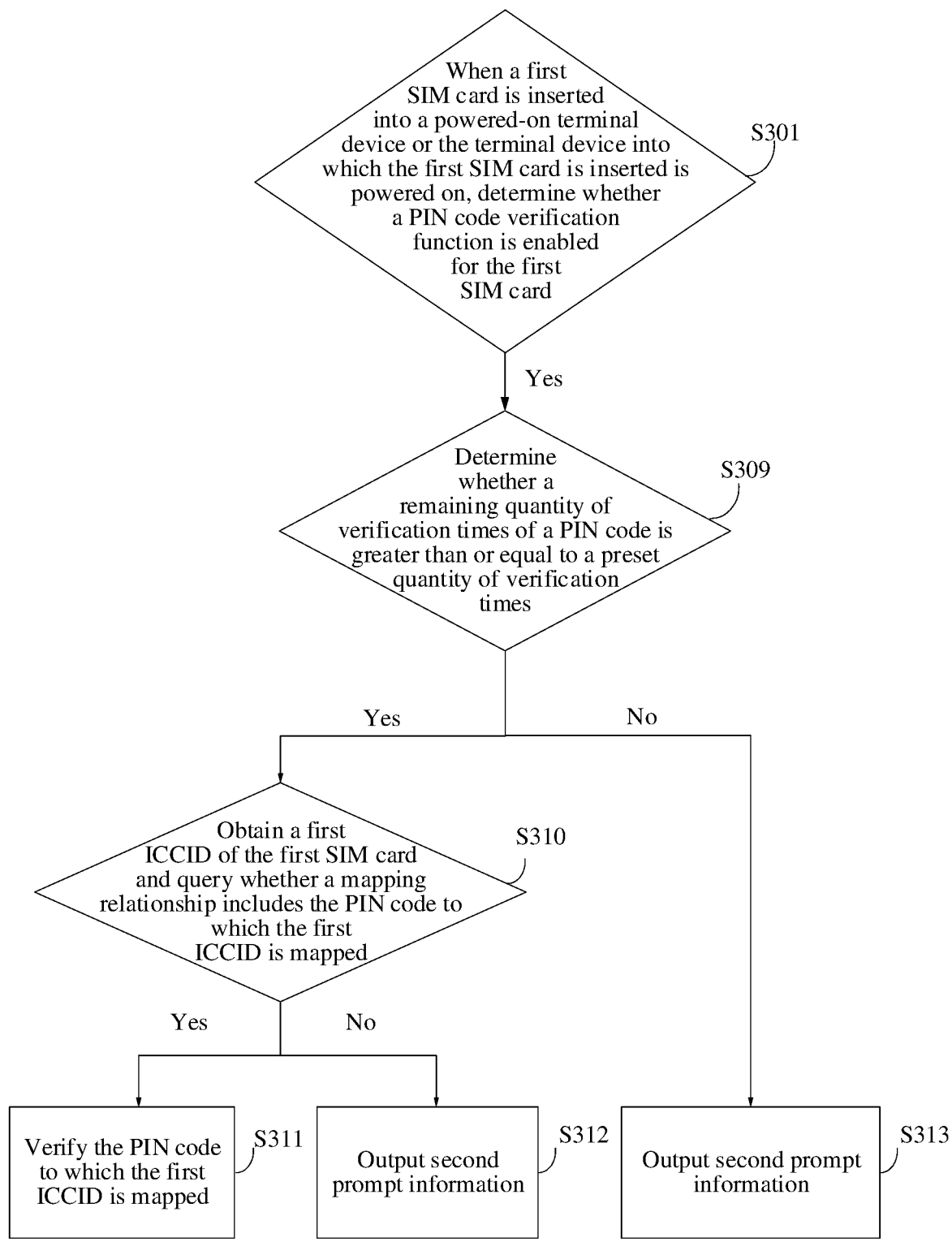
FIG. 16 is a schematic flowchart of another embodiment of a method for verifying a PIN code according to an embodiment of this application.

Corresponding to S302, as shown in FIG. 16, the method for verifying a PIN code provided in this embodiment of this application may include:

S309: Determine whether a remaining quantity of verification times of a PIN code is greater than or equal to a preset quantity of verification times if the PIN code verification function is enabled for the first SIM card.

S310: Obtain a first ICCID of the first SIM card and query whether a mapping relationship includes the PIN code to which the first ICCID is mapped if the remaining quantity of verification times of the PIN code is greater than or equal to the preset quantity of verification times.

S311: Verify the PIN code to which the first ICCID is mapped if the mapping relationship includes the PIN code to which the first ICCID is mapped.

S312: Output second prompt information if the mapping relationship does not include the PIN code to which the first ICCID is mapped.

S313: Output second prompt information if the remaining quantity of verification times of the PIN code is less than the preset quantity of verification times.

For S309 and S313 in this embodiment of this application, refer to the related description in S305.

If the terminal device detects that the PIN code verification function is enabled for the first SIM card, and the remaining quantity of verification times of the PIN code is greater than or equal to the preset quantity of verification times, the terminal device may automatically verify the PIN code to which the first ICCID is mapped. The terminal device may query, in the mapping relationship, whether the PIN code to which the first ICCID is mapped is included. If the PIN code to which the first ICCID is mapped is found, the PIN code to which the first ICCID is mapped is verified. For this verification process, refer to related descriptions in S305.

If the mapping relationship does not include the PIN code to which the first ICCID is mapped, the terminal device may output the second prompt information, to prompt the user to enter the PIN code of the first SIM card and prompt the user to store the mapping relationship between the first ICCID and the PIN code of the first SIM card. For example, as shown in FIG. 17, in a scenario in which the terminal device is powered on, the terminal device may display an interface for entering the PIN code of the first SIM card, and prompt the user on the interface to store the mapping relationship between the first ICCID and the PIN code of the first SIM card. An option such as "Remember the PIN code by this device" is displayed on the interface shown in FIG. 17, so as to prompt that the user can choose to store the PIN code of the first SIM card. It should be understood that if it is detected that the PIN code of the first SIM card entered by the user is the initial PIN code, the terminal device may further prompt the user to change the initial PIN code. For details, refer to related descriptions in FIG. 10A and FIG. 11-1, FIG. 11-2, and FIG. 11-3.

After performing S312, the terminal device may perform S3034, S304, and S305, so that when the PIN code of the first SIM card is verified next time, the PIN code to which the first ICCID is mapped and that is stored in the terminal device is automatically verified.

Figures 1, 18:
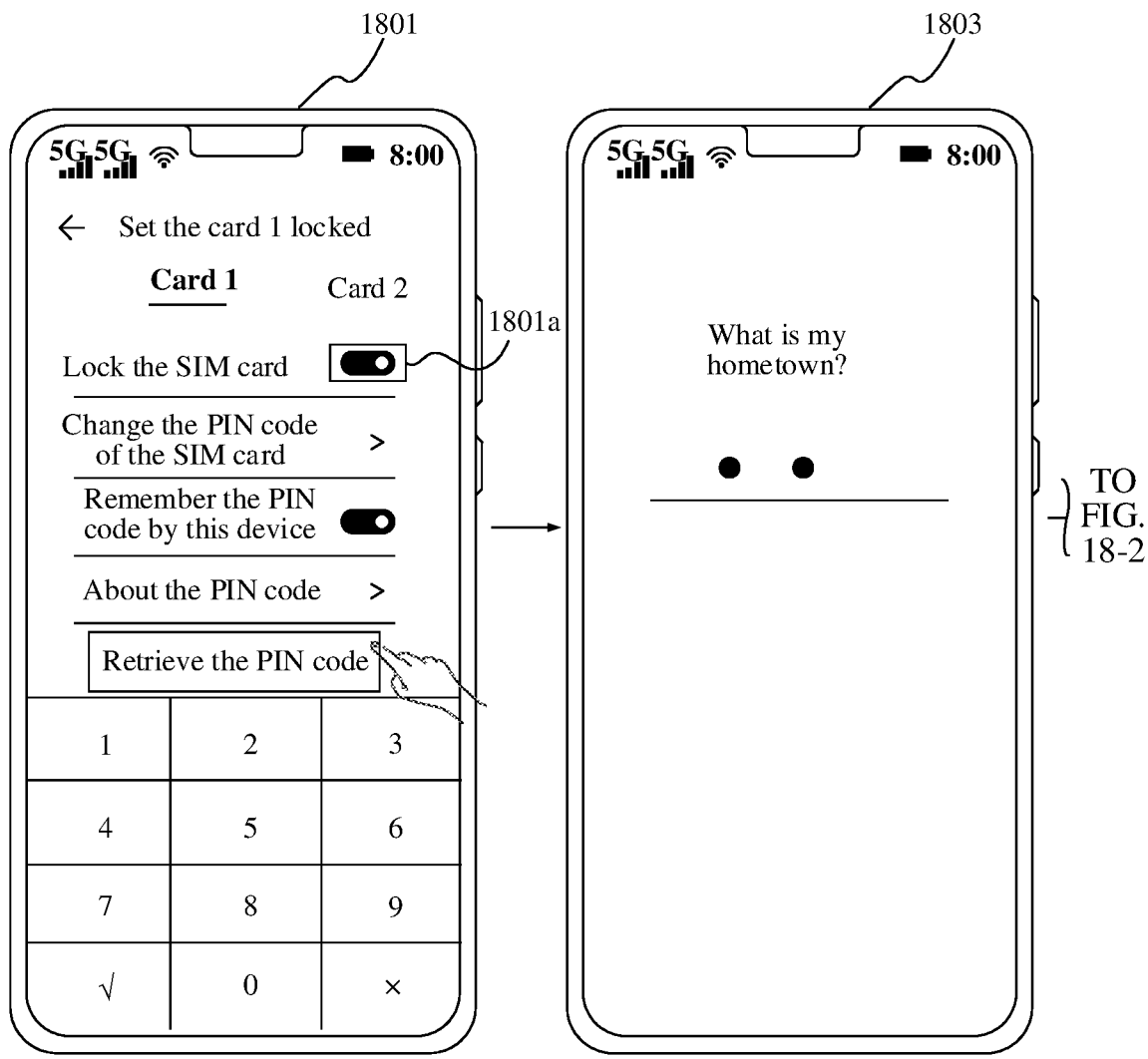
Figures 2, 18:
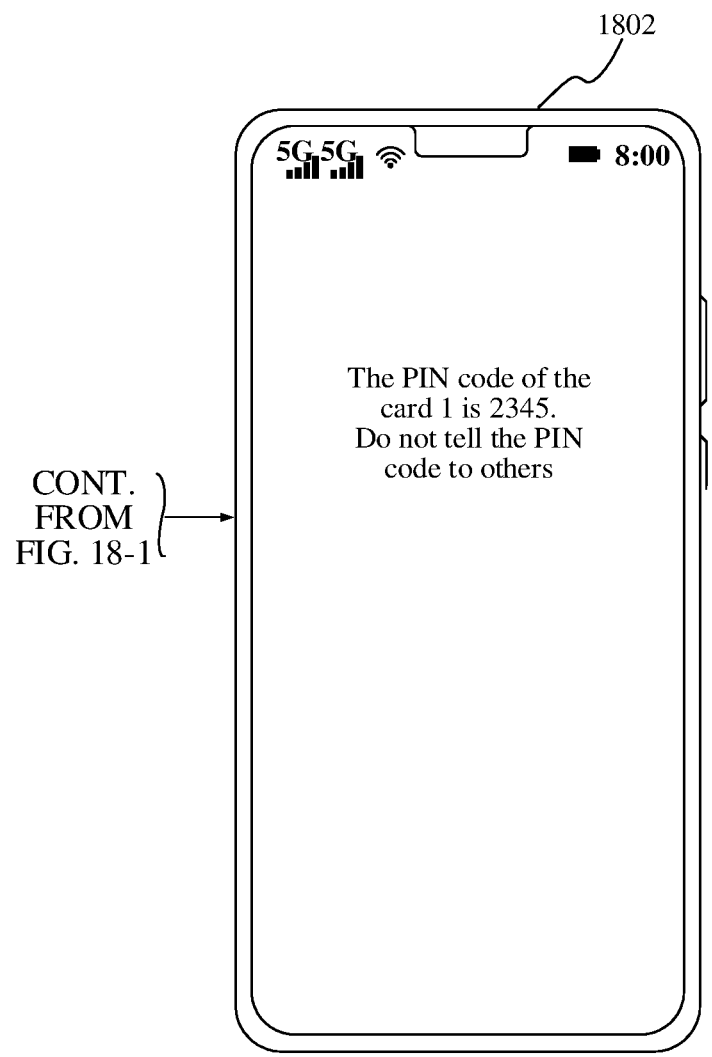

In an embodiment, after the user or the terminal device enables the PIN code verification function of the first SIM card, the user may change the PIN code of the first SIM card on a PIN code setting interface, disable the PIN code verification function of the first SIM card, or disable the function of automatically verifying the PIN code. FIG. 18-1 and FIG. 18-2 are a schematic diagram of a PIN code setting interface. If a first SIM card (for example, a card 1) and a second SIM card (for example, a card 2) are disposed in a terminal device, and a user enables a PIN code verification function of the first SIM card, the PIN code setting interface 1801 may display the PIN code verification function of the first SIM card being in an enabled state. The interface 1801 further displays an option of "Change the PIN code of the first SIM card" and a control of "Disable the PIN code verification function of the first SIM card", and the user may change the PIN code of the first SIM card or disable the PIN code verification function of the first SIM card. When the user changes the PIN code of the first SIM card or disables the PIN code verification function of the first SIM card, the terminal device prompts the user to enter the PIN code of the first SIM card for verification. When the PIN code passes the verification, the user may change the PIN code of the first SIM card or disable the PIN code verification function of the first SIM card. It should be noted that in this embodiment of this application, when the user changes the PIN code of the first SIM card or disables the PIN code verification function of the first SIM card, the user needs to enter the PIN code of the first SIM card for verification, to prevent another malicious user from randomly changing the PIN code of the first SIM card or disabling the PIN code of the first SIM card to threaten privacy and property security of the user, thereby improving security of the SIM card. It should be understood that in this embodiment of this application, a control for enabling or disabling the PIN code verification function of the first SIM card may be 1801a shown on the interface 1801.

When the user taps the option of "Change the PIN code of the first SIM card", the terminal device may display an interface on which the user is prompted to enter the PIN code of the first SIM card. After the user enters the correct PIN code of the first SIM card, the terminal device may jump to an interface such as 407, so that the user enters a new PIN code, so as to change the PIN code. Alternatively, when the user taps the control of "Disable the PIN code verification function of the first SIM card", the terminal device may display an interface on which the user is prompted to enter the PIN code of the first SIM card. After the user enters the PIN code of the first SIM card, the terminal device may disable the PIN code of the first SIM card. In this scenario, if the user forgets the PIN code of the first SIM card, the PIN code of the first SIM card cannot be disabled or changed. Because the terminal device may store the mapping relationship between the ICCID and the PIN code of the SIM card in the local TEE, in this embodiment of this application, the terminal device may prompt the user to retrieve the PIN code of the first SIM card. For example, on an interface that is displayed by the terminal device and on which the user enters the PIN code of the first SIM card, it is prompted that the user can retrieve the PIN code of the first SIM card.

In a possible implementation, the terminal device may prompt, on an interface on which the second prompt information is output, the user to retrieve the PIN code of the first SIM card. That is to say, the second prompt information is further for prompting to retrieve the PIN code. For example, in this embodiment of this application, a control of "Retrieve the PIN code" may be displayed on the interface 403 in FIG. 4A-1 and FIG. 4A-2, the interface shown in FIG. 9, the interface 403 shown in FIG. 11-1, FIG. 11-2, and FIG. 11-3, the interface 407 shown in FIG. 13, the interface 1501 shown in FIG. 15A and FIG. 15B-1 and FIG. 15B-2, and the interface shown in FIG. 17.

In a possible implementation, the interface 1801 may display the control of "Retrieve the PIN code", and the user may tap the control of "Retrieve the PIN code" to obtain the PIN code of the first SIM card. When receiving a PIN code retrieval request entered by the user (for example, it is detected that the user taps the control of "Retrieve the PIN code"), the terminal device may read the first ICCID of the first SIM card, and then query, in the mapping relationship, the PIN code of the first SIM card to which the first ICCID is mapped, so as to feed back the PIN code of the first SIM card to the user. The interface 1801 may jump to an interface 1802, and "the PIN code 2345 of the first SIM card" is displayed on the interface 1802. It should be understood that if the user taps a "card 2" control on the interface 1801, a setting interface of the second SIM card is the same as a setting interface of the first SIM card. It can be understood that when the user taps the control of "Retrieve the PIN code" on the setting interface of the second SIM card, the terminal device may read an ICCID of the second SIM card, and then query, in the mapping relationship, a PIN code to which the ICCID of the second SIM card is mapped, so as to feed back the PIN code to the user. It should be understood that when the card 1 is not inserted into the terminal device, "Retrieve the PIN code" on the interface 1801 is unavailable.

Optionally, the PIN code setting interface may further display a control of "Remember the PIN code by this device", to prompt the user to store the mapping relationship between the first ICCID and the PIN code of the first SIM card. It should be understood that a form of "Remember the PIN code by this device" displayed on the interface 1801 may be different from a form of "Remember the PIN code by this device" on the interface in the foregoing embodiment. The interface 1801 displays "Remember the PIN code by this device" selected by the user. The form of "Remember the PIN code by this device" displayed by the terminal device is not limited in embodiments of this application. It should be understood that the form of "Remember the PIN code by this device" may be understood as: display information that is on the interface and that is for prompting the user to store the mapping relationship between the first ICCID and the PIN code of the first SIM card.

In a possible implementation, while feeding back a PIN code of a SIM card to the user, the terminal device may feed back an identifier of the SIM card corresponding to the PIN code, so that the user can distinguish whether the PIN code fed back by the terminal device is the PIN code of the first SIM card or the PIN code of the second SIM card. The identifier of the SIM card may be "card 1", "card 2", or a phone number corresponding to the SIM card. In this implementation, when receiving a PIN code retrieval request entered by the user, the terminal device may read the first ICCID of the first SIM card, and then query, in the mapping relationship, a PIN code to which the first ICCID is mapped and the identifier of the first SIM card (as shown in Table 4), so as to feed back the PIN code of the first SIM card and the identifier of the first SIM card to the user. For example, "The PIN code of the SIM card to which the phone number 13700000000 belongs is 2345" or "The PIN code of the card 1 is 2345" may be displayed on the interface 1802.

Figure 19:
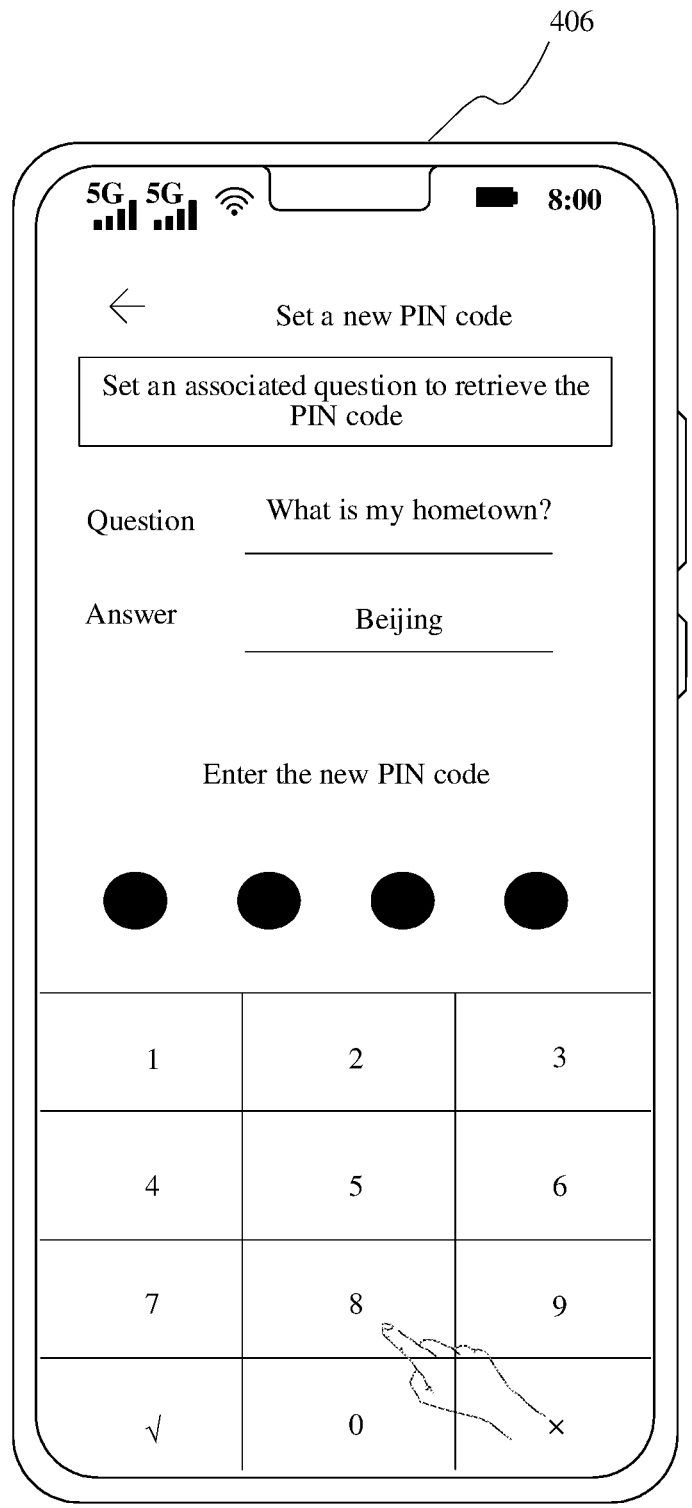
FIG. 19 is a schematic diagram of another interface of a terminal device according to an embodiment of this application.

In this embodiment, to prevent a malicious user from maliciously obtaining the PIN code of the first SIM card in a PIN code retrieval manner, in this embodiment of this application, when the user enables the PIN code verification function of the first SIM card, changes the PIN code of the first SIM card, or independently sets the PIN code of the first SIM card on the setting interface, the user may set an associated question and an answer that are of the first SIM card and that are known by the user and are for retrieving the password. In FIG. 19, an example in which the user changes the PIN code of the first SIM card is used. For example, the interface 406 may further display prompt information of "Set an associated question to retrieve the PIN code", and a setting box for an associated question and an answer, or a selection box for selecting an associated question. FIG. 19 shows an example of an associated question "What is my hometown" entered by the user, and an answer to the associated question is "Beijing". Correspondingly, the terminal device may correspondingly store the associated question, the answer, the first ICCID, the PIN code of the first SIM card, and the identifier of the first SIM card. It should be understood that the associated question in FIG. 19 is an example, and the associated question may be such a question as a user's mobile number, an application account number, or a lock screen password.

In this manner, when the user taps the control of "Retrieve the PIN code" on the interface 1801, the interface 1801 may jump to the interface 1803, and the associated question "What is my hometown" is displayed on the interface 1803. The terminal device collects an answer entered by the user. When the answer entered by the user is the same as the answer of the associated question stored in the terminal device, the interface 1803 may jump to the interface 1802, to display the PIN code of the first SIM card.

In a possible implementation, when the terminal device obtains the mobile number corresponding to the first SIM card (as shown in Table 4), the terminal device may automatically generate the associated question and the answer without manual setting by the user. For example, the terminal device may generate an associated question "What is the mobile number" based on the mobile number corresponding to the first SIM card, and an answer to the associated question is the mobile number "13700000000" corresponding to the first SIM card in Table 4. In this implementation, when the user retrieves the PIN code, the terminal device may display an interface similar to that shown in the interface 1803, where the associated question on the interface is "What is the mobile number". When the user enters the correct answer "13700000000", the interface 1803 may jump to the interface 1802, to display the PIN code of the first SIM card.

In an embodiment, the terminal device may send a mapping relationship between the first ICCID and the PIN code of the first SIM card to a server, so that the server stores the mapping relationship. The terminal device may interact with the server, and the server may assist the user in retrieving the PIN code. It should be understood that the server may be a server corresponding to a system account number of the terminal device, or another server, cloud disk, web disk, or the like that can store a mapping relationship between an ICCID of a SIM card and a PIN code of the SIM card.

Figures 1, 20:
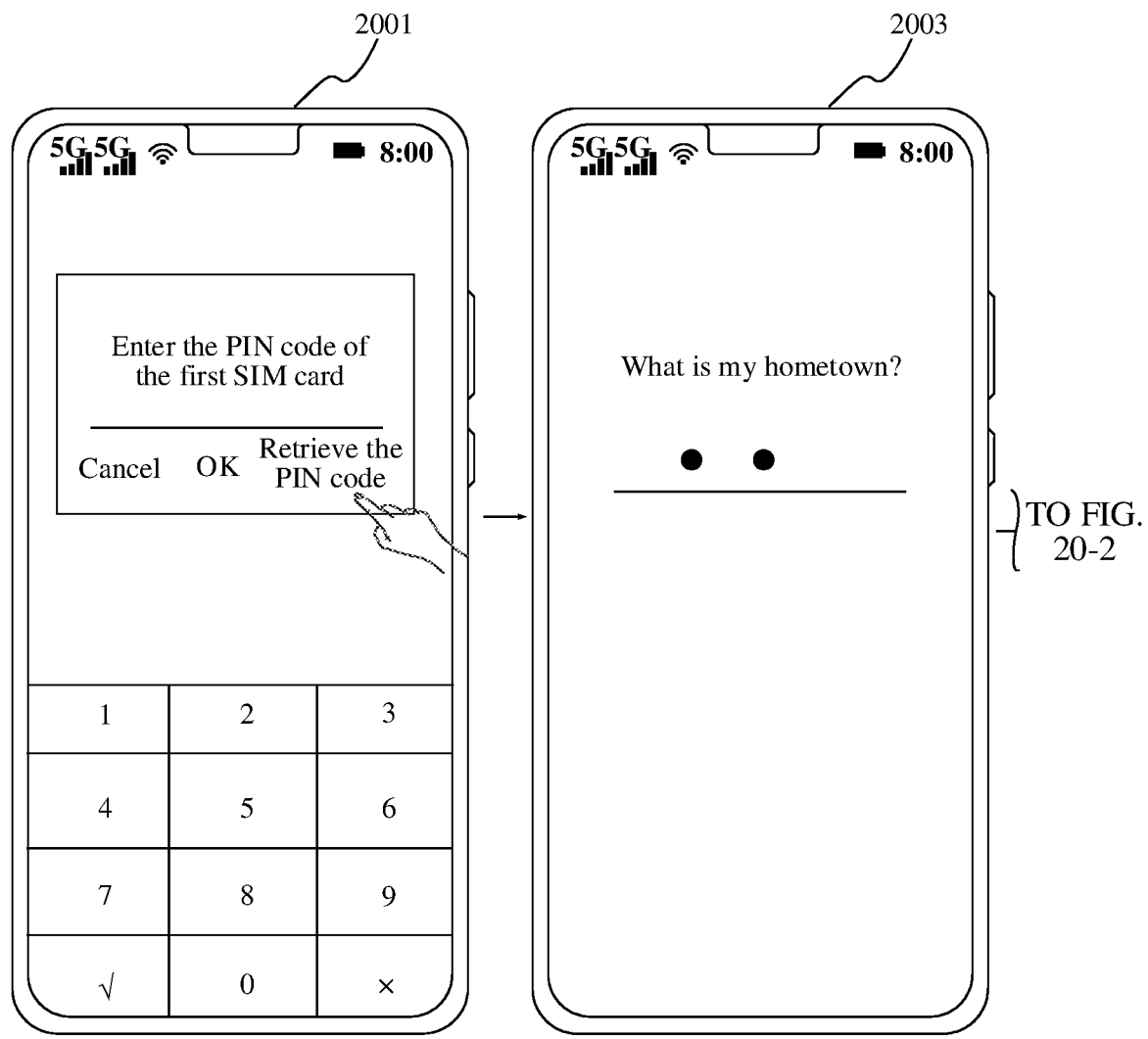
Figures 2, 20:
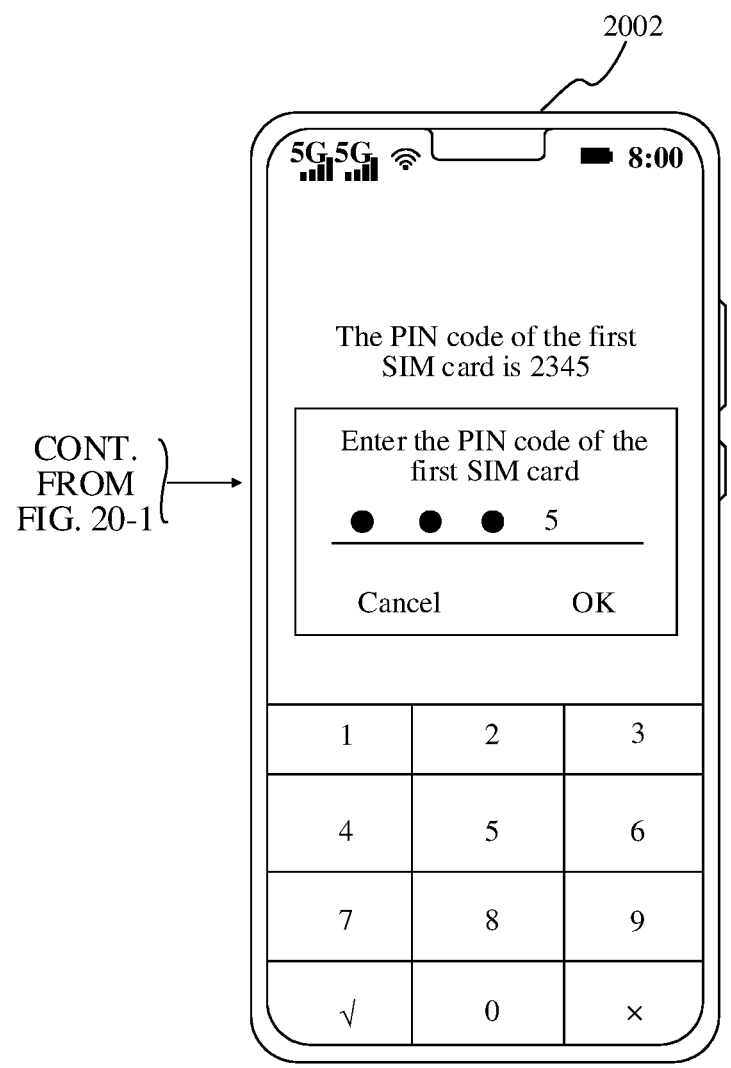

In a possible scenario, if the user removes the first SIM card from the terminal device and uses the first SIM card in another terminal device, and the another terminal device has not stored the mapping relationship between the first ICCID and the PIN code of the first SIM card, the user needs to manually enter the PIN code of the first SIM card. If the user forgets the PIN code of the first SIM card, and the another terminal device cannot prompt the user to retrieve the PIN code, the user cannot use the first SIM card in the another terminal device. For example, when the user inserts the first SIM card into the another terminal device, the another terminal device may interact with a corresponding server to obtain the PIN code of the first SIM card. For example, when outputting the second prompt information, the another terminal device may display a control such as "Retrieve the PIN code", as shown in an interface 2001 in FIG. 20-1 and FIG. 20-2. That is to say, the second prompt information is further for prompting to retrieve the PIN code of the first SIM card. The user may tap the control of "Retrieve the PIN code", and may trigger the another terminal device to obtain the first ICCID of the first SIM card, and send a retrieval request for the PIN code of the first SIM card to the server, where the retrieval request may include the first ICCID of the first SIM card. It should be understood that the another terminal device into which the first SIM card is inserted and the terminal device may be of a same brand, and may further access a same server.

When receiving the retrieval request from the another terminal device, the server may query the stored mapping relationship, obtain the PIN code to which the first ICCID is mapped, and then feed back the PIN code to which the first ICCID is mapped to the another terminal device. Correspondingly, when the another terminal device receives the PIN code from the server, the interface 2001 may jump to an interface 2002. The interface 2002 may display the PIN code 2345 of the first SIM card. Similarly, to prevent a malicious user from maliciously obtaining the PIN code of the first SIM card in a manner of retrieving the PIN code, the user may set an association problem of the first SIM card. For setting the association problem of the first SIM card by the user, refer to related descriptions in the foregoing embodiment. In a possible implementation, when sending the mapping relationship between the first ICCID and the PIN code of the first SIM card to the server, the terminal device may send the associated question of the first SIM card and the answer to the server, so that the server correspondingly stores the associated question, the answer, and the mapping relationship between the first ICCID and the PIN code of the first SIM card. In this manner, when the user taps the control of "Retrieve the PIN code" on the interface 2001, the another terminal device may be triggered to send a retrieval request for the PIN code of the first SIM card to the server. When receiving the retrieval request from the another terminal device, the server may send, to the another terminal device, the associated question, the answer, and the PIN code of the first SIM card to which the first ICCID is mapped. After the another terminal device receives the associated question and the answer, the interface 2001 may jump to an interface 2003. The interface 2003 is the same as the foregoing interface 1803. The another terminal device collects an answer entered by the user. When the answer entered by the user is the same as the answer from the server, the interface 2003 may jump to the interface 2002, to display the PIN code of the first SIM card.

It may be understood that, in a possible implementation, the server may first feed back, when receiving the retrieval request from the another terminal device, the associated question and the answer to which the first ICCID is mapped to the another terminal device; and may then feed back, when receiving a message that is for determining that the correct answer is entered and that is from the another terminal device, the PIN code of the first SIM card to which the first ICCID is mapped to the another terminal device. A manner of interaction between the terminal device and the server is not limited in embodiments of this application.

In a possible scenario, when the terminal device needs to verify the PIN code of the first SIM card, if the user forgets the PIN code of the first SIM card, the terminal device may interact with the server to obtain the PIN code of the first SIM card fed back by the server. For a process of interaction between the terminal device and the server, refer to the foregoing related description.

In a possible scenario, when the user logs in to another terminal device by using a system account number (or a cloud disk/web disk account number) that is the same as that of the terminal device, and the user inserts a first SIM card into the another terminal device in a powered-on state, to retrieve a PIN code of the first SIM card, the another terminal device may interact with a server (cloud disk/web disk) corresponding to the system account number, to obtain the PIN code of the first SIM card fed back by the server (cloud disk/web disk). For a process of interaction between the another terminal device and the server (cloud disk/web disk) corresponding to the system account number, refer to the foregoing related description.

In this embodiment of this application, the terminal device may send the mapping relationship between the first ICCID and the PIN code of the first SIM card to the server, so that when the user forgets the PIN code of the first SIM card, the PIN code of the first SIM card may be retrieved through the server. In addition, when the user enables or disables the PIN code verification function of the first SIM card, or changes the PIN code of the first SIM card, the user may further set an associated question of the first SIM card, so as to ensure security of the PIN code of the first SIM card by using the associated question during password retrieval.

In the foregoing embodiments, when the terminal device is powered on, if a lock screen password is set for the terminal device, the terminal device may first display an interface for entering the PIN code of the first SIM card, and when the user enters a correct PIN code, the terminal device displays the lock screen interface. Alternatively, the terminal device verifies the PIN code based on the mapping relationship between the first ICCID and the PIN code of the first SIM card, and displays the lock screen interface when the PIN code passes the verification. In other words, in each of the foregoing embodiments, the terminal device first verifies the PIN code of the first SIM card, and then displays the lock screen interface to verify the lock screen password. However, in this embodiment of this application, to further improve verification security of the PIN code of the first SIM card, when a lock screen password is set for the terminal device, a lock screen interface may be first displayed, the user may enter a lock screen password, and the terminal device verifies the lock screen password entered by the user. When the lock screen password passes the verification, the terminal device automatically verifies the PIN code of the first SIM card.

Herein, with reference to a scenario, an advantage that the terminal device first verifies the lock screen password and then verifies the PIN code is described. For example, if the terminal device automatically verifies the PIN code, after the malicious user obtains the terminal device of the user, the terminal device automatically verifies the PIN code after the malicious user powers the terminal device on again, and the malicious user may use the first SIM card. In this way, even if the malicious user does not know the lock screen password of the terminal device, the malicious user can still answer an incoming call of the terminal device, and can obtain a verification code of an application in a manner of answering the incoming call, thereby threatening privacy and property security of the user. However, in this embodiment of this application, the terminal device may first verify the lock screen password and then verify the PIN code. Therefore, when the malicious user powers the terminal device on again, the malicious user needs to enter the lock screen password of the terminal device to unlock the first SIM card before using the first SIM card. In this embodiment of this application, the lock screen password protects the first SIM card, so that security of the SIM card can be improved.

Figure 21:
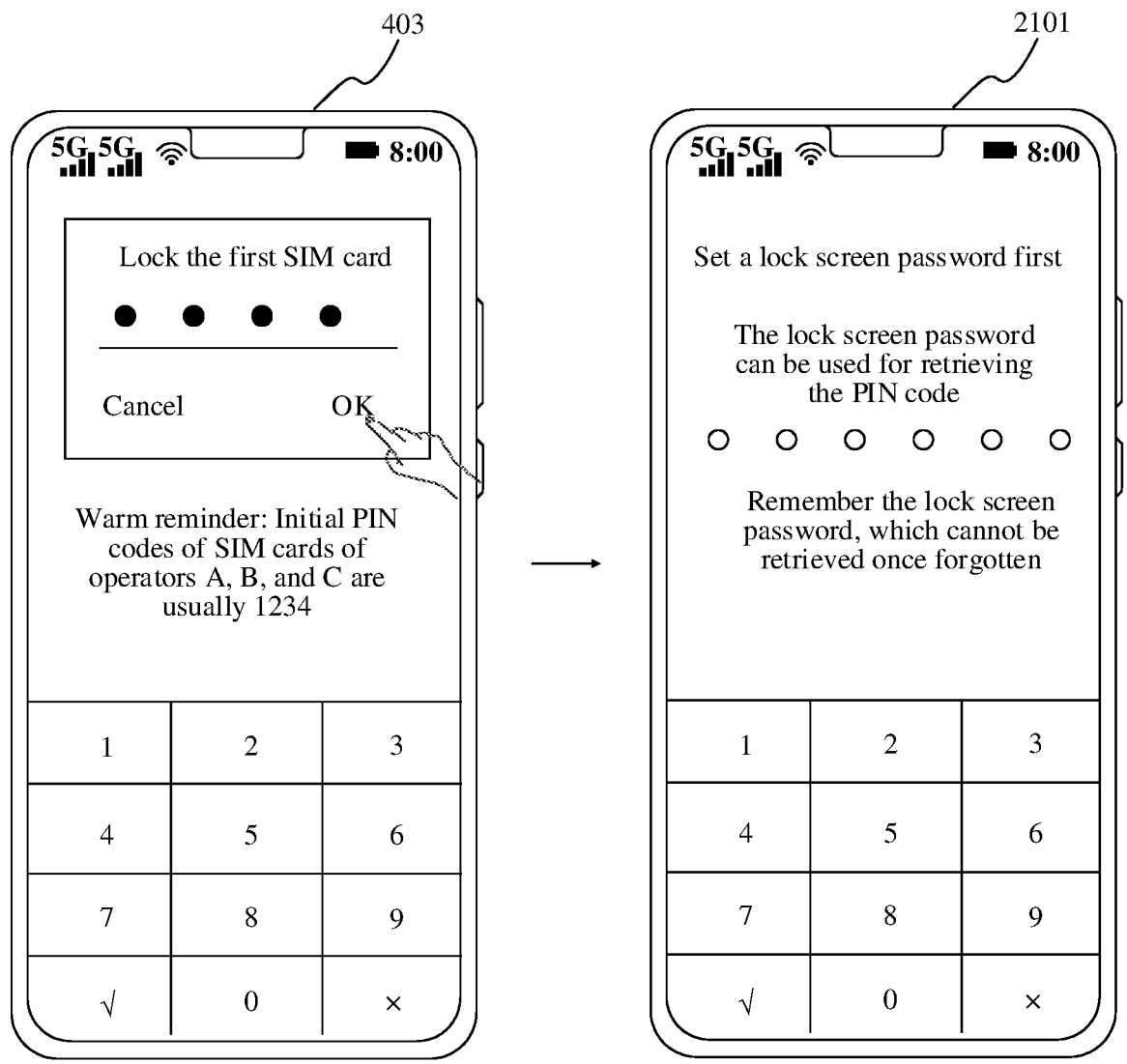
FIG. 21 is a schematic diagram of another interface of a terminal device according to an embodiment of this application.

It should be noted that different from the foregoing embodiment, because verification of a PIN code in this embodiment of this application is combined with verification of a lock screen password, the lock screen password needs to be set for the terminal device. In a possible implementation, as shown in FIG. 7, when the user taps the "Set now" control on the interface shown in FIG. 7, the interface shown in FIG. 7 may jump to the interface 402 in FIG. 4A-1 and FIG. 4A-2 or the interface 402a in FIG. 4B. When the user taps the "Lock the SIM card" control, the interface 402 jumps to the interface 403. In this case, if no lock screen password is set for the terminal device, the interface 403 may jump to an interface 2101 in FIG. 21. The interface is for prompting the user to set a lock screen password. After the user sets the lock screen password on the interface 2101, the PIN code verification function of the first SIM card is successfully enabled. FIG. 21 represents only an interface transition from the interface 403 to the interface 2101.

Figure 22:
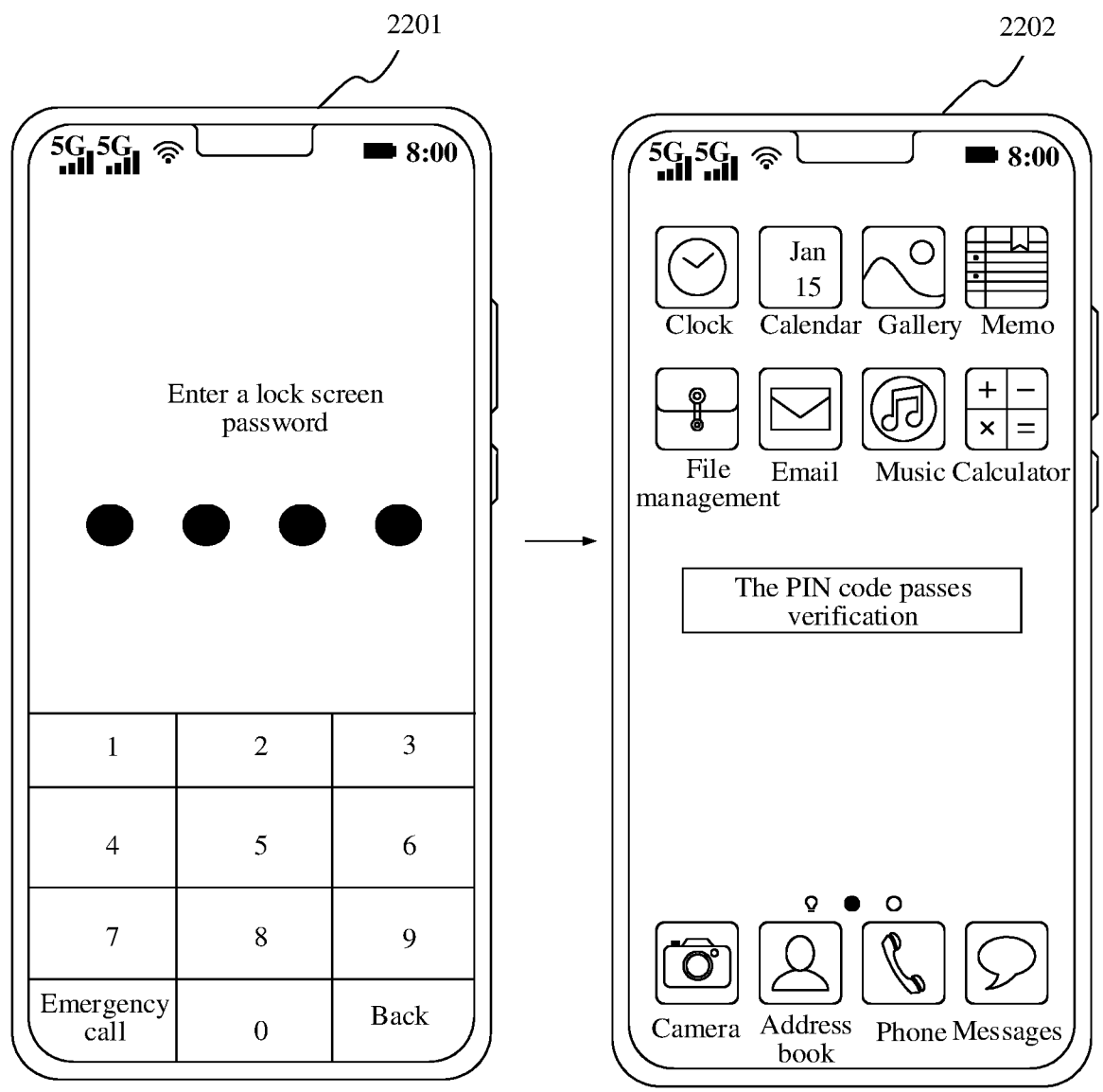
FIG. 22 is a schematic diagram of another interface of a terminal device according to an embodiment of this application.

FIG. 22 is described by using an example in which the terminal device automatically verifies the PIN code of the first SIM card. The interface 2201 shows a lock screen interface displayed after the terminal device is powered on. After the user enters a correct lock screen password, the interface 2201 may jump to an interface 2202, and the interface 2202 may display a home page of the terminal device. To indicate that the terminal device first verifies the lock screen password and then automatically verifies the PIN code of the first SIM card, the terminal device may display, on the interface 2202, prompt information such as "The PIN code passes the verification".

In this embodiment of this application, the PIN code is verified by associating lock screen password verification. Before verifying the PIN code, the terminal device first verifies the lock screen password. The lock screen password protects the first SIM card, thereby improving security of the first SIM card.

Figure 23A:
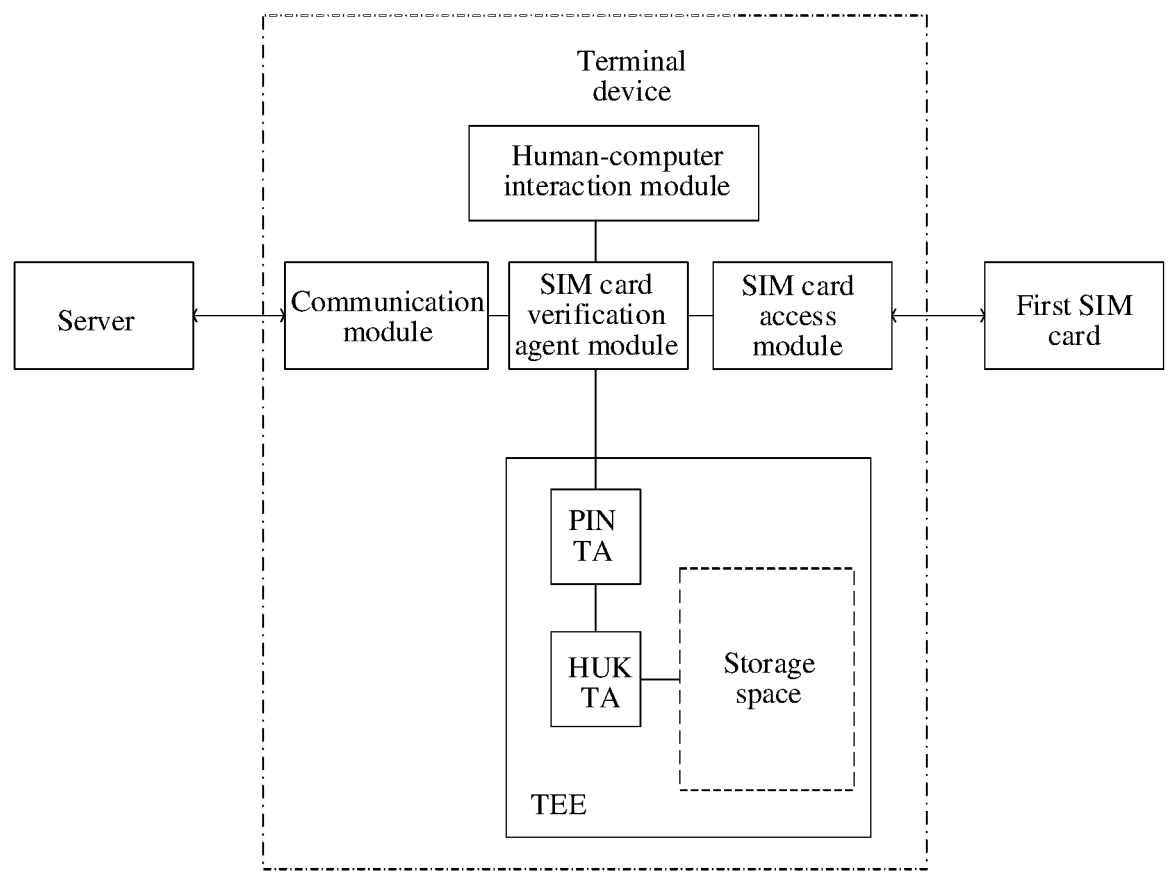
FIG. 23A is a schematic diagram of a structure of a terminal device according to an embodiment of this application.

FIG. 23A is a schematic diagram of another structure of a terminal device according to an embodiment of this application. As shown in FIG. 23A, the terminal device may include a SIM card verification agent module, a SIM card access module, a human-computer interaction module, a communication module, and a TEE.

The SIM card verification agent module is configured to store a mapping relationship between an ICCID of a SIM card and a PIN code of the SIM card, and verify the PIN code. The SIM card access module may be an access interface, and the access interface is configured to interact with a first SIM card, to perform a read/write operation on the first SIM card. The human-computer interaction module is configured to output prompt information or receive an instruction entered by a user. The prompt information is, for example, the foregoing first prompt information, second prompt information, and third prompt information. The instruction entered by the user may be an enabling instruction or a storage instruction. The human-computer interaction module may include but is not limited to the display 170 and the sensor 180 shown in FIG. 1, or the audio module 170 and the sensor 180 shown in FIG. 1. The communication module is configured to implement communication between the terminal device and another electronic device (such as a server). The communication module may include the mobile communication module 150 and the wireless communication module 160 shown in FIG. 1.

In this embodiment of this application, to enable the SIM card verification agent module to store, in the TEE, the mapping relationship between an ICCID of a SIM card and a PIN code of the SIM card, a trusted application that interacts with the SIM card verification agent module, such as a PIN trusted application (PIN TA) may be preset in the TEE. When the SIM card verification agent module calls a trusted API of the TEE, the PIN TA is for enabling the SIM card verification agent module to read and write data stored in the TEE. The TEE may further include a hardware unique key trusted application (hardware unique key trusted application, HUK TA), and the HUK TA is configured to encrypt and decrypt, by using a hardware unique key (hardware unique key, HUK), data stored in the TEE. A process of presetting the PIN TA is not described in detail in this embodiment of this application. For details, refer to related descriptions of the current payment TA or fingerprint verification TA.

With reference to FIG. 23A, the following describes the method for verifying a PIN code provided in embodiments of this application from a perspective of module interaction.

In S301, when the first SIM card is inserted into the powered-on terminal device or the terminal device into which the first SIM card is inserted is powered on, the SIM card access module may send a select EF 3f00 command to the first SIM card. The first SIM card may feed back information such as a type of the first SIM card, information about whether the PIN code verification function is enabled for the first SIM card, and a remaining quantity of verification times of the PIN code to the SIM card access module. For this process, refer to related descriptions in S301 in the foregoing embodiments. The SIM card access module may determine, based on the information about whether the PIN code verification function is enabled for the first SIM card, whether the PIN code verification function is enabled for the first SIM card.

In S302, when determining that the PIN code verification function is not enabled for the first SIM card, the SIM card access module may send, to the SIM card verification agent module, information indicating that the PIN code verification function is not enabled for the first SIM card, and the SIM card verification agent module may send a first prompt request to the human-computer interaction module, so as to prompt the human-computer interaction module to output first prompt information. It should be understood that the SIM card verification agent module may alternatively interact with the human-computer interaction module by using another module. In this embodiment of this application, an example in which the SIM card verification agent module directly interacts with the human-computer interaction module is used for description.

In S303, the human-computer interaction module may receive the instruction entered by the user. When the human-computer interaction module receives the enabling instruction entered by the user, the human-computer interaction module may send the enabling instruction to the SIM card verification agent module. The SIM card verification agent module enables the PIN code verification function of the first SIM card based on the enabling instruction. It should be understood that, that the SIM card verification agent module enables the PIN code verification function of the first SIM card may be understood as: The SIM card verification agent module may send the enabling instruction to the SIM card access module, and the SIM card access module sends the enabling instruction to the first SIM card. The first SIM card modifies the information that is stored in the first SIM card and that indicates whether the PIN code verification function is enabled for the first SIM card, for example, may change a state of whether the PIN code verification function is enabled for a SIM card from "disabled" to "enabled".

In a possible implementation, after enabling the PIN code verification function, the first SIM card may feed back an enabling response to the SIM card access module, where the enabling response is for representing that the PIN code verification function is enabled for the first SIM card. The SIM card access module may send the enabling response to the SIM card verification agent module, and the SIM card verification agent module may send a second prompt request to the human-computer interaction module, to prompt the human-computer interaction module to output second prompt information. After outputting the second prompt information, the human-computer interaction module may collect a PIN code of the first SIM card entered by the user, and may send the PIN code of the first SIM card to the SIM card verification agent module. In addition, when receiving the enabling response, the SIM card access module may further read a first ICCID of the first SIM card, and may send the first ICCID to the SIM card verification agent module. A manner in which the SIM card access module reads the first ICCID of the first SIM card may be: The SIM card access module sends a SELECT FILE command to the first SIM card, to select a folder for an ICCID stored in the first SIM card, and then the SIM card access module may send a READ BINARY command to the first SIM card to read the first ICCID in the folder. The SIM card verification agent module may store the mapping relationship between the first ICCID and the PIN code of the first SIM card into the TEE.

That the SIM card verification agent module stores the mapping relationship between the first ICCID and the PIN code of the first SIM card into the TEE may be: The SIM card verification agent module calls the API to send the mapping relationship between the first ICCID and the PIN code of the first SIM card to the PIN TA in the TEE. The PIN TA may send the mapping relationship between the first ICCID and the PIN code of the first SIM card to the HUK TA. The HUK TA may encrypt the mapping relationship between the first ICCID and the PIN code of the first SIM card by using a hardware unique key, and store the encrypted mapping relationship into storage space in the TEE. In the figure, a dotted box is for representing the storage space in the TEE.

In S304, when the first SIM card is inserted into the terminal device again or the terminal device is powered on again, the SIM card access module may read the first ICCID of the first SIM card, and send the first ICCID to the SIM card verification agent module.

In S305, after receiving the first ICCID from the SIM card access module, the SIM card verification agent module may query, in the mapping relationship stored in the TEE, the PIN code to which the first ICCID is mapped, and verify the PIN code to which the first ICCID is mapped. That the SIM card verification agent module queries, in the TEE, the PIN code to which the first ICCID is mapped may be: The SIM card verification agent module may send a read request to the PIN TA, where the read request may include the first ICCID, and the PIN TA may send the read request to the HUK TA. The HUK TA may decrypt the mapping relationship in the TEE based on the read request by using the hardware unique key, query, based on the first ICCID, the PIN code to which the first ICCID is mapped, and feed back, to the SIM card verification agent module by using the PIN TA, the PIN code to which the first ICCID is mapped.

It should be understood that a manner in which the SIM card verification agent module verifies the PIN code to which the first ICCID is mapped may be: The SIM card verification agent module sends, to the first SIM card by using the SIM card access module, the PIN code to which the first ICCID is mapped, and the first SIM card verifies the PIN code to which the first ICCID is mapped. For details, refer to the description in S305 in the foregoing embodiments. The first SIM card may send a verification result to the SIM card verification agent module by using the SIM card access module, and the SIM card verification agent module may send the verification result to the human-computer interaction module, so that the human-computer interaction module displays the verification result.

For that the SIM card verification agent module enables the PIN code verification function of the first SIM card in S3031, refer to the description of module interaction in S303. The SIM card verification agent module may store an initial PIN code, and the initial PIN code may be a PIN code preset by an operator to which the SIM card belongs. If the SIM card verification agent module determines that the PIN code of the first SIM card is the initial PIN code, it is determined that the PIN code of the first SIM card is the first PIN code, and the SIM card verification agent module may send a third prompt request to the human-computer interaction module, to prompt the human-computer interaction module to output third prompt information.

In S3032, the human-computer interaction module may obtain the changed PIN code entered by the user, and send the changed PIN code to the SIM card verification agent module. The SIM card verification agent module may store the mapping relationship between the first ICCID and the changed PIN code into the TEE. For details, refer to the description that the SIM card verification agent module stores the mapping relationship between the first ICCID and the PIN code of the first SIM card.

For a process in which the SIM card verification agent module enables the PIN code verification function of the first SIM card in S3033, refer to the description of module interaction in S303. When the user enters the enabling instruction, the SIM card verification agent module may send the second prompt request to the human-computer interaction module, to prompt the human-computer interaction module to output the second prompt information.

In S3034, after outputting the second prompt information, the human-computer interaction module may receive the instruction entered by the user. When receiving the storage instruction entered by the user, the human-computer interaction module may send the storage instruction to the SIM card verification agent module. The SIM card verification agent module may store the mapping relationship between the first ICCID and the PIN code of the first SIM card. Similarly, if the human-computer interaction module does not receive the storage instruction entered by the user, the human-computer interaction module may send a record instruction to the SIM card verification agent module, where the record instruction is for instructing the SIM card verification agent module to store an operation record of the user, as shown in Table 3 to Table 6.

In a possible implementation, when the human-computer interaction module does not receive the storage instruction entered by the user, because the SIM card verification agent module does not need to store the mapping relationship between the first ICCID and the PIN code of the first SIM card, the SIM card verification agent module may store "not include the mapping relationship between the first ICCID and the PIN code of the first SIM card" in the REE, and store "include the mapping relationship between the first ICCID and the PIN code of the first SIM card" in the TEE. In this way, a speed of reading the mapping relationship by the SIM card verification agent module is increased. In this manner, when obtaining the first ICCID of the first SIM card, the SIM card verification agent module may first query whether the REE includes the first ICCID. If the REE includes the first ICCID, the SIM card verification agent module may determine that the mapping relationship between the first ICCID and the PIN code of the first SIM card is not stored in the TEE, and then may interact with the human-computer interaction module, to output the first prompt information or the second prompt information. In this case, because the SIM card verification agent module may not need to interact with the TEE, a speed of reading the mapping relationship can be increased. If the REE does not include the first ICCID, the SIM card verification agent module may query the TEE to obtain the PIN code to which the first ICCID is mapped. For details, refer to the foregoing related description.

In S306, the human-computer interaction module may continue to output the first prompt information based on a preset prompt rule if a cancellation instruction entered by a user is received.

In S307, in a possible implementation, the human-computer interaction module may send a cancellation instruction to the SIM card verification agent module, and the SIM card verification agent module may store an operation record of the user, a quantity of prompt times, or prompt duration, as shown in Table 5 to Table 6. If the SIM card verification agent module determines that a quantity of prompt times reaches a preset quantity of prompt times or prompt duration reaches preset prompt duration, the PIN code verification function of the first SIM card is enabled, and a second PIN code of the first SIM card is generated. For a process in which the SIM card verification agent module enables the PIN code verification function of the first SIM card, refer to the description of module interaction in S303. For that the SIM card verification agent module generates the second PIN code of the first SIM card, refer to the description of generating the second PIN code by the terminal device in S307.

It should be understood that, in a possible implementation, the SIM card verification agent module may send the second PIN code to the first SIM card by using the SIM card access module, so that the first SIM card stores the second PIN code. For that the SIM card access module interacts with and the first SIM card so that the first SIM card stores the second PIN code, refer to the description in S307.

In S308, after generating the second PIN code of the first SIM card, the SIM card verification agent module may read the first ICCID of the first SIM card by using the SIM card access module, and store the mapping relationship between the first ICCID and the second PIN code of the first SIM card.

For the interaction between the modules in S302A, refer to the description in S305. In S302B, the SIM card verification agent module queries the mapping relationship, and if the mapping relationship does not include the first ICCID, the SIM card verification agent module may interact with the human-computer interaction module, so that the human-computer interaction module outputs the first prompt information. For a process of interaction between the SIM card verification agent module and the human-computer interaction module, refer to the description in S302. In S302C, if the mapping relationship includes the first ICCID, the SIM card verification agent module may obtain, based on the foregoing Table 6, a quantity of prompt times or prompt duration of the first prompt information to which the first ICCID is mapped, and then determine whether the quantity of prompt times is greater than or equal to the preset quantity of prompt times or whether the prompt duration is greater than or equal to the preset prompt duration. In S302D, if the quantity of prompt times to which the first ICCID is mapped is less than the preset quantity of prompt times, or the prompt duration to which the first ICCID is mapped is less than the preset prompt duration, the SIM card verification agent module may interact with the human-computer interaction module, so that the human-computer interaction module outputs the first prompt information. In S302E, if the quantity of prompt times to which the first ICCID is mapped is greater than or equal to the preset quantity of prompt times, or the prompt duration to which the first ICCID is mapped is greater than or equal to the preset prompt duration, the SIM card verification agent module may not make a response, and the prompt ends. Alternatively, the SIM card verification agent module may enable the PIN code verification function of the first SIM card, and generate the second PIN code of the first SIM card. For this process, refer to the description of S307.

For interaction between the modules in S309, S310, and S311, refer to the description of the modules in S305. For interaction between the modules in S312 and S313, refer to the description of the modules in S3033. Details are not described herein again.

In a possible implementation, because the TEE stores the mapping relationship between the first ICCID and the PIN code of the first SIM card, the terminal device may implement the foregoing function of retrieving the PIN code by the user. For this process, refer to related descriptions of the terminal device in the foregoing embodiments. In a possible implementation, after the SIM card verification agent module obtains the mapping relationship between the first ICCID and the PIN code of the first SIM card, the SIM card verification agent module may send the mapping relationship between the first ICCID and the PIN code of the first SIM card to the server by using the communication module. The server may store the mapping relationship between the first ICCID and the PIN code of the first SIM card, so as to retrieve the PIN code by using the server in this embodiment of this application. For this part, refer to related descriptions in the foregoing embodiments.

A scenario to which the method for verifying a PIN code in the foregoing embodiments is applicable is: The terminal device first verifies the PIN code, and then displays the lock screen interface to verify the lock screen password. In an embodiment, the terminal device may first display the lock screen interface, to verify the lock screen password, and verify the PIN code after the lock screen password passes the verification. A structure of the terminal device corresponding to this embodiment may be shown in FIG. 23B. Different from FIG. 23A, an HUK TA in FIG. 23B may store a mapping relationship between a first ICCID and a PIN code of a first SIM card into an asset service (asset service) module in a TEE. Because data stored in the asset service module needs to be accessed by using a lock screen password, security of the mapping relationship between the first ICCID and the PIN code of the first SIM card can be further ensured.

Figure 23B:
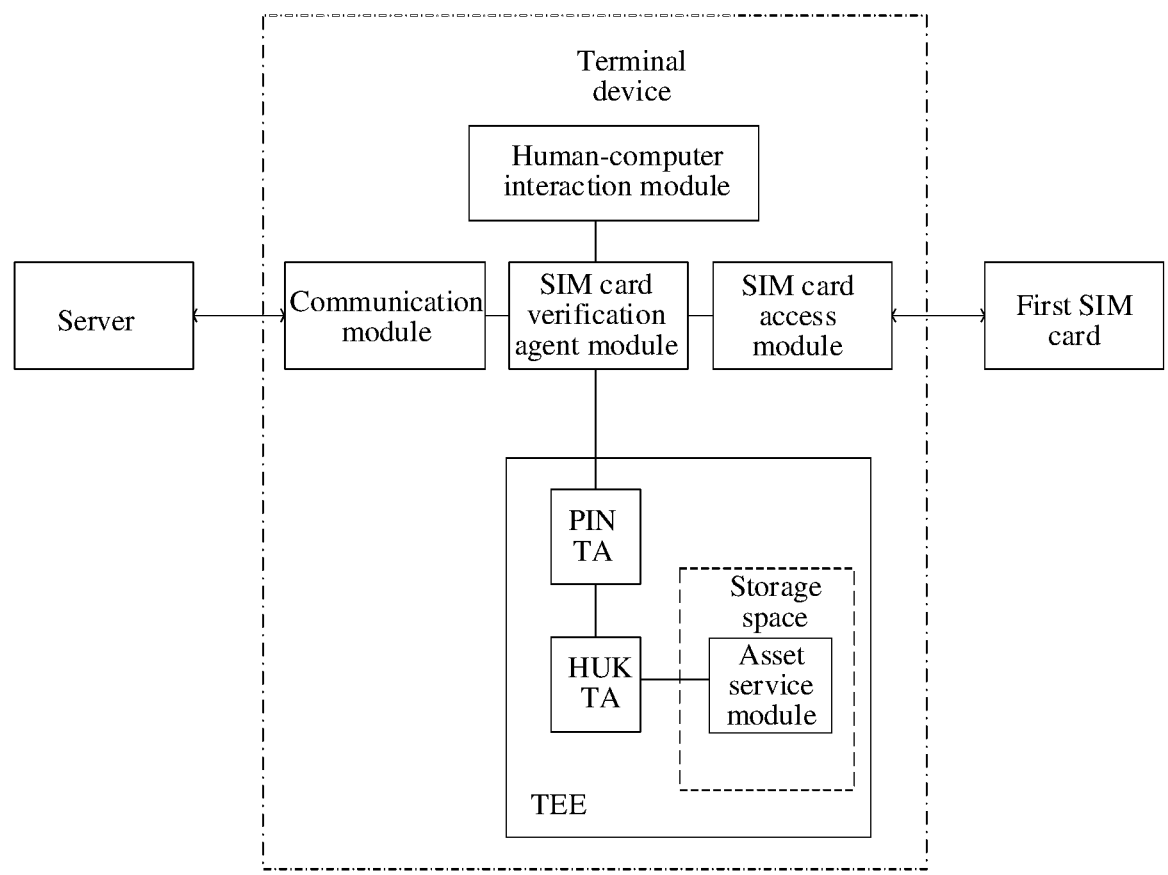
FIG. 23B is a schematic diagram of a structure of a terminal device according to an embodiment of this application.

The following describes, with reference to FIG. 23B, how a SIM card verification agent module stores and reads the mapping relationship between the first ICCID and the PIN code of the first SIM card in the TEE. For other actions of the SIM card verification agent module, refer to the description of module interaction in FIG. 23A. It should be understood that a module that is in the terminal device and that is configured to store and read the lock screen password in the TEE may be a module in the current terminal device. The following uses an example in which the module that stores and reads the lock screen password in the TEE is the SIM card verification agent module for description.

In a possible implementation, after obtaining the mapping relationship between the first ICCID and the PIN code of the first SIM card, the SIM card verification agent module may send the mapping relationship between the first ICCID and the PIN code of the first SIM card to the HUK TA by using a PIN TA, so that the HUK TA stores the mapping relationship into the asset service module. However, because the lock screen password is required for reading and storing data in the asset service module, if no lock screen password is set for the terminal device, the asset service module may feed back, to the HUK TA, a message of setting the lock screen password. The HUK TA may feed back the message of setting the lock screen password to the SIM card verification agent module, so that the SIM card verification agent module interacts with a human-computer interaction module, and the human-computer interaction module displays an interface for setting the lock screen password, as shown by the interface 2101 in FIG. 21. The human-computer interaction module may collect a lock screen password entered by a user, and then send the lock screen password to the SIM card verification agent module.

After obtaining the lock screen password, the SIM card verification agent module may send the lock screen password and the mapping relationship between the first ICCID and the PIN code of the first SIM card to the HUK TA by using the PIN TA. The HUK TA may encrypt the mapping relationship between the first ICCID and the PIN code of the first SIM card by using a hardware unique key, and send the lock screen password to the asset service module, so that the asset service module stores the lock screen password. In addition, the mapping relationship between the first ICCID and the PIN code of the first SIM card is stored in the asset service module.

In a possible implementation, the SIM card verification agent module may detect whether a lock screen password is set for the terminal device. If determining that no lock screen password is set for the terminal device, the SIM card verification agent module may interact with the human-computer interaction module to prompt the user to set a lock screen password, as shown by the interface 2101 in FIG. 21. After obtaining the lock screen password, the SIM card verification agent module may store the mapping relationship between the first ICCID and the PIN code of the first SIM card into the asset service module. For this process, refer to descriptions in the foregoing possible implementations.

When the SIM card verification agent module reads, from the TEE, the PIN code to which the first ICCID is mapped, the SIM card verification agent module may first send, by using the PIN TA, the lock screen password entered by the user to the HUK TA. The HUK TA sends the lock screen password to the asset service module, the asset service module compares the received lock screen password with the stored lock screen password for verification, and when the asset service module determines that the received lock screen password is consistent with the stored lock screen password, the HUK TA is enabled to access the asset service module. When determining that the received lock screen password is consistent with the stored lock screen password, the asset service module may send, to the HUK TA, a message indicating that the lock screen password passes the verification, and the HUK TA may send, to the SIM card verification agent module by using the PIN TA, the message indicating that the lock screen password passes the verification. Then, the SIM card verification agent module may read, from the asset service module, the PIN code to which the first ICCID is mapped, and automatically verify the PIN code.

In an embodiment, the apparatus for verifying a PIN code provided in this embodiment of this application may include: a processor (for example, a CPU), a memory, and an output apparatus. The apparatus for verifying a PIN code may be the terminal device in the foregoing embodiments or a chip in the terminal device. The memory may include a high-speed random access memory (random-access memory, RAM), or may further include a non-volatile memory (non-volatile memory, NVM), for example, at least one magnetic disk storage. The memory may store various instructions, to complete various processing functions and implement method steps of this application. The output apparatus is configured to output prompt information and receive an instruction entered by a user. The output apparatus may be a display device. Optionally, the apparatus for verifying a PIN code in this application may further include: a power supply, a communication bus, and a communication port. The communication port is configured to implement connection and communication between the apparatus for verifying a PIN code and another peripheral. In this embodiment of this application, the memory is configured to store computer-executable program code, and the program code includes instructions. When the processor executes the instruction, the instruction enables the processor of the apparatus for verifying a PIN code to perform the actions in the foregoing method embodiments. Their implementation principles and technical effects are similar, and details are not described herein again.

It should be noted that the foregoing modules may be one or more integrated circuits configured to implement the foregoing method, for example, one or more application-specific integrated circuits (application-specific integrated circuit, ASIC), or one or more microprocessors (digital signal processor, DSP), or one or more field programmable gate arrays (field programmable gate array, FPGA), or the like. For another example, when a module described above is implemented in a form of a processor element scheduling program code, the processor element may be a general-purpose processor, for example, a central processing unit (central processing unit, CPU) or another processor that can invoke program code. For another example, such modules may be integrated together and implemented in a form of a system-on-a-chip (system-on-a-chip, SOC).

All or a part of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital user line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a Solid State Disk (SSD)), or the like.

The term "a plurality of" in this specification refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It can be understood that numerals involved in embodiments of this application are differentiated merely for ease of description, but are not used to limit the scope of embodiments of this application. Sequence numbers of the foregoing processes do not mean execution sequences in embodiments of this application. The execution sequences of the processes should be determined according to functions and internal logic of the processes, and should not be construed as any limitation on the implementation processes of embodiments of this application.

What is claimed is:

1. A method, applied to a terminal device, the method comprising:
receiving a first operation of a user, wherein the first operation instructs the terminal device to enable a function of automatically verifying a personal identification number (PIN) code of a first subscriber identity module (SIM) card;

after the receiving the first operation and based on that no lock screen password is set for the terminal device:
displaying a first prompt for the user to enter a lock screen password,
receiving the lock screen password entered by the user,
displaying a second prompt for the user to enter a first PIN code, the second prompt being different from the first prompt, and
receiving the first PIN code entered by the user;
storing the first PIN code to complete enabling the function of automatically verifying the PIN code of the first SIM card, wherein when the function of automatically verifying the PIN code of the first SIM card is enabled and the first PIN code is stored, the terminal device uses the first PIN code to automatically verify the first SIM card; and
after the storing, verifying the PIN code of the first SIM card using the first PIN code without the user inputting the PIN code when the first SIM card is inserted into the terminal device and the terminal device is in a powered-on state, or when the terminal device into which the first SIM card is inserted is powered on.

2. The method according to claim 1, wherein the terminal device further stores a second PIN code of a second SIM card, a second function of automatically verifying the second PIN code of the second SIM card is enabled, and the method further comprises:
verifying the second PIN code of the second SIM card without the user inputting the second PIN code in response to detecting the second SIM card is inserted in the terminal device.

3. The method according to claim 1, wherein automatically the verifying the PIN code of the first SIM card comprises:
verifying the PIN code of the first SIM card when the function of automatically verifying the PIN code of the first SIM card is enabled.

4. The method according to claim 1, wherein the receiving the first PIN code entered by the user, and storing the first PIN code comprises:
receiving a second PIN code entered by the user;
displaying a third interface when the second PIN code entered by the user is an initial PIN code of the first SIM card, wherein the third interface prompts the user to enter a new PIN code; and
receiving the new PIN code entered by the user as the first PIN code, and storing the first PIN code.

5. The method according to claim 1, wherein the receiving the first PIN code entered by the user, and storing the first PIN code comprises:
receiving a second PIN code entered by the user; and
when the second PIN code entered by the user is different from an initial PIN code of the first SIM card, using the second PIN code entered by the user as the first PIN code, and storing the first PIN code.

6. The method according to claim 1, wherein after the verifying the PIN code of the first SIM card, the method further comprises:
displaying a fourth interface, wherein the fourth interface prompts that PIN code verification of the first SIM card succeeds.

7. The method according to claim 6, wherein before the verifying the PIN code of the first SIM card, the method further comprises:
displaying a fifth interface, wherein the fifth interface prompts to enter the lock screen password; and switching to an unlocked state when receiving a correct lock screen password.

8. The method according to claim 1 further comprising:
receiving a second operation of the user, wherein the second operation instructs the terminal device to display the PIN code of the first SIM card;
displaying a sixth interface, wherein the sixth interface prompts to enter verification information; and
receiving the verification information, and outputting a fourth PIN code, wherein the fourth PIN code is the PIN code of the first SIM card.

9. The method according to claim 1, further comprising:
storing an integrated circuit card identifier (ICCID) of the first SIM card.

10. The method according to claim 9, wherein the ICCID corresponds to the first PIN code.

11. The method according to claim 1, wherein the terminal device does not store a PIN code of a second SIM card, and the method further comprises:
displaying a seventh interface in response to detecting the second SIM card is inserted, wherein the seventh interface prompts to enter the PIN code of the second SIM card.

12. The method according to claim 11, further comprising:
displaying an eighth interface when the terminal device has set the lock screen password in response to the first operation, wherein the eighth interface prompts to enter the lock screen password.

13. The method according to claim 11, wherein the verifying the PIN code of the first SIM card comprises:
querying whether the terminal device comprises a PIN code corresponding to an integrated circuit card identifier (ICCID) of the first SIM card;
sending the PIN code corresponding to the ICCID of the first SIM card to the first SIM card when the terminal device comprises the PIN code corresponding to the ICCID of the first SIM card; and
receiving a verification result obtained from the first SIM card for the PIN code corresponding to the ICCID of the first SIM card.

14. The method according to claim 11, further comprising:
outputting first prompt information when the function of automatically verifying the PIN code of the first SIM is not enabled, wherein the first prompt information prompts to enable the function of automatically verifying the PIN code of the first SIM card.

15. A terminal device, comprising:
one or more processors; and
a non-transitory memory configured to store processor-executable instructions, wherein when executing the processor-executable instructions, the one or more processors are configured to perform operations comprising:
receiving a first operation of a user, wherein the first operation instructs the terminal device to enable a function of automatically verifying a personal identification number (PIN) code of a first subscriber identity module (SIM) card;
after the receiving the first operation and based on that no lock screen password is set for the terminal device:
displaying a first prompt for the user to enter a lock screen password,
receiving the lock screen password entered by the user, displaying a second prompt for the user to enter a first PIN code, the second prompt being different from the first prompt, and
receiving the first PIN code entered by the user;
storing the first PIN code to complete enabling the function of automatically verifying the PIN code of the first SIM card, wherein when the function of automatically verifying the PIN code of the first SIM card is enabled and the first PIN code is stored, the terminal device uses the first PIN code to automatically verify the first SIM card; and
after the storing, verifying the PIN code of the first SIM card using the first PIN code without the user inputting the PIN code when the first SIM card is inserted into the terminal device and the terminal device is in a powered-on state, or when the terminal device into which the first SIM card is inserted is powered on.

16. The terminal device according to claim 15, wherein the terminal device further stores a second PIN code of a second SIM card, a second function of automatically verifying the second PIN code of the second SIM card is enabled, and when executing the processor-executable instructions, the operations further comprising:
verifying the second PIN code of the second SIM card without the user inputting the second PIN code in response to detecting the second SIM card is inserted.

17. The terminal device according to claim 15, wherein the verifying the PIN code of the first SIM card comprises:
verifying the PIN code of the first SIM card when the function of automatically verifying the PIN code of the first SIM card is enabled.

18. A non-transitory memory, comprising instructions, wherein when the instructions are run on a terminal device, the terminal device is enabled to perform operations comprising:
receiving a first operation of a user, wherein the first operation instructs the terminal device to enable a function of automatically verifying a personal identification number (PIN) code of a first subscriber identity module (SIM) card;
after the receiving the first operation and based on that no lock screen password is set for the terminal device:
displaying a first prompt for the user to enter a lock screen password,
receiving the lock screen password entered by the user,
displaying a second prompt for the user to enter a first PIN code, the second prompt being different from the first prompt, and
receiving the first PIN code entered by the user;
storing the first PIN code to complete enabling the function of automatically verifying the PIN code of the first SIM card, wherein when the function of automatically verifying the PIN code of the first SIM card is enabled and the first PIN code is stored, the terminal device uses the first PIN code to automatically verify the first SIM card; and
after the storing, verifying the PIN code of the first SIM card using the first PIN code without the user inputting the PIN code when the first SIM card is inserted into the terminal device and the terminal device is powered on or when the terminal device into which the first SIM card is inserted is powered on.

19. The non-transitory memory according to claim 18, wherein the terminal device further stores a second PIN code of a second SIM card, and a second function of automatically verifying the second PIN code of the second SIM card is enabled, and when the instructions are run on the terminal device, the operations further comprising:
verifying the second PIN code of the second SIM card without the user inputting the second PIN code in response to detecting the second SIM card is inserted.

20. The non-transitory memory according to claim 18, wherein the verifying the PIN code of the first SIM card comprises:
verifying the PIN code of the first SIM card when the function of automatically verifying the PIN code of the first SIM card is enabled.

* * * * *

UNITED STATES PATENT AND TRADEMARK OFFICE
CERTIFICATE OF CORRECTION

PATENT NO. : 12,501,268 B2
APPLICATION NO. : 18/259533
DATED : December 16, 2025
INVENTOR(S) : Li et al.

Page 1 of 1

It is certified that error appears in the above-identified patent and that said Letters Patent is hereby corrected as shown below:

In the Claims

In Column 53, in Claim 3, Lines 33-34, after "wherein" delete "automatically".

Signed and Sealed this
Tenth Day of February, 2026

John A. Squires
*Director of the United States Patent and Trademark Office*